United States Patent [19]
Matsuyama

[11] Patent Number: 5,790,234
[45] Date of Patent: Aug. 4, 1998

[54] EYEBALL DETECTION APPARATUS

[75] Inventor: Shinichi Matsuyama, Tokyo, Japan

[73] Assignee: Canon Kabushiki Kaisha, Tokyo, Japan

[21] Appl. No.: 770,804

[22] Filed: Dec. 20, 1996

[30] Foreign Application Priority Data

Dec. 27, 1995 [JP] Japan ................................. 7-341039
Dec. 28, 1995 [JP] Japan ................................. 7-343103

[51] Int. Cl.$^6$ ............................... A61B 3/10; A61B 3/14
[52] U.S. Cl. ............................. 351/212; 351/210; 351/247
[58] Field of Search ................................ 351/205, 206, 351/210, 212, 247

[56] References Cited

U.S. PATENT DOCUMENTS 5,280,312 1/1994 Yamada et al. ........................ 351/205
5,657,110 8/1997 Konishi ................................ 351/212

FOREIGN PATENT DOCUMENTS 64-42639 2/1989 Japan .
3-36532 2/1991 Japan .
3-192338 8/1991 Japan .

*Primary Examiner*—Huy Mai
*Attorney, Agent, or Firm*—Fitzpatrick, Cella, Harper & Scinto

[57] ABSTRACT

An eyeball detection apparatus has a light-receiving device, a first determination circuit, and a second determination circuit. The light-receiving device receives a reflection image from the cornea of an eyeball of a user or a person being tested. The first determination circuit determines whether the signal of the reflection image from the cornea received by the light-receiving device exceeds a specified level. The second determination circuit determines whether the size of the reflection image from the cornea received by the light-receiving device falls in a specified range only when the first determination circuit determines that the signal of the reflection image from the cornea received by the light-receiving device exceeds the specified level. It is determined that the eyeball of the user or the person being tested has approached the apparatus only when the second determination circuit determines that the size of the reflection image from the cornea received by the light-receiving device falls in the specified range.

20 Claims, 38 Drawing Sheets

| FIG. 37A | FIG. 37B |

EYEBALL DETECTION APPARATUS

BACKGROUND OF THE INVENTION

1. Field of the Invention

The present invention relates to an eyeball detection apparatus for detecting the approach of an eyeball of a user or a person being tested, and more particularly, to an eyeball detection apparatus for detecting the approach of an eyeball of the user or the person being tested according to an image on the eyeball.

2. Description of the Related Art

Japanese unexamined patent No. 64-42639 and Japanese unexamined patent No. 3-36532 disclose a camera which detects, with the use of a switch provided at a grip, and a light-emitting device and a light-receiving device both provided in the viewfinder, a condition in which the user holds the camera to look through the viewfinder and the face of the user approaches the viewfinder. Japanese unexamined patent No. 3-192338 discloses an apparatus which detects the approach of an eyeball according to an image on the eyeball.

In the camera disclosed according to Japanese unexamined patent No. 64-42639 or Japanese unexamined patent No. 3-36532, the outputs of the grip switch and the light-receiving device are checked in an AND condition to detect a state in which the user holds the camera to take a picture. Such an object-approach detection by means of reflective light, however, responds to any object disposed around the viewfinder and it does not determine whether the object is an eye or not, sometimes resulting in an erroneous detection.

In the eye-approach detection by means of an image on the eyeball disclosed in Japanese unexamined patent No. 3-192338, since an eyeball is identified and detected, the possibility of erroneous detection is lowered. Since an area sensor detects an image and the image is processed to obtain a result, however, a vast amount of memory and a high-speed processing circuit are required for handling a number of image data items, and their power consumption inevitably becomes high.

SUMMARY OF THE INVENTION

Accordingly, it is an object of the present invention to provide an eyeball detection apparatus which can reduce power consumption without reducing the precision of eyeball detection.

The above object of the present invention is achieved in one aspect of the present invention through the provision of an eyeball detection apparatus including a light-receiving device for receiving a reflection image from the cornea of an eyeball of a user or a person being tested; a first determination circuit for determining whether the signal of the reflection image from the cornea received by the light-receiving device exceeds a specified level; and a second decision circuit for determining whether the size of the reflection image from the cornea received by the light-receiving device falls in a specified range only when the first decision circuit determines that the signal of the reflection image from the cornea received by the light-receiving device exceeds the specified level; wherein it is determined that the eyeball of the user or the person being tested has approached the apparatus only when the second decision circuit determines that the size of the reflection image on the cornea received by the light-receiving device falls in the specified range.

The above object of the present invention is achieved according to another aspect of the present invention through the provision of an eyeball detection apparatus including an illumination device for illuminating an eyeball of a user or a person being tested; a light-receiving device for receiving a reflection image from the cornea of an eyeball projected by the illumination device; a detection circuit for detecting the approach of the eyeball of the user or the person being tested by detecting the reflection image on the cornea; a decision circuit for determining whether the signal of the reflection image on the cornea received by the light-receiving device exceeds the specified level; and an illumination control circuit for increasing the amount of illumination generated by the illumination device when the decision circuit determines that the signal of the reflection image on the cornea received by the light-receiving device exceeds the specified level.

The above object of the present invention is achieved according to still another aspect of the present invention through the provision of an eyeball detection apparatus including a light-receiving device for receiving an image of an eyeball of a user or a person being tested; a control circuit for controlling the light-receiving device so that the light-receiving device outputs an appropriate signal level; a line-of-sight detection circuit for detecting the line of sight of the user or the person being tested according to the image of the eyeball received by the light-receiving device; and an eyeball detection circuit for detecting the approach of the eyeball of the user or the person being tested according to the image of the eyeball received by the light-receiving device; wherein the control circuit differently controls line-of-sight detection performed by the line-of-sight detection circuit and eyeball detection performed by the eyeball detection circuit.

The above object of the present invention is achieved according to yet another aspect of the present invention through the provision of an eyeball detection apparatus including a light-receiving device having a light-receiving sensor for receiving an image of an eyeball of a user or a person being tested; a control circuit for controlling the light-receiving device so that the light-receiving device outputs an appropriate signal level, the control circuit having a first control mode in which control is changed according to the level of light received by the light-receiving sensor and a second control mode in which the control specified in advance is performed regardless of the level of light received by the light-receiving sensor; and an eyeball detection circuit for detecting approach of the eyeball of the user or the person being tested according to the image of the eyeball received by the light-receiving device.

In an eyeball detection apparatus according to the present invention, power consumption is reduced while the precision of eye-approach detection and line-of-sight detection is maintained.

DESCRIPTION OF THE PREFERRED EMBODIMENTS

First Embodiment

Figure 1:
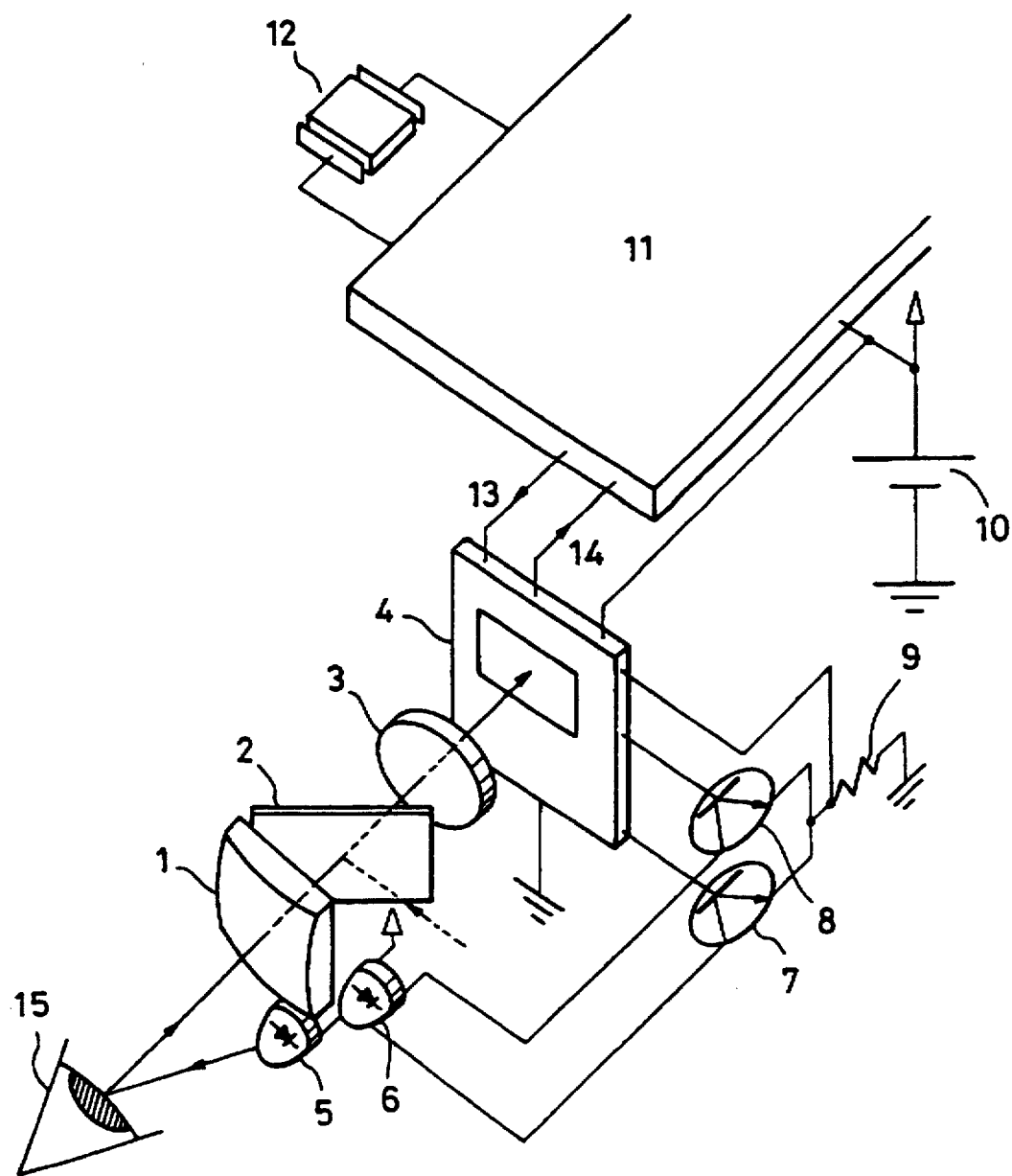
FIG. 1 is a view showing an eyeball detection apparatus according to a first embodiment of the present invention.

FIG. 1 shows a camera having an eyeball detection apparatus according to an embodiment of the present invention.

In FIG. 1, there is shown a viewfinder eyepiece 1 of the camera, a dichroic mirror 2 for separating infrared light serving as signal light which indicates the image of an eyeball viewed from the viewfinder, from visible viewfinder light flux from the field, an image-taking lens 3 for forming an image of the eye at the eyepiece of the viewfinder on an area sensor IC chip 4, and the area sensor IC chip 4 which has a light-receiving sensor section for optoelectrically converting the image and generating an image signal. Infrared light-emitting diodes 5 and 6 serve as light sources for illuminating an eyeball. Transistors 7 and 8 drive the infrared light-emitting diodes 5 and 6, respectively, by driving signals sent from the area sensor IC chip 4. A resistor 9 is provided to drive the infrared light-emitting diodes 5 and 6 at a constant current. There is also shown a dry cell 10 serving as a power source, a camera control circuit 11, an oscillator 12 for generating an operational clock, an operational-clock signal line 13, an eye-approach detection signal line 14, and an eye 15 of the observer which has approached the viewfinder.

Figure 2:
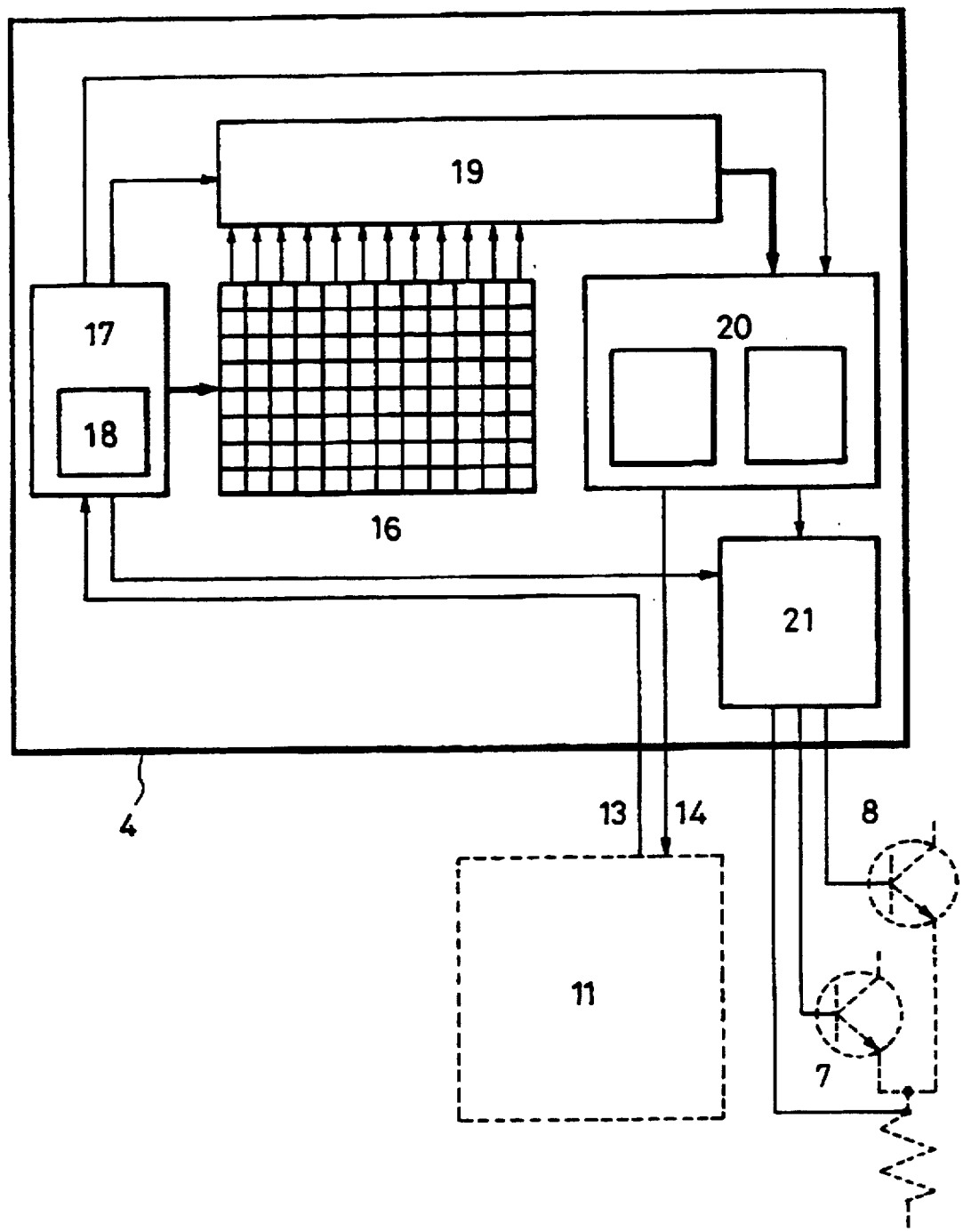
FIG. 2 is a view showing the configuration of an area sensor IC chip 4 used in the eyeball detection apparatus according to the first embodiment of the present invention.

FIG. 2 illustrates the configuration of the area sensor IC chip 4 in the eyeball detection apparatus of the camera shown in FIG. 1. The area sensor IC chip 4 includes an area sensor section 16, a sensor driving circuit 17, a timer 18, a read circuit 19, a signal decision circuit 20, and an infrared-light-emitting-diode driving circuit 21. The area sensor IC chip 4 is connected to the transistors 7 and 8, the camera control circuit 11, the operational-clock signal line 13, and the eye-approach detection signal line 14, all of which are disposed at the outside of the area sensor IC chip 4 and are shown in FIG. 1. The area sensor section 16 is disposed in the area sensor IC chip 4 and serves as a light-receiving sensor having a number of pixels. The pixels have about the same size as a bright point which is a Purkinje image. The sensor driving circuit 17 controls storage and read operations in the area sensor section 16, and includes in it the timer 18 for obtaining the time period between repeated operations. The read circuit 19 sequentially reads an image signal from the area sensor section 16 by a timing signal from the sensor driving circuit 17 and sends the image signal to the signal decision circuit 20. The signal decision circuit 20 determines whether an eye approaches according to the image signal sent from the read circuit 19. The infrared-light-emitting-diode driving circuit 21 drives the transistors 7 and 8 to turn on the infrared-light-emitting-diodes 5 and 6 in synchronization with the driving timing of the sensor driving circuit 17.

Figure 3:
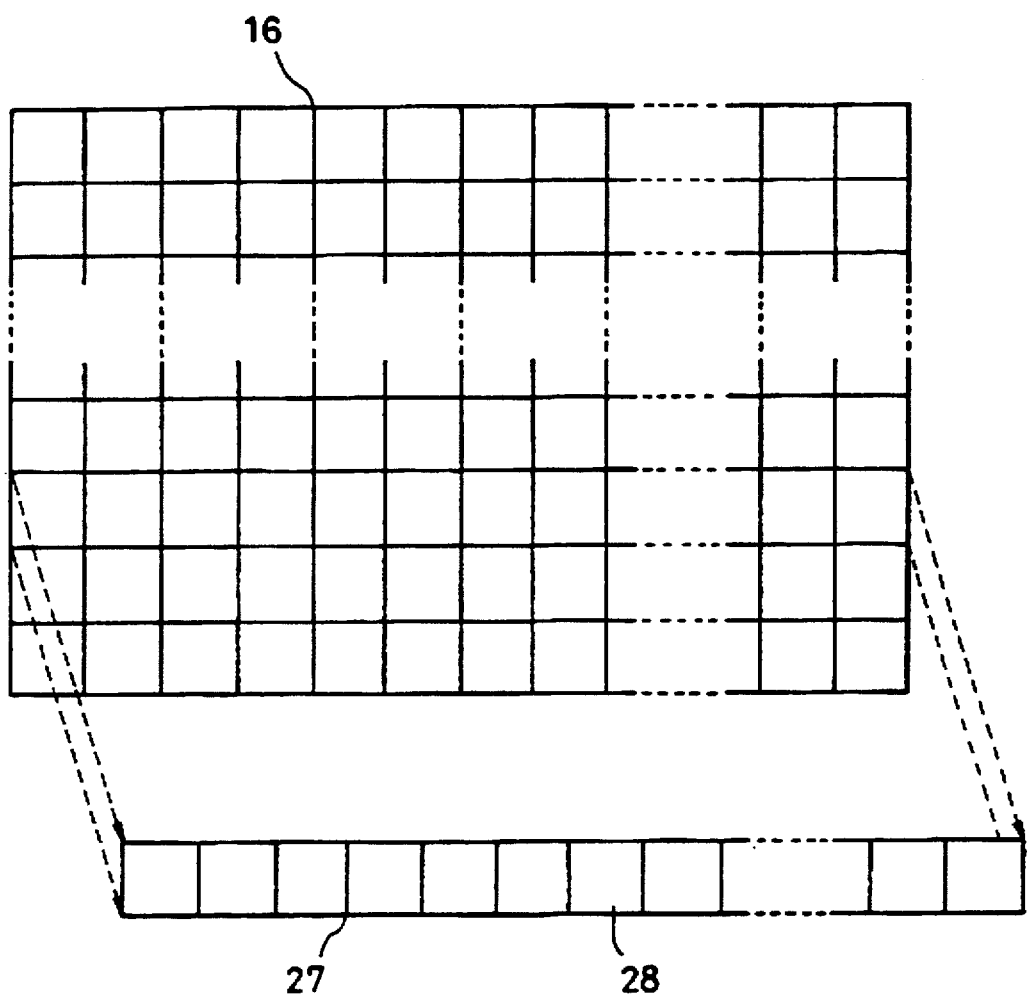
FIG. 3 is a view illustrating how the screen of an area sensor section 16 of the eyeball detection apparatus is divided into a plurality of pixels.

FIG. 3 shows how the screen of the area sensor section 16 is divided into a plurality of pixels. The longitudinal direction of the area sensor section 16 is regarded as the horizontal direction and the direction perpendicular thereto is regarded as the vertical direction. One block includes one row of pixels, that is, one pixel in the vertical direction and the whole screen from one end to the other end in the horizontal direction.

Figure 4:
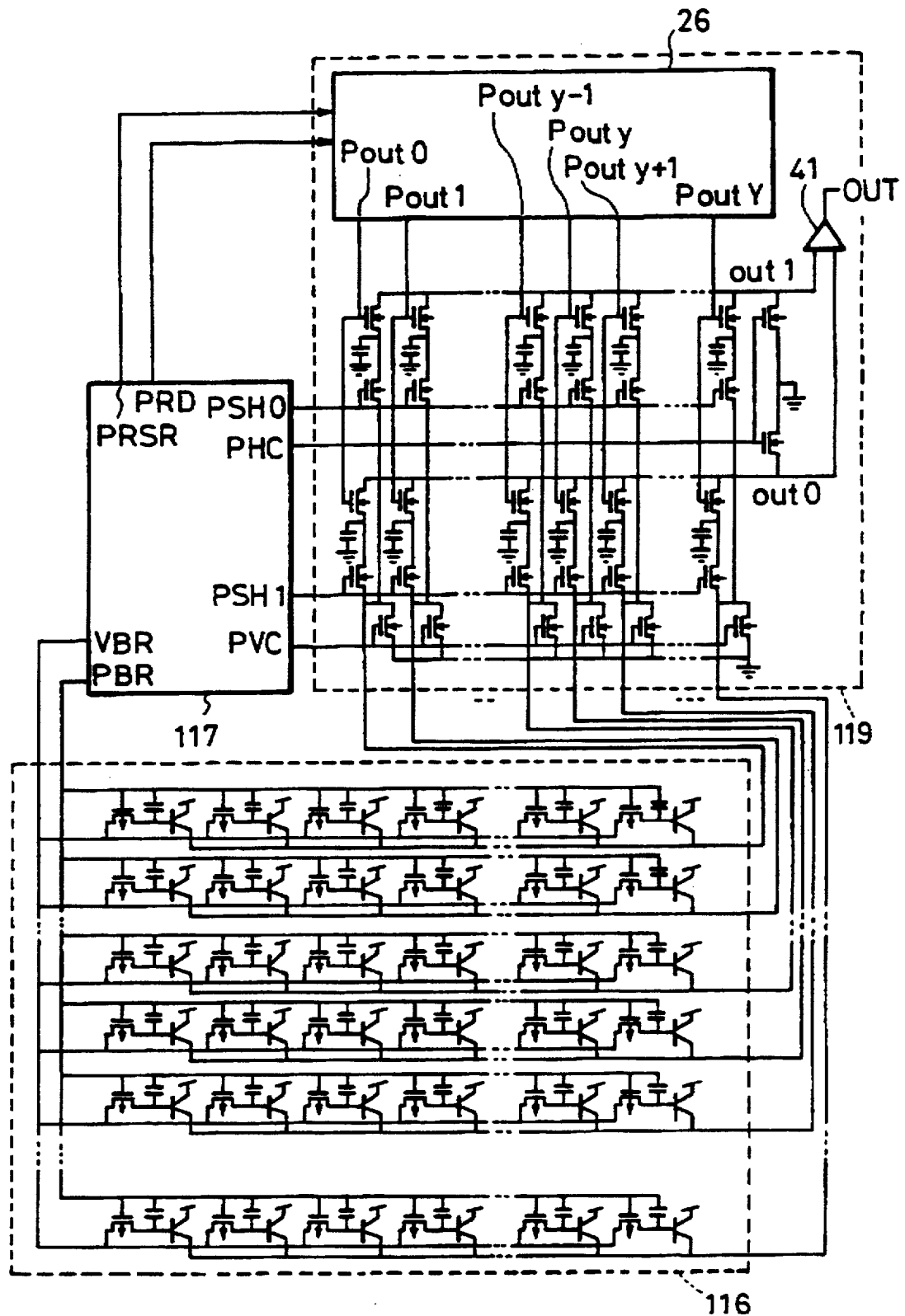
FIG. 4 is a circuit diagram of a read circuit and an area sensor section in a case in which an area sensor is made up of a nondestructive imaging device in the eyeball detection apparatus.

FIG. 4 shows a read circuit and an area sensor section which is of nonerasable image storage type (hereinafter called nondestructive image device). In FIG. 4, there is shown a driving circuit 117 for the nondestructive image device corresponding to the sensor driving circuit 17 shown in FIG. 2, a sensor section 116 of the nondestructive image device corresponding to the area sensor section 16 shown in FIG. 2, a read circuit 119 for the nondestructive image device corresponding to the read circuit 19 shown in FIG. 2, and a shift register 26 built in the read section 119, for sequentially supplying read timing to each block.

Figure 5:
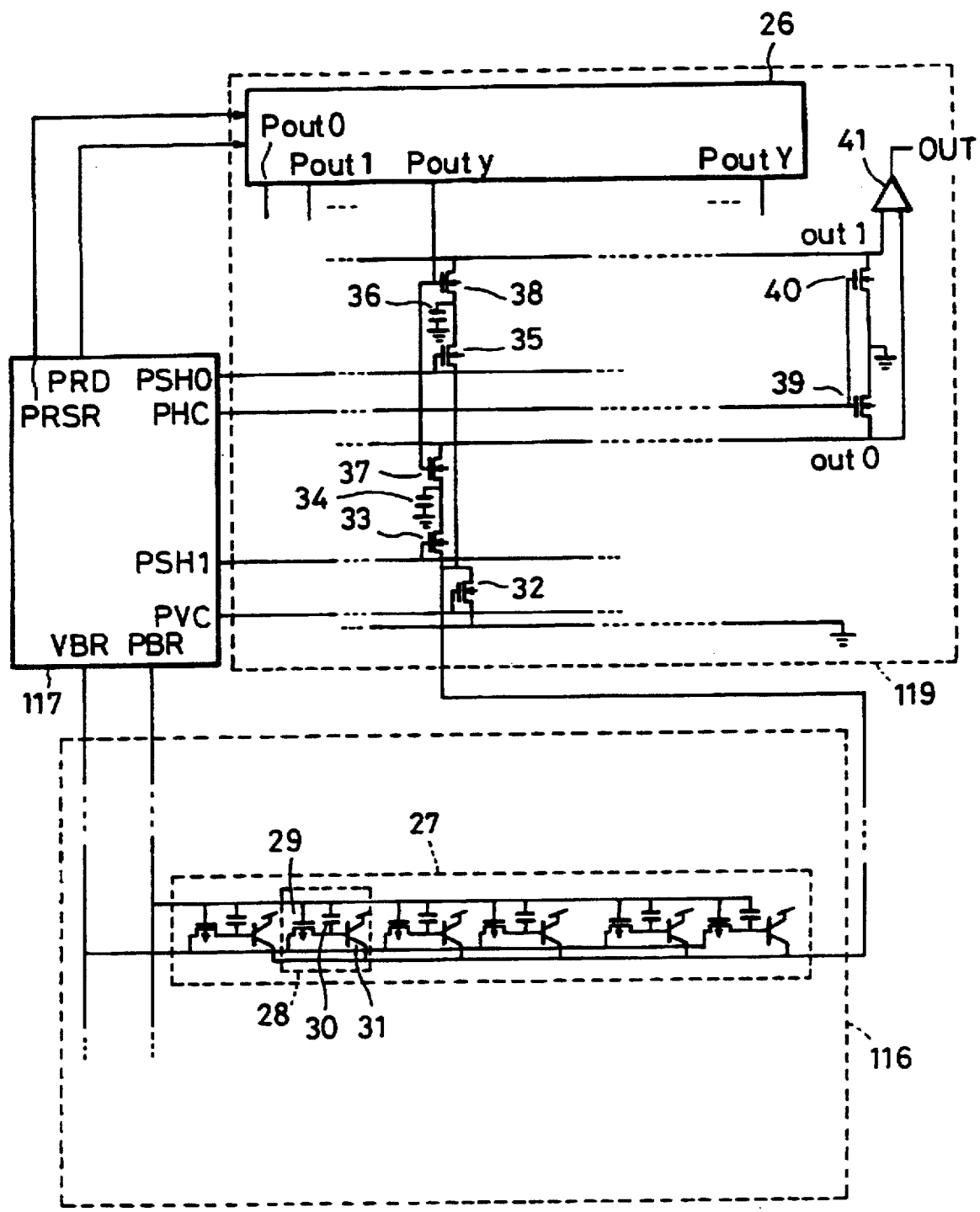
FIG. 5 is a view of one block of the area sensor section for convenience for describing the operation and structure of the area sensor section shown in FIG. 4.

FIG. 5 shows one block of the area sensor section for convenience for describing the structure and operation of the sensor shown in FIG. 4. In FIG. 5, reference numerals 117, 116, 119, and 26 indicate the same portions as those shown in FIG. 4. There is shown one block 27 including a plurality of pixels, one cell 28 constituting one pixel of the image sensor, an MOS transistor 29 serving as switching means for resetting the base voltage of a transistor 31 according to a base reset signal PBR sent from the driving circuit 117, a sensor capacity 30, and an NPN transistor 31 serving as a sensor section of the nondestructive image device. The NPN transistor 31 uses its base or a portion connected to the base as a photosensitive section and a signal storage section and outputs from the emitter a voltage based on the base voltage which accords with the quantity of charges accumulated at the base. The (emitter) output of each pixel constituting a block is collected in each block and is supplied to the read circuit 119 as the block output. An MOS transistor 32 serves as switching means for resetting the block output to the ground according to an emitter reset signal PVC supplied from the driving section 117. An MOS transistor 33 serves as switching means for supplying the block output to a sample and hold capacitor 34 according to a sample and hold signal PSH1 supplied from the driving circuit 117. An MOS transistor 35 serves as switching means for supplying the block output to a sample and hold capacitor 36 according to a sample and hold signal PSH0 supplied from the driving circuit 117. An MOS transistor 37 serves as switching means for outputting the signal sampled and held by the capacitor 34 according to a sample and hold signal PSH0 to an output line out0 according to an output signal Pouty sent from the shift register 26 for each block. An MOS transistor 38 serves as switching means for outputting the signal sampled and held by the capacitor 36 according to the sample and hold signal PSH1 to an output line out1 according to the output signal Pouty sent from the shift register 26 for each block. MOS transistors 39 and 40 serve as switching means for resetting the output lines out0 and out1 to the ground according to a reset signal PHC supplied from the driving circuit 117. A calculator 41 outputs the difference between the signals on the output lines out0 and out1 to the OUT terminal.

Units 32 to 38 or the equivalents are provided for each block output and they are connected to the driving circuit 117, the shift register 26, and the output lines out0 and out1. They constitute the read circuit 19 together with the shift register 26, MOS transistors 39 and 40, and the calculator.

Figure 6:
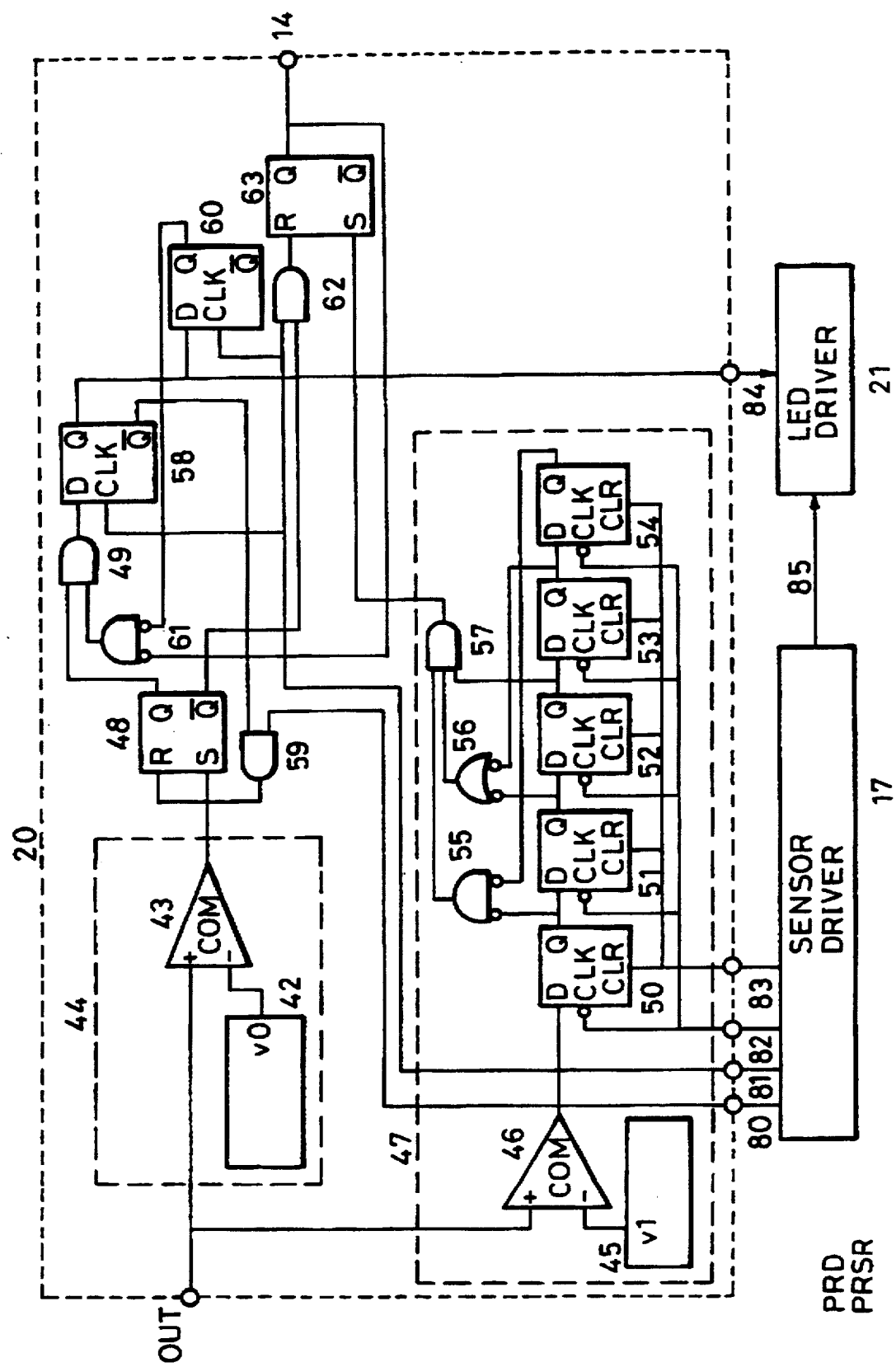
FIG. 6 shows the configuration of a signal decision circuit 20.

FIG. 6 shows the configuration of the signal decision circuit 20 shown in FIG. 2. In FIG. 6, a constant-voltage circuit 42 generates a specific comparison level voltage $v_0$ and a comparator 43 compares the signal output from the read circuit 19, that is, the output of the calculator 41, with the comparison level $v_0$. If the output exceeds the comparison level, the comparator outputs a high level to an R-S flip-flop 48. The constant-voltage circuit 42 and the comparator 43 form a first decision means 44. A constant-voltage circuit 45 generates a specific comparison level voltage $v_1$ and a comparator 46 compares the signal output from the read circuit 19, that is, the output of the calculator 41, with the comparison level $v_1$. If the output exceeds the comparison level, the comparator outputs a high level to a D flip-flop 50. D flip-flops 50 to 54 form a shift register to which the output of the comparator 46 is input. The shift register 50 to 54 receives from the driving circuit 17 a shift clock for each read block via a signal line 82 and a clear signal before each screen read operation via a signal line 83. A negative-level-input AND gate 55 receives the output of the D flip-flop 50, which is the first stage of the shift register 50 to 54, and the output of the D flip-flop 54, which is the fifth stage of the shift register, and outputs data to an AND gate 57. A negative-level-input OR gate 56 receives the output of the D flip-flop 51, which is the second stage of the shift register 50 to 54, and the output of the D flip-flop 53, which is the fourth stage of the shift register, and outputs data to the AND gate 57. The AND gate 57 receives the output of the negative-level-input AND gate 55, the output of the negative-level-input OR gate 56, and the output of the D flip-flop 52, which is the third stage of the shift register 50 to 54, and outputs data to the set input of an R-S flip-flop 63. The constant-voltage circuit 45, the comparator 46, the shift register 50 to 54, the gates 55 to 57 form a second decision means 47.

The R-S flip-flop 48 receives the output of the first decision means 44, that is, the output of the comparator 43, at its set input and holds the decision result. Its Q output is connected to an AND gate 49 and its $\overline{Q}$ output (the inverting output of Q) is connected to an AND gate 62. The AND gate 49 generates the logical product of the output of the R-S flip-flop 48 and the output of a gate 61, and outputs it to the D input of a D flip-flop 58. The D flip-flop 58 receives a clock pulse for each screen read operation at its clock input from the driving circuit 17 via a signal line 81, and outputs data according to the output at that time of the AND gate 49 to indicate whether the first decision mode or the second decision mode is used. Its Q output is sent to the infrared-light-emitting-diode driving circuit 21 via the signal line 84. The AND gate 59 generates the logical product of the $\overline{Q}$ output of the D flip-flop 58 and a clock pulse for each screen read operation sent from the driving circuit 17 via a signal line 80, which is delayed in phase from the clock pulse for each screen read operation sent via the signal line 81, and outputs it to the reset input of the R-S flip-flop 48. A D flip-flop 60 receives the clock pulse for each screen read operation at the clock input from the driving circuit 17 via the signal line 81, and changes its output according to the Q output at that time of the D flip-flop 58. The D flip-flops 58 and 60 form a two-stage shift register, and the output of the D flip-flop 60 indicates the previous decision mode. A negative-level-input AND gate 61 receives the Q output of the D flip-flop 60, which indicates the previous decision mode and the Q output of the R-S flip-flop 63, and outputs value 0 to the AND gate 49 when the second decision mode succeeds twice or the decision result indicates eye approach. The AND gate 62 generates the logical product of the clock pulse for each screen read operation sent from the driving circuit 17 via the signal line 81 and the $\overline{Q}$ output of the R-S flip-flop 48, and outputs it to the reset input of the R-S flip-flop 63. The R-S flip-flop 63 receives at its set input the output of the AND gate 57, which indicates the decision result of the second decision means 47 and at its reset input the output of the AND gate 62, and sends the Q output as an eye-approach detection signal to the signal line 14.

Figure 7:
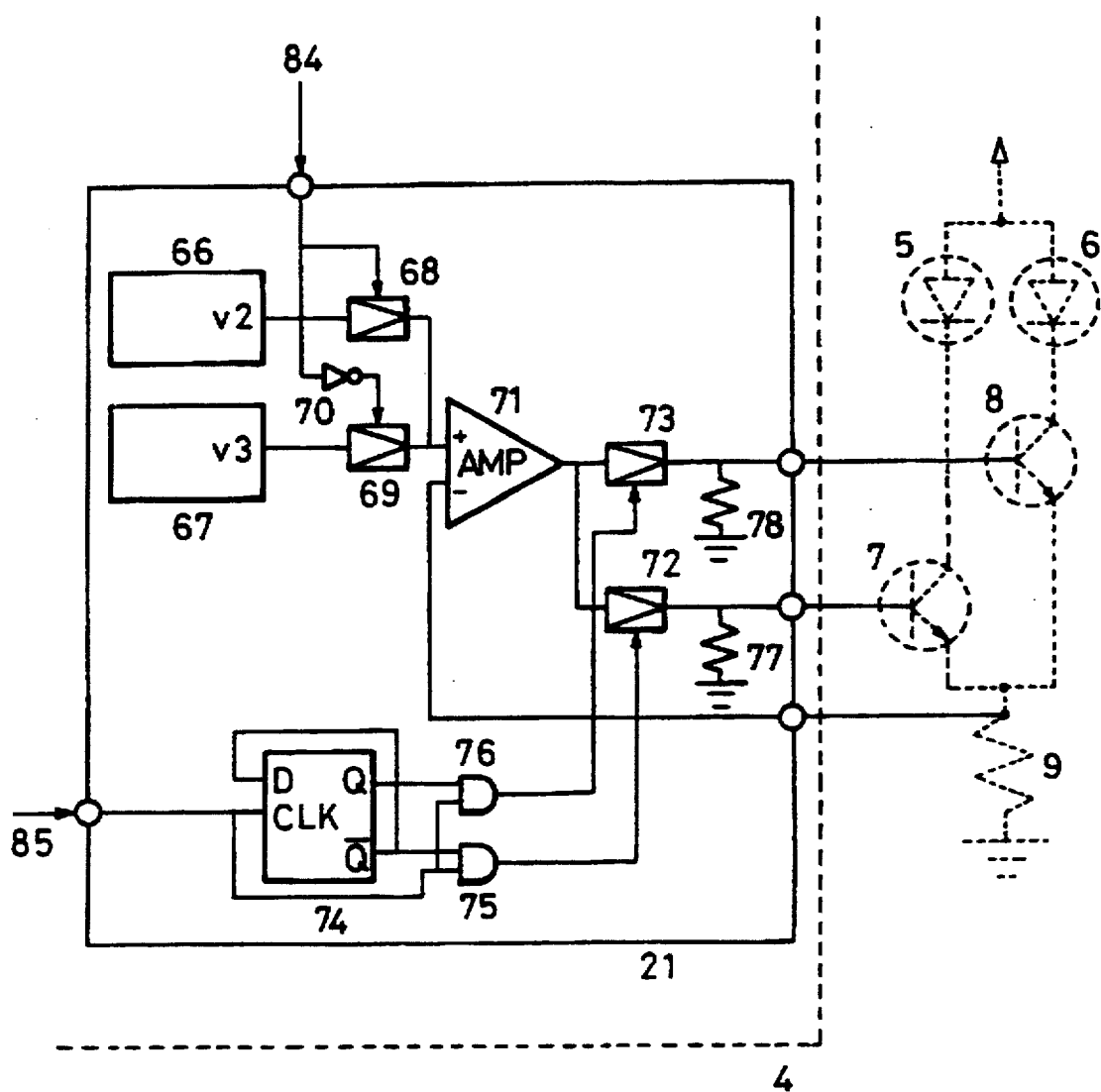
FIG. 7 shows the configuration of an infrared-light-emitting-diode driving circuit 21.

FIG. 7 shows the configuration of the infrared-light-emitting-diode driving circuit 21 shown in FIG. 2. In FIG. 7, a constant-voltage circuit 66 generates a voltage $v_2$ which equals the product of a current $i_2$ to be supplied to an infrared-light-emitting-diode in the second decision mode and the resistance r of a resistor 9, and a constant-voltage circuit 67 generates a voltage $v_3$, which equals the product of a current $i_1$ to be supplied to an infrared-light-emitting-diode in the first decision mode and the resistance r of the resistor 9. Analog switches 68 and 69 are turned on or off according to the signal indicating the decision mode which is sent from the signal decision circuit 20 via the signal line 84, that is, the output of the D flip-flop 58. An analog switch 68 is turned on in the second decision mode and supplies the output $v_2$ of the constant-voltage circuit 66 to an amplifier 71. An analog switch 69 receives a signal indicating the decision mode which is sent from the signal decision circuit 20 via an inverter 70. It is turned on in the first decision mode and supplies the output $v_3$ of the constant-voltage circuit 67 to the amplifier 71. The operational amplifier 71 receives either the output of the constant-voltage circuit 66 or the output of the constant-voltage circuit 67 through an analog switch 68 or 69, compares it with the voltage $v_r$ across the resistor 9, which equals the product of an infrared-light-emitting-diode driving current $i_{LED}$ and the resistance r of the resistor 9, and outputs such that they match. Analog switches 72 and 73 are turned on or off according to the outputs of AND gates 75 and 76, respectively. Analog switches 72 and 73 supply the output of the amplifier 71 to the base of the transistor 7, which drives an infrared-light-emitting-diode 5, and to the base of the transistor 8, which drives an infrared-light-emitting-diode 6, so as to flow a driving current $i_{LED}$ to the infrared-light-emitting-diodes 5 and 6, respectively. A D flip-flop 74 receives at the D input its own $\overline{Q}$ output and at the clock input an infrared-light-emitting-diode turn-on timing signal sent from the sensor driving circuit 17 via a signal line 85. The outputs of the D flip-flop 74 are inverted at every rising edge of the infrared-light-emitting-diode turn-on timing signal. The Q output is sent to an AND gate 76 and the $\overline{Q}$ output is sent to an AND gate 75. AND gates 75 and 76 generate the logical products of the Q and $\overline{Q}$ outputs and the infrared-light-emitting-diode turn-on timing signal, and send them to analog switches 72 and 73 as turn-on/off signals, respectively. Therefore, analog switches 72 and 73 go on alternately for a turn-on period. In other words, a turn-on infrared-light-emitting-diode is switched at every turn-on period. Pull-down resistors 77 and 78 connect the bases of the transistors 7 and 8 to the ground, respectively, so as to set the transistors off when analog switches 72 and 73 are off.

With the configuration described above, the camera control circuit 11 generates an operational clock according to the oscillator 12, uses the clock for its operation, and sends the clock to the area sensor IC chip 4 through the operational-clock signal line 13. In the area sensor IC 4, the operational clock is supplied to the sensor driving circuit 17, which controls the area sensor IC chip 4. With this clock, the sensor driving circuit 17 operates as shown in the timing charts of FIGS. 8, 9, and 10.

Figure 9:
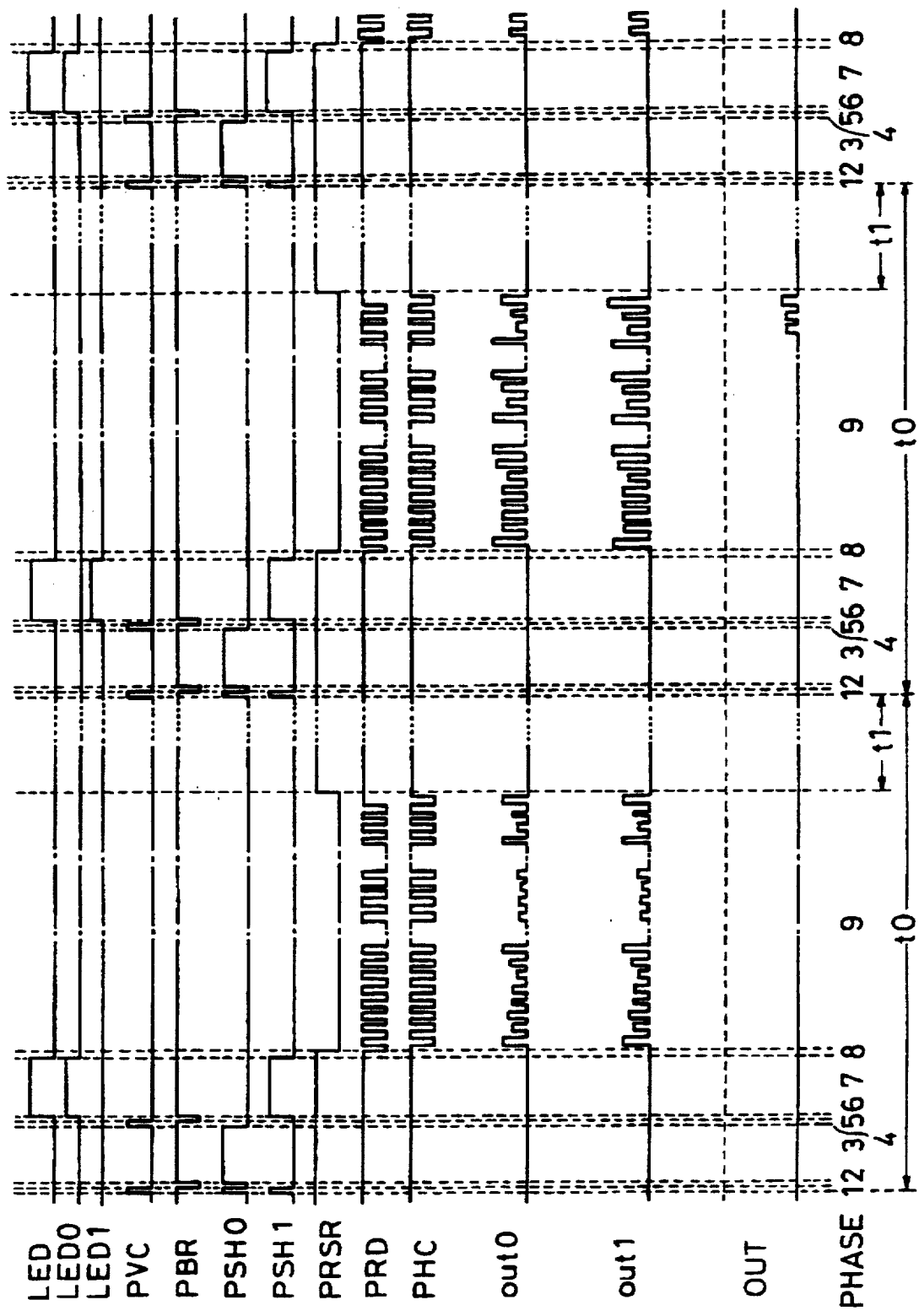
FIG. 9 is a timing chart indicating an operation of the eyeball detection apparatus according to the first embodiment of the present invention.
Figure 10:
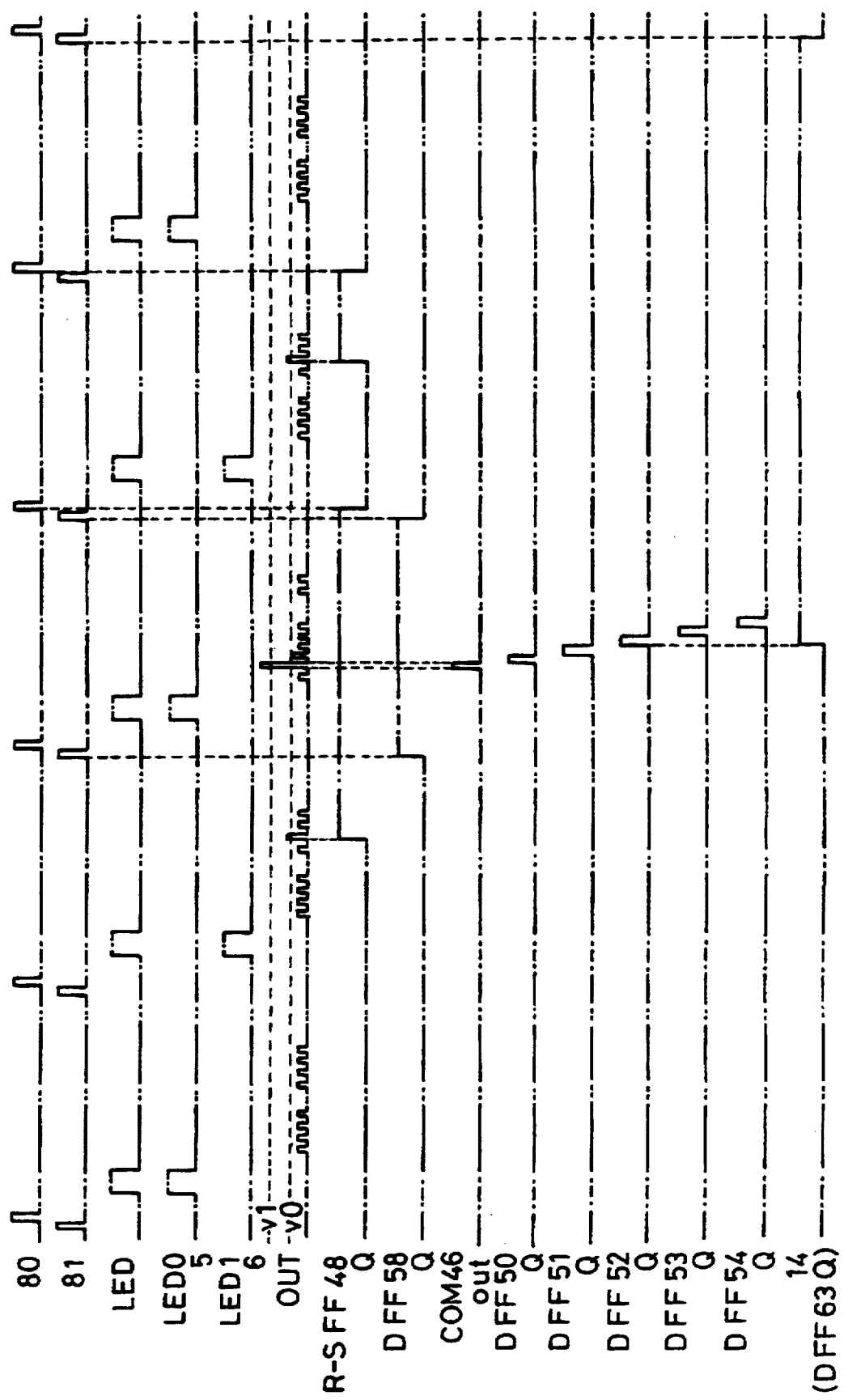
FIG. 10 is a timing chart indicating an operation of the eyeball detection apparatus according to the first embodiment of the present invention.

The infrared-light-emitting-diodes 5 and 6 serving as light sources are turned on at the timing shown by LED0 and LED1, both of which are based on a signal LED in FIG. 9. A turn-on infrared-light-emitting-diode is switched at every turn-on timing according to the D flip-flop 74.

Figure 8:
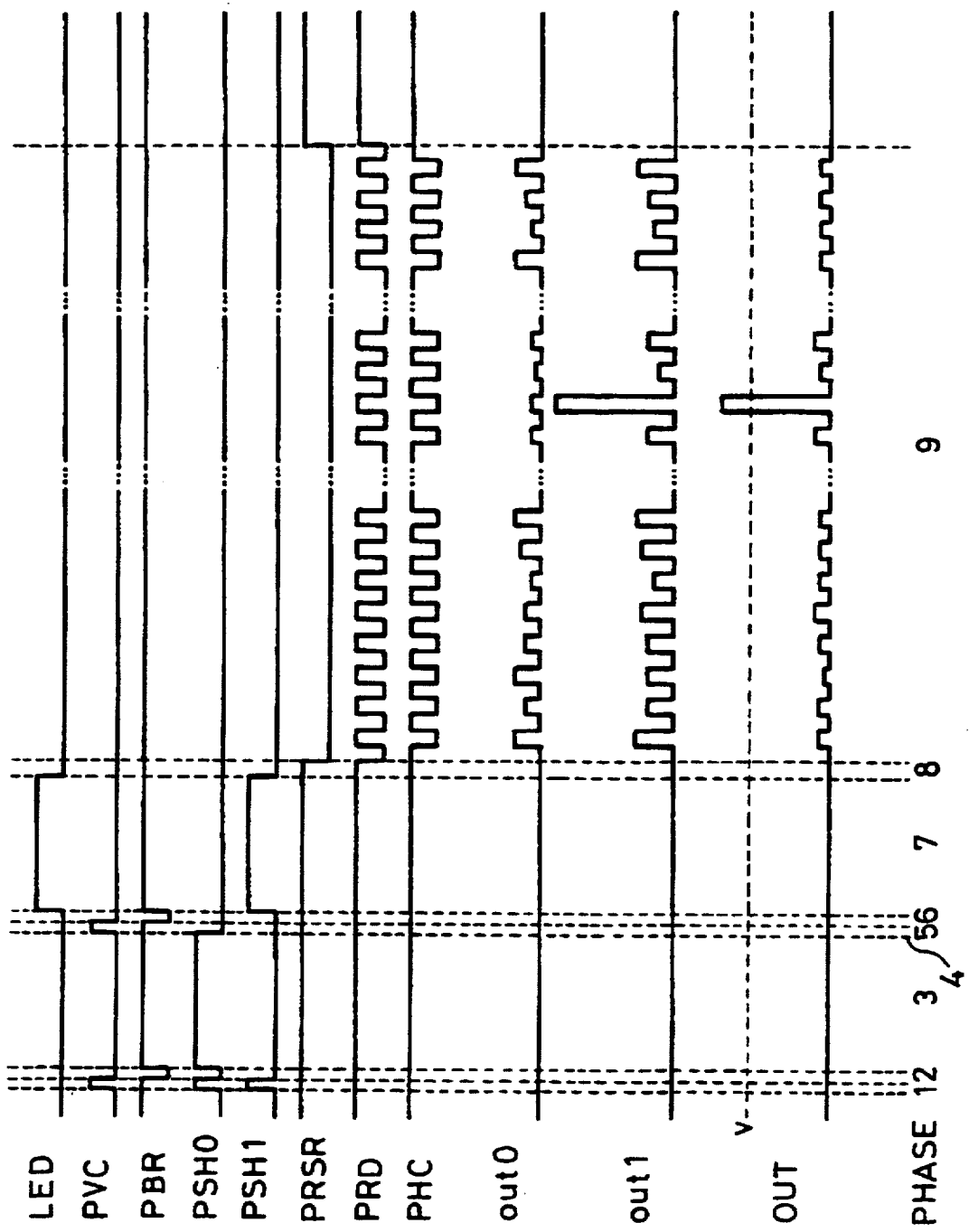
FIG. 8 is a timing chart indicating an operation of the eyeball detection apparatus according to the first embodiment of the present invention.

FIG. 8 has graduations twice as long as those in FIG. 9 in the horizontal axis (time axis). A period $t_0$ shown in FIG. 9 is extended and illustrated in FIG. 8.

Phase 1: The emitter reset signal PVC and the sample and hold signals PSH0 and PSH1 are all set to high, and MOS transistors 32, 33, and 35 and MOS transistors corresponding to these transistors in each block are turned on. The emitter outputs of the transistor 31 and NPN transistors corresponding to the transistor 31 in each pixel sensor section are reset to the ground, and the sample and hold capacitors 34 and 36 and sample and hold capacitors corresponding to these capacitors in each block are also reset to the ground.

Phase 2: Next, the emitter reset signal PVC and the sample and hold signals PSH0 and PSH1 are all returned to low, and the base reset signal PBR is set to low. The base of the NPN transistor (corresponding to transistor 31) in each pixel sensor section and the sensor capacitor (corresponding to capacitor 30) connected thereto are reset to the base reset voltage VBR by a MOS transistor 29 and the MOS transistor corresponding thereto in each pixel.

Phase 3: After the bases are reset, the base reset signal PBR is returned to high, and a sample and hold signal PSH0 is set to high. By an MOS transistor (corresponding to a transistor 33), a sample and hold capacitor (corresponding to a capacitor 34) in each block is connected to the output to which the emitter outputs of all pixels constituting each block are collectively connected, and this state is maintained for a storage period required. In this state, the base of the NPN transistor (corresponding to the transistor 31) in each pixel sensor section and the sensor capacitor (corresponding to the capacitor 30) connected thereto accumulate charges generated in photoelectric conversion according to the amount of light incident on the photosensitive section of each pixel. The voltage increases according to the amount of light and the storage period. According to an increase in the voltage of the base, the emitter output of the NPN transistor (corresponding to the transistor 31) in each pixel sensor section increases so long as the base-emitter junction is positively biased. Among the voltages of the bases of the NPN transistors (corresponding to the transistor 31) in pixel sensor sections in one block, the highest voltage determines the emitter output to which the emitters of the NPN transistors (corresponding to the transistor 31) in the pixel sensor sections in the block are collectively connected. In other words, the signal corresponding to the brightest pixel in each block is obtained from the emitter output of the block as the block signal, and is sent to the sample and hold capacitor (corresponding to the capacitor 34) in the block through an MOS transistor (corresponding to the capacitor 33) in the block.

Phase 4: When the storage period elapses, the sample and hold signal PSH0 is returned to low to turn off MOS transistors (corresponding to the transistor 33). Then, the signal corresponding to the level at the time when the storage period elapses of the brightest pixel in each block is maintained during the storage period at each sample and hold capacitor (corresponding to the capacitor 34).

Phase 5: Next, the emitter reset signal PVC is set to high to turn on the MOS transistor 32 and the MOS transistor in each block corresponding thereto and to reset the emitter outputs of a transistor 31 and the NPN transistor in each pixel sensor section corresponding thereto to the ground.

Phase 6: The emitter reset signal PVC is returned to low and the base reset signal PBR is set to low. The base of the NPN transistor (corresponding to the transistor 31) in each pixel sensor section and the base of the sensor capacitor (corresponding to the capacitor 30) connected thereto are reset to the base reset voltage VBR by an MOS transistor 29 and the MOS transistor in each pixel corresponding thereto.

Phase 7: After the bases are reset, the base reset signal PBR is returned to high and the sample and hold signal PSH1 is set to high. By an MOS transistor (corresponding to the transistor 35), the sample and hold capacitor (corresponding to the capacitor 36) in each block is connected to the output of the block to which the emitter outputs of all pixels constituting the block are collectively connected. At the same time, an illumination light-source on/off signal LED0 or LED1 is set to high to turn on an infrared-light-emitting-diode 7 or 8, serving as an illumination light source. This state is maintained for effectively the same storage period as the storage period for which the sample and hold capacitor (corresponding to a capacitor 34) in each block is connected to the output to which the emitter outputs of all pixels constituting the block are collectively connected, by an MOS transistor (corresponding to a transistor 33) under a condition in which the sample and hold signal PSH0 is set to high.

Phase 8: When the storage period elapses, a sample and hold signal PSH1 is returned to low to turn off MOS transistors (corresponding to the transistor 35). Then, the signal, corresponding to the level at the time when the storage period elapses, of the brightest pixel in each block is maintained at each sample and hold capacitor (corresponding to the capacitor 36) during the storage period, in which an infrared-light-emitting-diode 7 or 8 serving as an illumination light source is turned on.

As described above, the sample and hold capacitors corresponding to the capacitor 34 and the sample and hold capacitors corresponding to the capacitor 36 in all blocks maintain the signal obtained while the illumination light source is on and the signal obtained while the illumination light source is off, respectively.

Phase 9: The shift-register reset signal PRSR is set to low to release the shift register 26 from the reset state, and a read clock PRD is supplied to operate it. A read-line clear signal PHC is output in synchronization with the read clock PRD. A read operation and a read-line clear operation are repeated. The shift register 26 sequentially outputs a read signal Pouty for each block to turn on switching means corresponding to transistors 37 and 38 in each block. The signal obtained while the illumination light source is off and the signal obtained while the illumination light source is on in the block are supplied to the output lines out0 and out1, respectively.

The calculator 41 outputs at the OUT terminal the difference between the signal on the output line out0, which is obtained while the illumination light source is off, and the signal on the output line out1, which is obtained while the illumination light source is on. The OUT output corresponds to a signal obtained only from the light emitted from the illumination light source. This output is sent to the signal decision circuit 20. Before the next block outputs a signal with the shift register 26 being operated, the read-line clear signal PHC turns on MOS transistors 39 and 40 serving as switching means to reset the output lines out0 and out1 to the ground. When a read clock PRD is supplied, the shift register 26 outputs the next read signal Pout(y+1) so that the output lines out0 and out1 have signals sent from the next block. The signal for the next block obtained only from the light emitted from the illumination light source is output at the OUT terminal. As described above, by supplying the read clock PRD and the read-line clear signal PHC repeatedly, the signal for each block is sequentially output.

With the operations described in phases 1 to 9 above, the image information of an eyeball which has approached to the viewfinder is obtained for each block. According to this information, it is determined whether the eyeball has approached or not. When a timer 18 counts a period $t_1$ as shown in FIG. 9, this determination is repeated. The determination process is repeated at an interval of $t_0$.

Among many features of an eye image, there is a Purkinje image, which is the specular reflection image of an illumination light source by the cornea. The cornea serves as a convex mirror surface having a radius of about 8 mm. The Purkinje image, which is a reflection image of a relatively small illumination light source, such as an infrared-light-emitting-diode, appears as a small-area bright point having high luminance on the screen Eye approach can be detected by detecting this bright point.

The signal decision circuit 20 determines whether the eye has approached or not according to the signal output from each block, which is sequentially output at the OUT terminal, and sends the result to the eye-approach detection signal line 14. In the configuration of the signal decision circuit 20 shown in FIG. 6, the signal decision circuit 20 includes the first decision means 44, the second decision means 47, and the other portion controlling them. When the first decision means 44 makes a decision, in other words, when the Q output of the D flip-flop 58, which indicates a decision mode, is zero, the output of the second decision means is sent to the infrared-light-emitting-diode driving circuit 21. In the infrared-light-emitting-diode driving circuit 21, an analog switch 68 is turned off and an analog switch 69 is turned on. Thus the constant-voltage circuit 67 sends an output voltage $v_3$ to the amplifier 71, and a driving current of $i_1$ ($=v_3/r$) flows to an infrared-light-emitting-diode 5 or 6 to be turned on to turn it on at the infrared-light-emitting-diode turn-on timing. A driving current $i_1$ is set to a small value so that it does not much affect the power of the dry cell serving as a power source even when driving is repeated at an interval of $t_0$ with a storage period of $t_2$. When $i_1$=5 mA, $t_2$=100 µs, and $t_0$=100 ms, for example, the average current consumption at an infrared-light-emitting-diode is 5 µA, which is small enough not to much affect the power of the dry cell.

An image is obtained with a small amount of illumination light, and a comparator 43 determines whether the signal sequentially output from each block at the OUT terminal exceeds the specified signal level $v_0$. When a signal exceeds the specified level, it is determined to represent an eye approach and the R-S flip-flop 48 is set. In this embodiment, the output from each block corresponds to the luminance of the brightest point among pixels constituting a block, and it can be determined from the outputs of all blocks whether a point having high luminance among all pixels exceeds the specified level $v_0$. Since the signal at the OUT terminal is obtained only from the signal light emitted from the illumination light source from which external light is eliminated, a bright point having the specified signal level or more is regarded as a Purkinje image and eye approach is determined from the existence of such a signal. When the output of a block has the specified level $v_0$ or more as in the second cycle in the timing chart shown in FIG. 10, for example, the comparator 43 determines that the eye has approached and sets the R-S flip-flop 48 to hold the data. The Q output of the D flip-flop 58, which indicates a decision mode, becomes value 1 by a clock pulse for one-screen read operation, which is sent from the driving circuit 17 via the signal line 81, and it indicates the second decision mode. In the infrared-light-emitting-diode driving circuit 21, the analog switch 69 is turned off and the analog switch 68 is turned on. The constant-voltage circuit 66 sends the output voltage $v_2$ to the amplifier 71, and a driving current $i_2$ ($=v_2/r$) flows to an infrared-light-emitting-diode 5 or 6 to be turned on to turn it on at the infrared-light-emitting-diode turn-on timing. Current $i_2$ is sufficiently larger that current $i_1$ and the amount of illumination light is larger accordingly. An image output having a superior S/N ratio can be obtained.

An image is obtained with a sufficiently large amount of illumination light, and a comparator 46 compares a signal sequentially output from each block at the OUT terminal with the specified signal level $v_1$ which is generated by the constant-voltage circuit 42 and serves as the luminance decision level for the Purkinje image, and sends the result to the shift register including flip-flops 50 to 54. The shift register including flip-flops 50 to 54 sequentially receives a comparison result for each block in synchronization with the read signal generated by the driving circuit 17 and sent via the signal line 82, and transfers results in it. Therefore, the stages of the shift register including flip-flops 50 to 54 output comparison results for five blocks (rows) disposed continuously in the vertical direction on the sensor in that order. When the D flip-flop 52, the third stage of the shift register including flip-flops 50 to 54, outputs a comparison result D(y) for the y-th block (row), for example, the first-stage D flip-flop 50 outputs a comparison result D(y+2) for the (y+2)-th block (row), the second-stage D flip-flop 51 outputs a comparison result D(y+1) for the (y+1)-th block (row), the fourth-stage D flip-flop 53 outputs a comparison result D(y−1) for the (y−1)-th block (row), and the fifth-stage D flip-flop 54 outputs a comparison result D(y−2) for the (y−2)-th block (row). From gates 55, 56, and 57, the following output is obtained.

$$D(y) \cdot \overline{(D(y-1)+D(y+1))} \cdot \overline{D(y-2)} \cdot \overline{D(y+2)}$$

In other words, when only the y-th block or only the y-th block and an adjacent block include pixels having high luminance, an output is given to the eye-approach detection signal line 14. In this embodiment, the output from each block corresponds to the luminance of the brightest point among pixels constituting the block, and it can be determined from the outputs of all blocks whether a point having high luminance among all pixels has the specified level $v_1$ or more. A bright point is detected only when the point has in size the specified value (twice the length of a block in the direction perpendicular to the longitudinal direction) or less in the direction perpendicular to the longitudinal direction, that is, the vertical direction on the screen. Since a signal at the OUT terminal is obtained only from the signal light emitted from the illumination light source from which external light is eliminated, a bright point having the specified signal level or more and having a size equal to or smaller than the specified value is regarded as a Purkinje image and eye approach is decided from the existence of such a signal. The reason why the upper limit of the size of a bright point is set to the size of two pixels (two blocks (rows)), whereas it is considered that the Purkinje image has the same size as one pixel, is that a bright point can be located between pixels as a matter of course. As described above, in the second decision mode using the second decision means, a more precise eye-approach decision is made by more precise luminance decision due to an image output having a superior S/N ratio by bright illumination and a bright-point size decision using the same. When only an output from a block has the specified level $v_1$ or more as in the third cycle in the timing chart shown in FIG. 10, for example, a decision result by the comparator 46 is input to the shift register including flip-flops 50 to 54. When its output is sent to the D flip-flop 52, it is confirmed that only the block outputs a signal equal to the specified level $v_1$ or more. The AND gate 57 outputs value 1 to set the R-S flip-flop 63 and an eye-approach detection signal is output to the signal line 14. In this state, when a clock pulse for one screen read operation is obtained via the signal line 81, the Q output of the R-S flip-flop 63 becomes value 1 and the output of the negative-level-input AND gate 61 becomes value 0. Since the output of the AND gate 49 also becomes value 0, the Q output of the D flip-flop 58 becomes value 0. This means that the first decision mode is in effect. The R-S flip-flop 48, which is reset by the logical product by the AND gate 59 of the $\overline{Q}$ output of the D flip-flop 58 and a clock pulse for one screen read operation sent via the signal line 80, which is delayed in phase from a clock pulse for one screen read operation sent via the signal line 81, is reset by receiving a clock pulse for one screen read operation sent via the signal line 80. With this operation, the next signal storage and read operations are performed in the first decision mode while an eye-approach detection signal on the signal line 14 is maintained. When storage and read operations are conducted in the first decision mode as in the fourth cycle shown in FIG. 10, if a block has a voltage exceeding $v_0$, the R-S flip-flop 48 is set at that time. Even when the D flip-flop 58 receives a clock pulse for one screen read operation via the signal line 81, since the Q output of the R-S flip-flop 63 is sent to the D input via the gates 61 and 49, the state indicating the first decision mode is maintained. Since the $\overline{Q}$ output of the R-S flip-flop 48 is zero, the R-S flip-flop 63 does not receive a reset signal from the AND gate 62, and the eye-approach detection signal on the signal line 14 is maintained. When storage and read operations are conducted in the first decision mode as in the fifth cycle shown in FIG. 10, if no block has a voltage exceeding $v_0$, the R-S flip-flop 48, which is reset by the logical product by an AND gate 59 of the $\overline{Q}$ output of the D flip-flop 58 and a clock pulse for one screen read operation sent via the signal line 80, is not set during the read operation. Since the $\overline{Q}$ output of the R-S flip-flop 48 is value 1, the R-S flip-flop 63 receives a clock pulse for one screen read operation via the signal line 81 and a reset signal from the AND gate 62. The eye-approach detection signal on the signal line 14 is reset. Storage and read operations are repeated in the first decision mode until eye-approach is detected again in the first decision mode.

Second Embodiment

Figure 11:
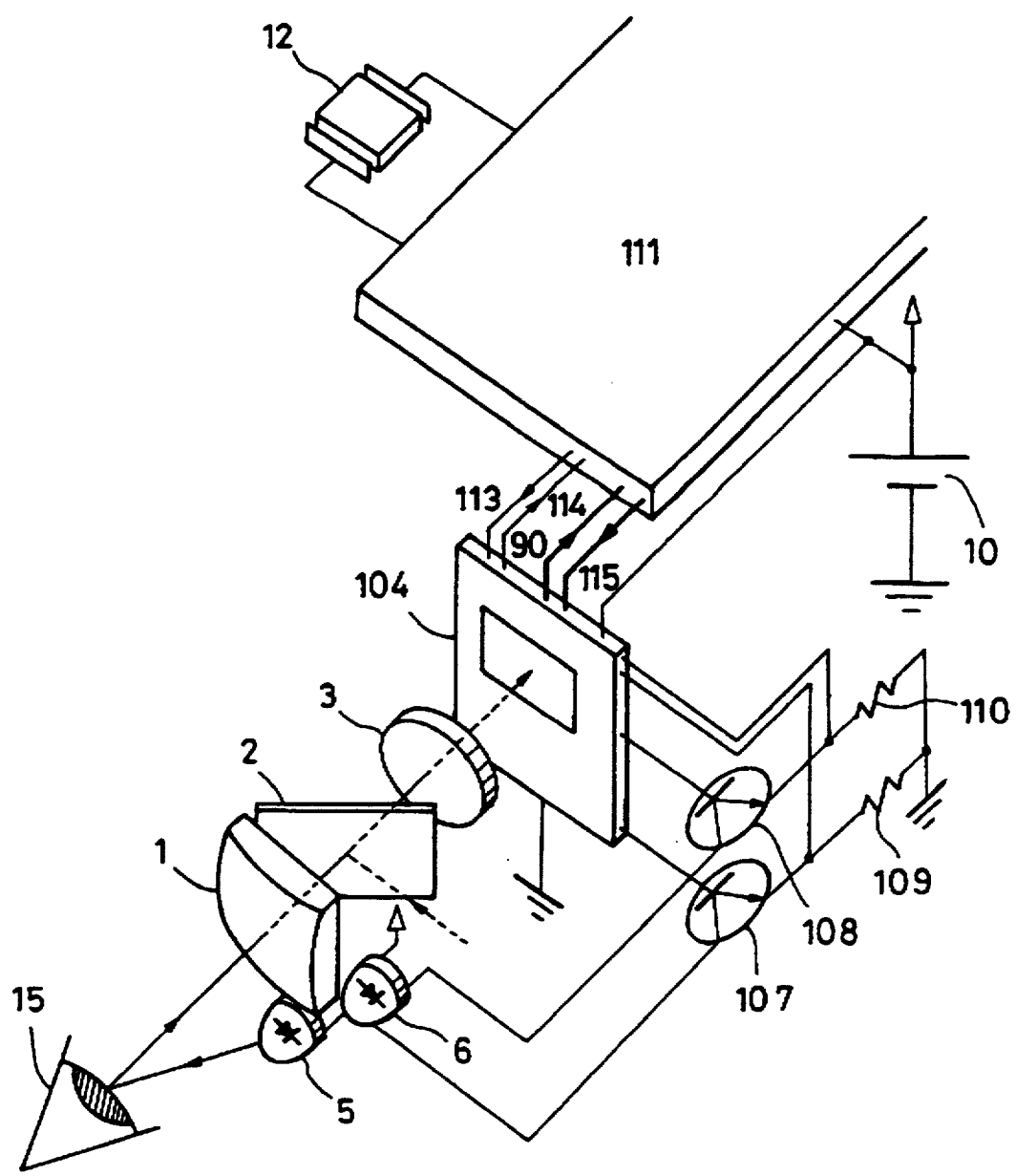
FIG. 11 is a view showing an eyeball detection apparatus according to a second embodiment of the present invention.

FIG. 11 shows a camera having an eyeball detection apparatus according to another embodiment of the present invention.

In FIG. 11, since a camera-finder eyepiece 1, a dichroic mirror 2, an image-taking lens 3, an area sensor IC chip 104, infrared-light-emitting-diodes 5 and 6, a dry cell 10, an oscillator 12, and an observer's eye 15 play the same roles as those having the same numbers shown in FIG. 1, which illustrates the first embodiment, the descriptions thereof are omitted.

The area sensor IC chip 104 has a light-receiving sensor section for photoelectrically converting an image to generate an image signal. Transistors 107 and 108 drive the infrared-light-emitting-diodes 5 and 6, respectively, by driving signals sent from the area sensor IC chip 104. Resistors 109 and 110 drive the infrared-light-emitting-diodes 5 and 6 at a constant current. There is also shown a camera control circuit 111, an operational-clock signal line 113, an eye-approach detection signal line 114, a control signal line 15, and an image signal line 90.

Figure 12:
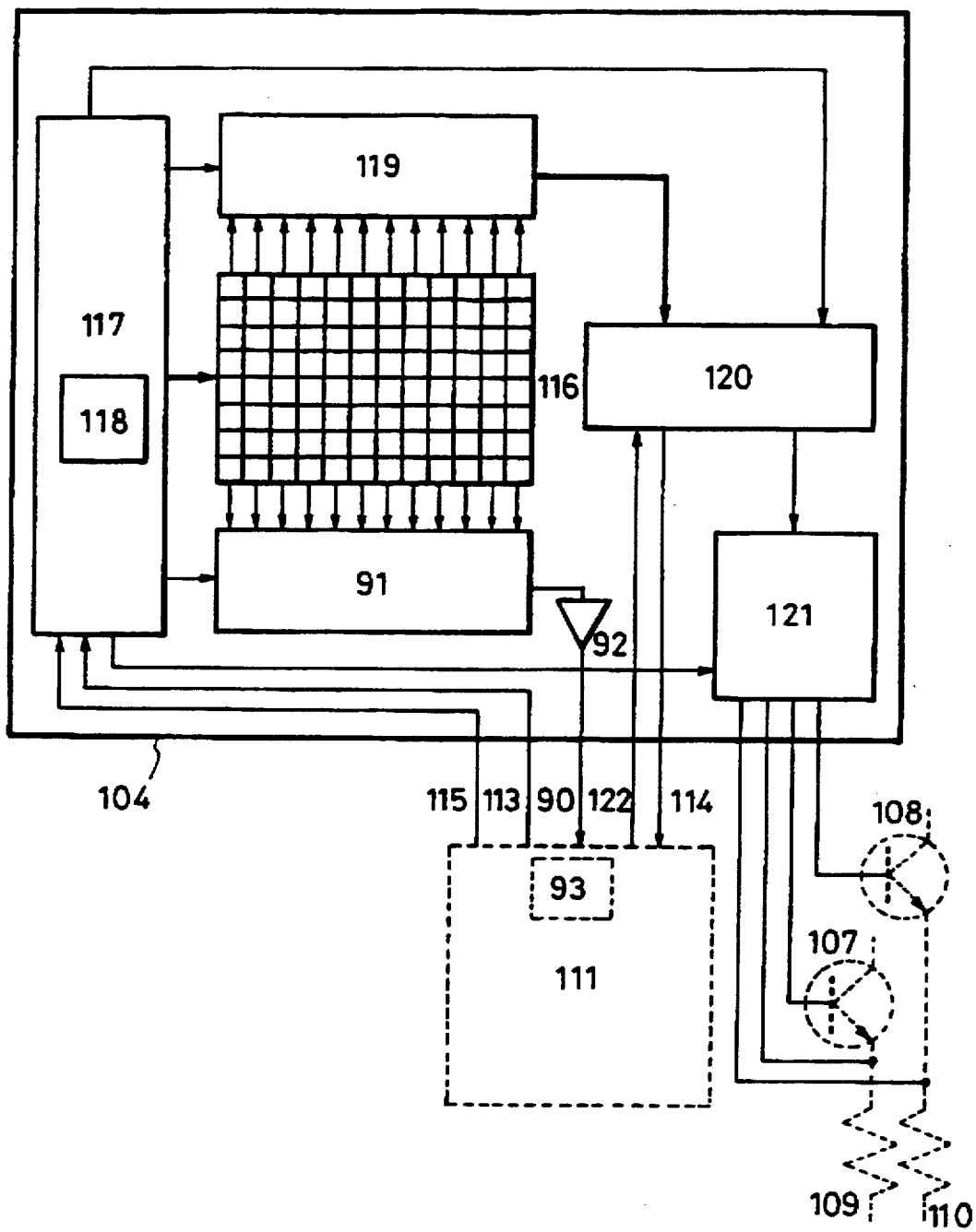
FIG. 12 is a view showing the configuration of an area sensor IC chip 104 used in the eyeball detection apparatus according to the second embodiment of the present invention.

FIG. 12 illustrates a configuration of the area sensor IC chip 104 in the eyeball detection apparatus of the camera shown in FIG. 11. The area sensor IC chip 104 includes the image signal line 90, a pixel read circuit 91, an amplifier 92, an area sensor section 116, a sensor driving circuit 117, a timer 118, a block read circuit 119, a signal decision circuit 120, and an infrared-light-emitting-diode driving circuit 121. The area sensor IC chip 104 is connected to the image signal line 90, the transistors 107 and 108, the camera control circuit 111, the operational-clock signal line 113, the eye-approach detection signal line 114, and the control signal line 115, all of which are disposed at the outside of the area sensor IC chip 104 and are shown in FIG. 11.

In FIG. 12, the area sensor section 116 is disposed in the area sensor IC chip 104 and serves as a light-receiving sensor having a number of pixels. The pixels have about the same size as a bright point which is a Purkinje image. The sensor driving circuit 17 controls storage and read operations in the area sensor section 116, and includes in it the timer 18 for obtaining a time period between repeated operations. The block read circuit 119 sequentially reads an image signal for each block from the area sensor section 116 by a timing signal from the sensor driving circuit 117 and sends the image signal to the signal decision circuit 120. The signal decision circuit 120 determines whether an eye approaches according to the image signal sent from the block read circuit 119. The infrared-light-emitting-diode driving circuit 121 drives the transistors 107 and 108 to turn on the infrared-light-emitting-diodes 5 and 6 in synchronization with the driving timing of the sensor driving circuit 117. The pixel read circuit 91 sequentially reads an image signal for each pixel from the area sensor section 116 by a timing signal from the sensor driving circuit 117 and sends the image signal to an A/D converter 93 in the camera control circuit 111 via the amplifier 92 and the image signal line 90. The A/D converter 93 is disposed in the camera control circuit 111. It receives the image output of the area sensor IC chip 104 via the image signal line 90, converts it to a digital signal, which can be handled by the camera control circuit 111, and sends it to the camera control circuit 111.

Figure 13:
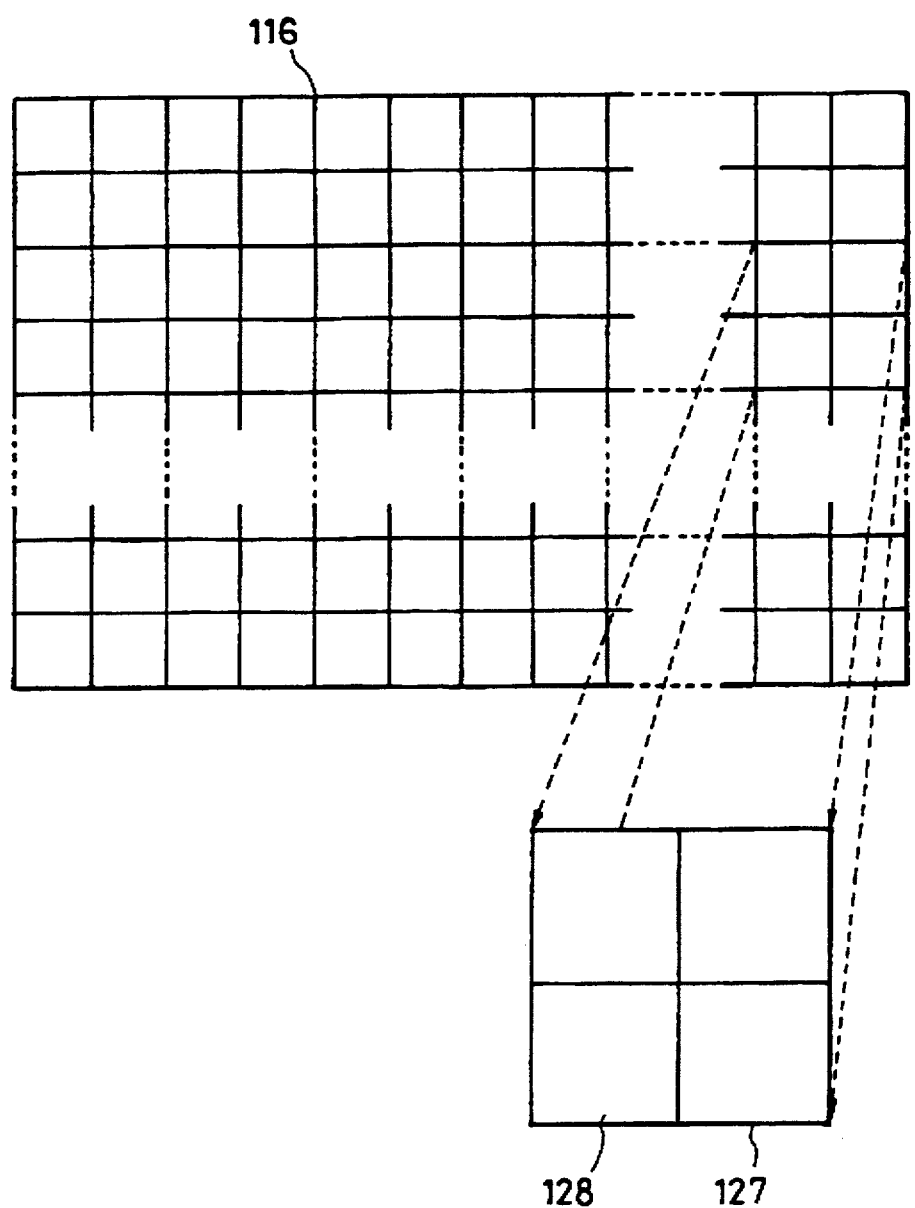
FIG. 13 is a view illustrating how the screen of an area sensor section 116 is divided into a plurality of pixels.

FIG. 13 shows how the screen of the area sensor section 116 is divided into a plurality of pixels. One block includes four pixels, two consecutive pixels in the vertical and horizontal directions.

Figure 14:
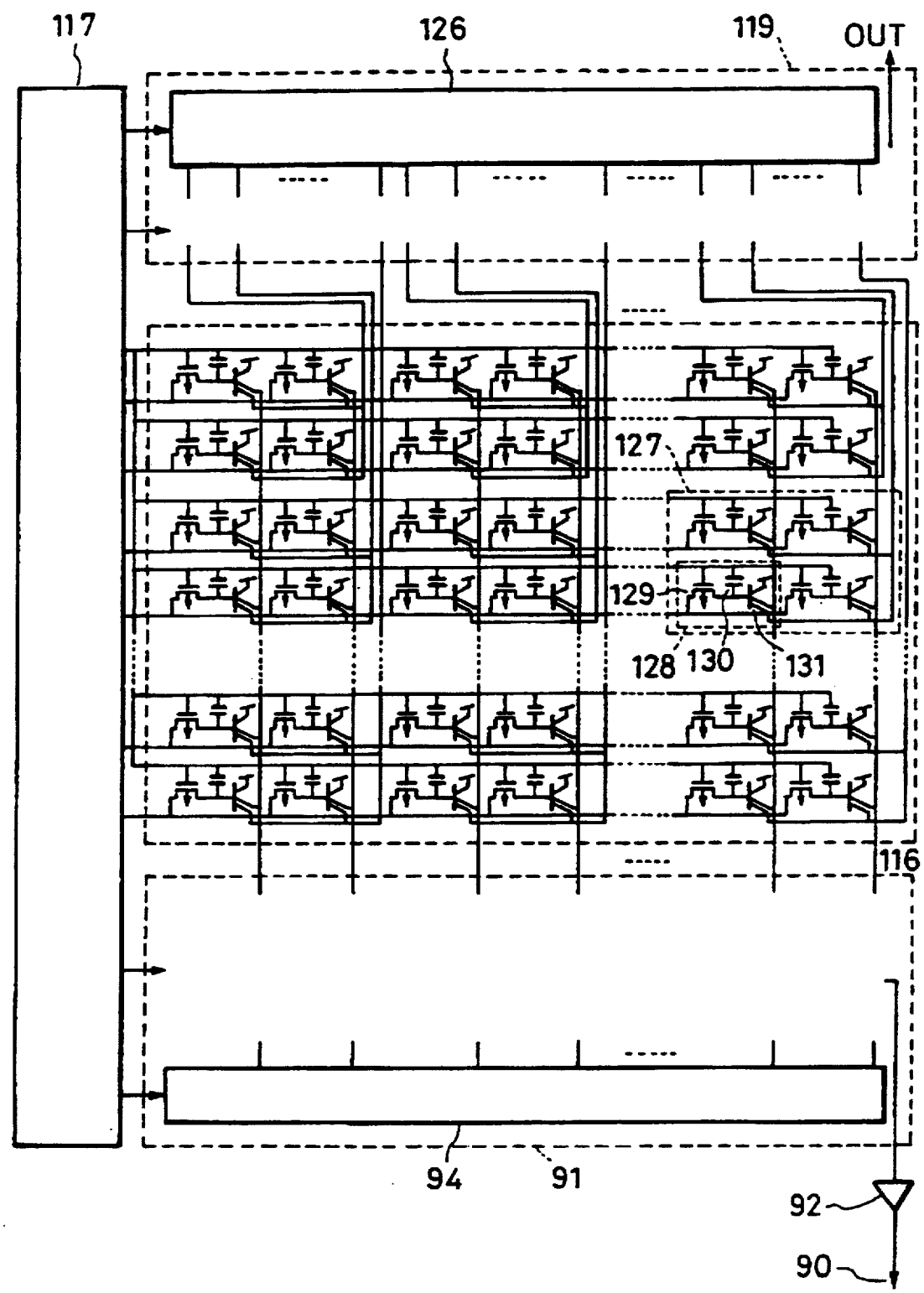
FIG. 14 is a view showing the configuration of an area sensor made up of a nondestructive imaging device.

FIG. 14 shows an area sensor section which is made up of a nondestructive image device. In FIG. 14, there is shown a driving circuit 117 for the nondestructive image device corresponding to the sensor driving circuit 117 shown in FIG. 12, a sensor section 116 of the nondestructive image device corresponding to the area sensor section 116 shown in FIG. 12, a block read circuit 119 for the nondestructive image device corresponding to the read circuit 119 shown in FIG. 12 and corresponding to the read circuit 19 shown in FIG. 2, and a shift register 126 built in the read section 119, for sequentially supplying the read timing to each block. The shift register 126 corresponds to the shift register 26 shown in FIG. 2. A pixel read circuit 91 corresponds to the pixel read section 91 shown in FIG. 12. A shift register 94 sequentially supplies the read timing to each pixel.

The sensor section 116 is made up of a plurality of blocks having the specified number of pixels as shown in FIG. 13. There is shown one block 127 including a plurality of pixels (four pixels in this figure) and one cell 128 constituting one pixel of the image sensor. The block 127 constitutes the sensor section 116. There is shown in FIG. 14 an MOS transistor 129 serving as switching means for resetting the base voltage of a transistor 131 according to a base reset signal sent from the driving circuit 117, a sensor capacity 130, and an NPN transistor 131 serving as a sensor section of a base stored image sensor. The NPN transistor 131 uses its base or a portion connected to the base as a photosensitive section and a signal storage section and outputs from its two emitters a voltage based on the base voltage which accords with the quantity of charges accumulated at the base. One emitter output of each pixel constituting a block is collected in each block and is supplied to the read circuit 119 as the block output. The other emitter output of each pixel is collected in each row and is supplied to the pixel read circuit 91 as the row output.

Figure 15:
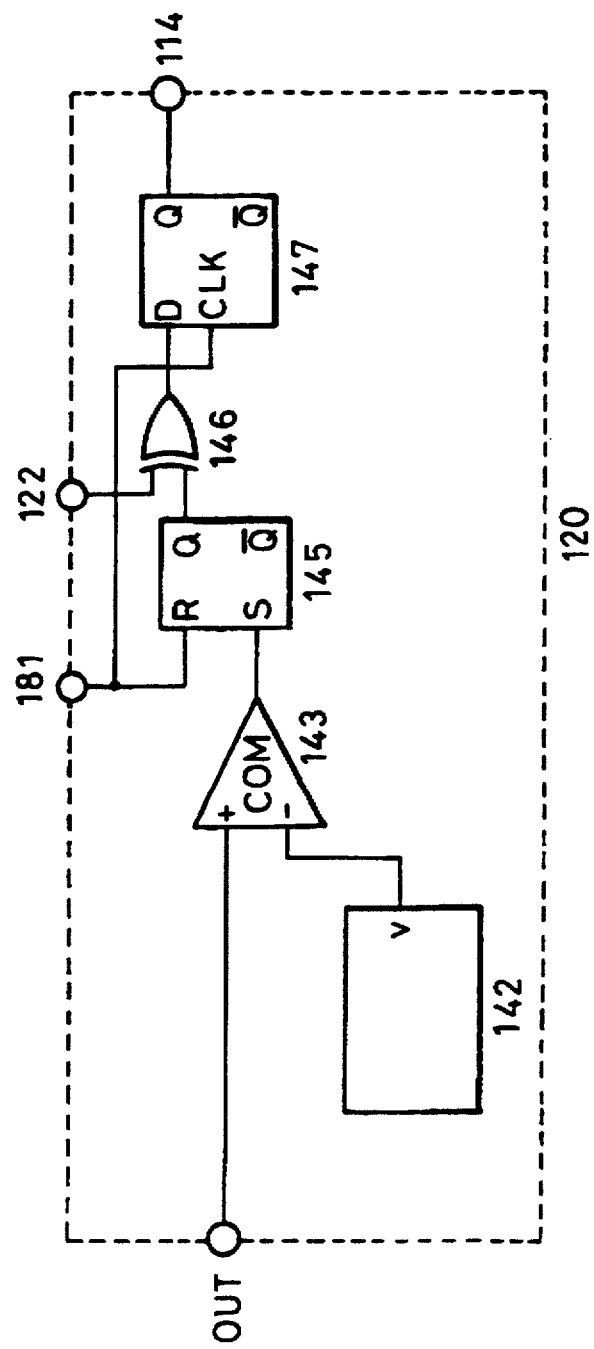
FIG. 15 shows the configuration of a signal decision circuit 120.

FIG. 15 shows a configuration of the signal decision circuit 120 shown in FIG. 12. In FIG. 15, a constant-voltage circuit 142 generates a specific comparison level voltage v and a comparator 143 compares the OUT signal output from the block read circuit 119 with the comparison level v and inputs the result to the set terminal of an R-S flip-flop 145. The R-S flip-flop 145 receives the output of the comparator 143 at the set terminal and the clock pulse for one-screen read operation sent from the sensor driving circuit 117 via the signal line 181 at the reset terminal, and sends the Q output to a gate 146. The exclusive-OR gate 146 receives the Q output of the R-S flip-flop 145 and a detection polarity setting signal 122 sent from the camera control circuit 111, and sends the logical exclusive OR value to a D flip-flop 147. The D flip-flop 147 receives the output of the exclusive-OR gate 146 at the D input and the clock pulse for one-screen read operation sent from the sensor driving circuit 117 via the signal line 181 at the clock input, and sends the Q output to the eye-approach detection signal line 114.

With the above configuration, the camera control circuit 111 generates the operational clock using the oscillator 12, uses the clock for its operations, and sends the clock to the area sensor IC chip 104 via the operational-clock signal line 113. In the IC chip 104, the operational clock is applied to the sensor driving circuit 117, which controls the IC chip 104. The sensor driving circuit 117 operates each section in the area sensor IC chip 104 according to the clock.

Figure 16:
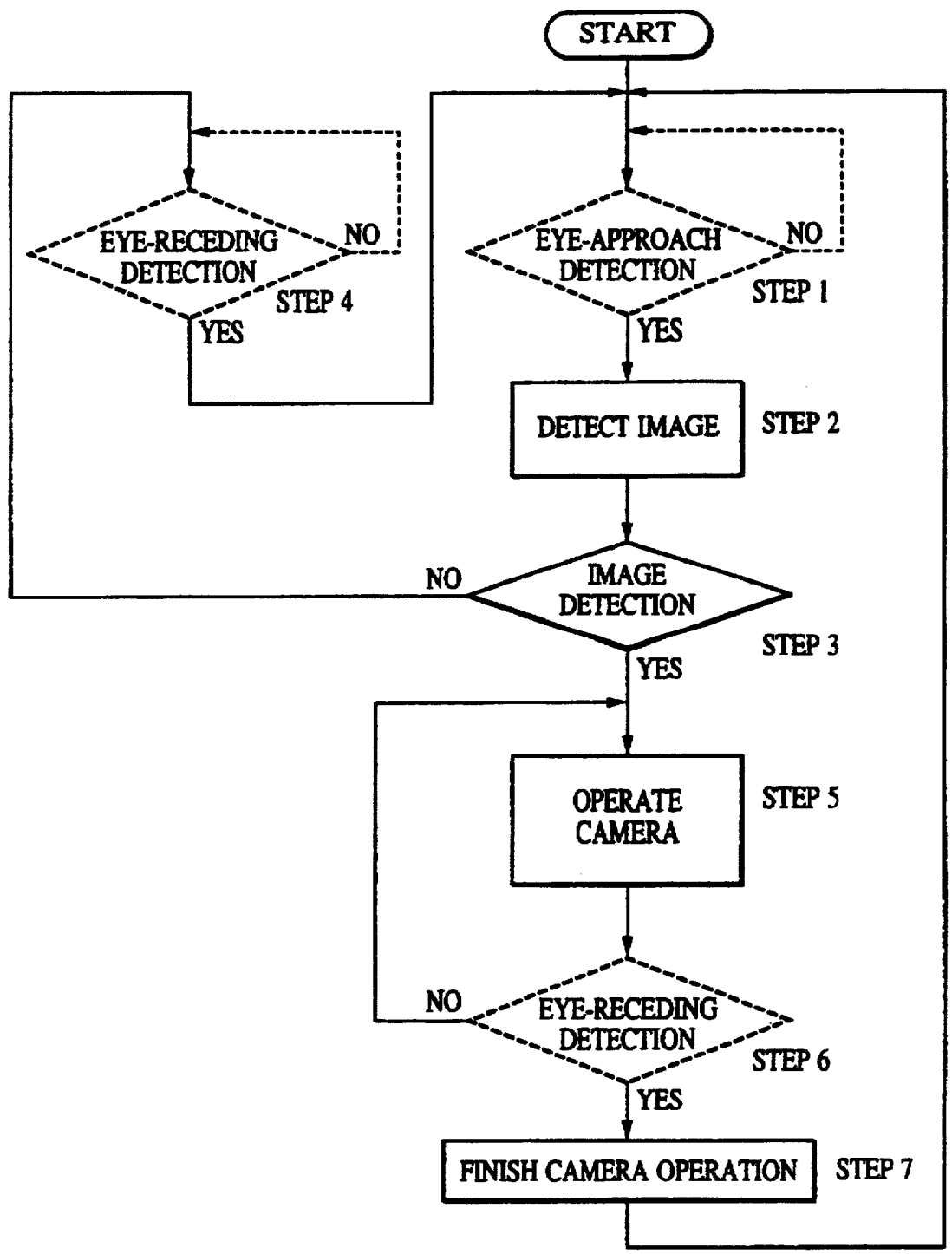
FIG. 16 is a flowchart indicating an operation of the eyeball detection apparatus according to the second embodiment of the present invention.

The operations will be described below by referring to a flowchart shown in FIG. 16.

Step 1: The sensor driving circuit 117 in the area sensor IC chip 104 drives the area sensor section 116 and the block read circuit 119 in the same way as in the first embodiment the sensor driving circuit 17 in the area sensor IC chip 4 drives the area sensor section 16 and the read circuit 19, obtains an image for each block, and sends it to the decision circuit 120. The decision circuit 120 receives the detection polarity setting signal 122 sent from the camera control circuit 111, which in this step 1 has value 0 indicating an eye-approach detection setting signal. The sensor driving circuit 117 sends via the signal line 181 the clock pulse for one-screen read operation which is the same as the clock pulse for one-screen read operation sent from the sensor driving circuit 17 via the signal line 81 in the first embodiment. As in the first decision mode in the first embodiment, the area sensor section 116 obtains an image for each block, and sends the OUT output signal to the comparator 143 in the decision circuit 120 through the block read operation circuit 119. The comparator 143 compares the OUT output signal with the comparison level v created by the constant-voltage circuit 142. If the image signal exceeds the comparison level v, the R-S flip-flop 145 is set. The Q output of the set R-S flip-flop 145 is sent to the exclusive-OR gate 146. The detection polarity setting signal 122 is connected to the other input of the exclusive-OR gate 146. Since the signal 122 has value 0, which indicates the eye-approach detection setting signal, the logical exclusive-OR output of the gate 146 becomes value 1. The D flip-flop 147, which receives the output of the gate 146 at the D input, also receives the clock pulse for one-screen read operation sent via the signal line 181 at the clock input. When the image signal exceeds the comparison level v in a one-screen read operation, the D flip-flop 147 sends the output to the connected eye-approach detection signal line from the Q output. If no image signal exceeds the comparison level v, since the R-S flip-flop 145 is not set by the output of the comparator 143 after it has been reset by the clock pulse for one-screen read operation sent via the signal line 181, the output of the exclusive-OR gate 146 remains value 0, and the Q output, that is, the signal on the eye-approach detection signal line 114, of the D flip-flop 147, which receives the output of the gate 146 at the D input, also remains value 0. In a condition in which the eye-approach detection signal line 114 carries no signal, detection is repeated using a timer 118 in the same way as in the first embodiment detection is again performed after time $t_1$ counted by the timer 18 at an interval of time $t_0$. When the output is sent via the eye-approach detection signal line 114, it is considered that an eye has approached and the Purkinje image, which is the specular reflection image of the illumination light source by the cornea, is detected or the corresponding reflection image is detected, and the camera control circuit 111 proceeds to step 2.

Step 2: The camera control circuit 111 switches the operation of the sensor driving circuit 117 in the sensor IC chip 104 via the control signal line 115. Block image reading in step 1 is completed and an image for each block is obtained by the area sensor section 116, the pixel read circuit 91, and the amplifier 92. Each pixel constituting the area sensor section 116 has the same structure as the pixel 128 shown in FIG. 14. As described above, among the two emitters of a transistor in each pixel, which corresponds to the transistor 131 in the pixel 128, one emitter is connected to emitters in the other pixels in each block and the collectively connected emitters are connected to the block read circuit 119 as the output of each block, and the other emitter of the transistor is connected to emitters in the other pixels on each row and the collectively connected emitters are connected to the pixel read circuit 91 as the output of each row. A transistor and a capacitor corresponding to the transistor 129 and the capacitor 130, which are connected to the base of a transistor in each pixel corresponding to the transistor 131, are connected together in each row to the sensor driving circuit 117 and controlled by the circuit 117.

In block reading in step 1, the whole screen is controlled and the output is sent from each block as in the first embodiment. In step 2, each row is controlled. The bases in each row are biased sufficiently for reading and the output of pixels in the biased row is sent to the pixel output connected in each column. Through a pixel read line for each column, the pixel read circuit reads a signal for each row and then resets it. This operation is repeated until data for all rows and columns are read. The pixel read circuit 91 sequentially reads a signal for each row under the control of the sensor driving circuit 117 and sequentially outputs an image signal for each pixel through the amplifier 92 and the image signal line 90 to the A/D converter 93 of the camera control circuit 111.

The camera control circuit 111 obtains an image in a form of a digital signal by using the A/D converter 93.

Step 3: Whether an image obtained in step 2 is an image of an eye approaching the viewfinder is determined. The determination is done according to the presence of features of an eye image.

Among many features found in an image of an eye, there is a Purkinje image, which is the specular reflection image of an illumination light source formed on the cornea. The cornea serves as a convex mirror surface having an radius of about 8 mm. The Purkinje image, which is a reflection image of a relatively small illumination light source such as an infrared-light-emitting-diode, appears as a small-area bright point having high luminance on the screen. Eye approach can be determined by the presence of this bright point, the presence of a very-low-luminance image having an almost circular shape or having a circular shape with some portions missing, such as an image of the pupil, or the combination thereof.

When the image is determined not to be that of an eye, the processing proceeds to step 4. If the image is determined to be that of an eye, the processing proceeds to step 5.

Step 4: In the same way as in step 1, the sensor driving circuit 117 in the area sensor IC chip 104 drives the area sensor section 116 and the block read circuit 119, obtains an image for each block, and sends it to the decision circuit 120. The decision circuit 120 receives the detection polarity setting signal 122 sent from the camera control circuit 111, which in this step 4 has value 1 indicating an eye-receding detection setting signal. The sensor driving circuit 117 sends via the signal line 181 the clock pulse for one-screen read operation. As in the first decision mode in the first embodiment, the area sensor section 116 obtains an image for each block, and sends the OUT output signal to the comparator 143 in the decision circuit 120 through the block read operation circuit 119. The comparator 143 compares the OUT output signal with the comparison level v created by the constant-voltage circuit 142. If the image signal exceeds the comparison level v, the R-S flip-flop 145 is set. The Q output of the set R-S flip-flop 145 is sent to the exclusive-OR gate 146. The detection polarity setting signal 122 is connected to the other input of the exclusive-OR gate 146. Since the signal 122 has value 1, which indicates the eye-receding detection setting signal, the logical exclusive-OR output of the gate 146 becomes value 0. The D flip-flop 147, which receives the output of the gate 146 at the D input, also receives the clock pulse for one-screen read operation sent via the signal line 181 at the clock input. When the image signal exceeds the comparison level v in a one-screen read operation, the D flip-flop 147 outputs value 0 to the connected eye-approach detection signal line 114 from the Q output. If no image signal exceeds the comparison level v, since the R-S flip-flop 145 is not set by the output of the comparator 143 after it has been reset by the clock pulse for one-screen read operation sent via the signal line 181, the output of the exclusive-OR gate 146 becomes value 1, and the Q output, that is, the signal on the eye-approach detection signal line 114, of the D flip-flop 147, which receives the output of the gate 146 at the D input, also becomes value 1. Under a condition in which the eye-approach detection signal line 114 carries no signal, detection is again performed after time $t_1$ elapses by using the timer 118, and detection is repeated. When the output is sent via the eye-approach detection signal line 114, it is considered that an eye has receded and the Purkinje image, which is the specular reflection image of the illumination light source by the cornea, or the corresponding reflection image is eliminated, and the camera control circuit 111 receives the output, switches the detection polarity setting signal 122, and proceeds to step 1.

As described above, an approach of a reflective object is detected by the first decision in step 1. Then, by the second decision in steps 2 and 3, additional an decision is made with a more precise image. If the approaching object is determined not to be an eye, or eye-approach is not determined, detection is repeated in step 4 at the same level as in the first decision in step 1 until the approaching object recedes from the viewfinder. When the object, which is not an eye, recedes from the viewfinder, the processing returns to the first decision in step 1. With this processing, while the object, which is not an eye, is disposed close to the viewfinder, the second decision, which is more precise, is not repeated. The second decision can be done when necessary.

Step 5: The system operates the camera. More specifically, a lens barrier is opened, the camera is made ready, the amount of light is measured, the distance to an object is measured, a flash unit is charged, and the line of sight is detected.

Step 6: In the same way as in step 4, it is determined whether the approaching object, which is an eye, recedes from the viewfinder. If the eye does not recede, the camera is operated. If the eye recedes, the processing proceeds to step 7.

Step 7: General operations of the camera are finished. More specifically, the lens barrier is shut, and the image-taking lens is retracted. Then, the processing goes back to step 1.

Third Embodiment

Figure 17:
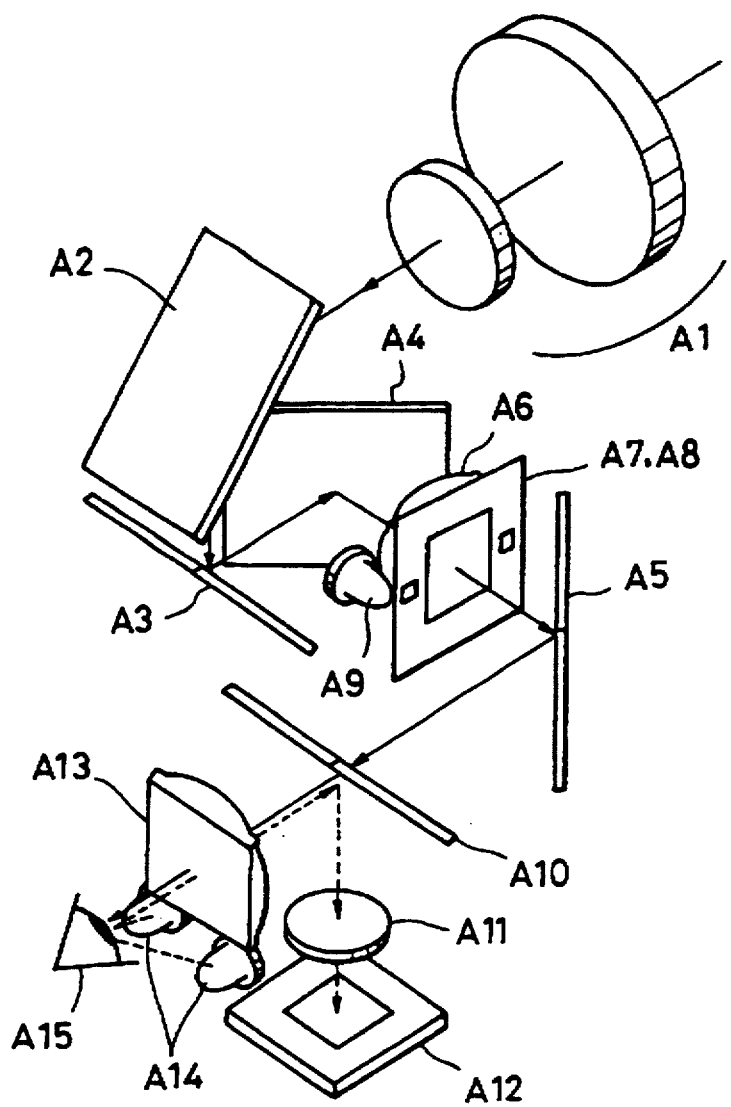
FIG. 17 is an outlined view of a viewfinder optical system of a camera according to a third embodiment of the present invention.
Figure 18:
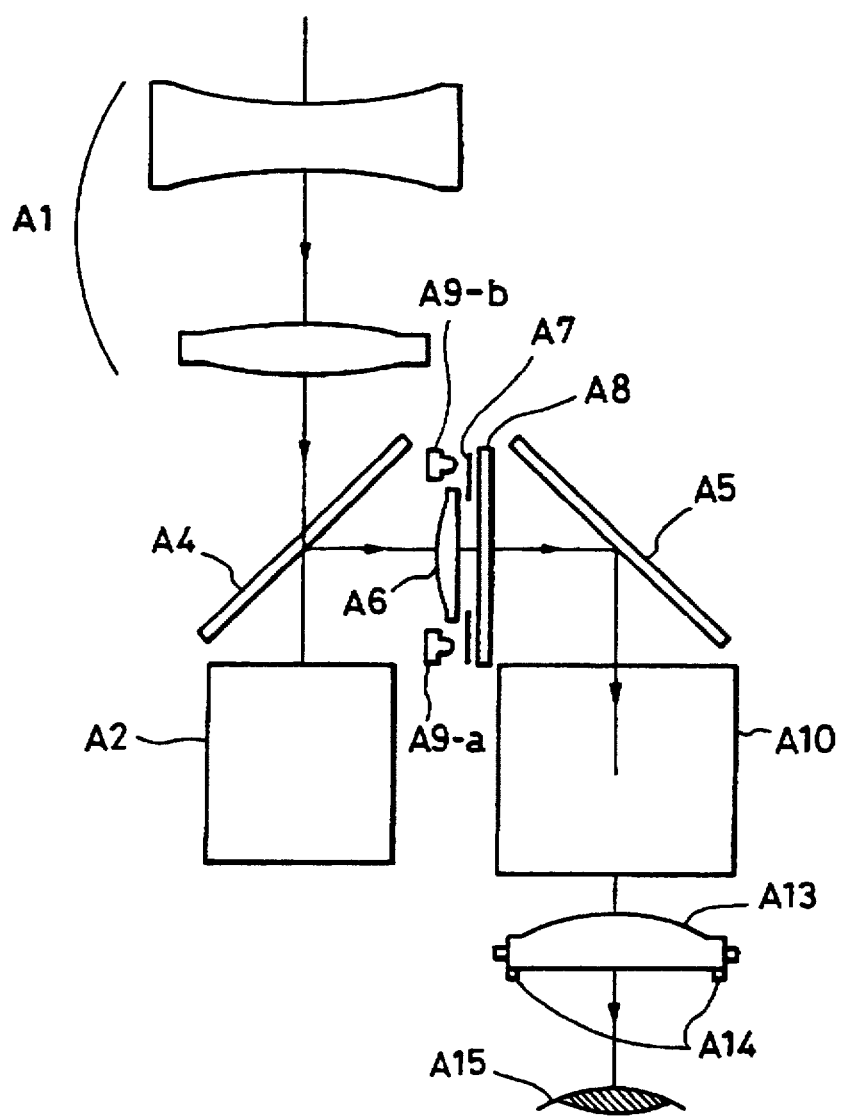
FIG. 18 is a top view of the viewfinder optical system of the camera shown in FIG. 17.

In a third embodiment, an eye-approach detection apparatus according to the present invention is applied to a camera. FIG. 17 shows an outlined configuration of a viewfinder optical system in the camera. FIG. 18 is a top view of the viewfinder optical system.

In FIGS. 17 and 18, an objective optical system A1 of the viewfinder zooms in an interlocking relationship with an image-taking optical system (not shown) of the camera. Reflective mirrors A2 and A3 vertically invert an image which is upside down and left and right inverted, and reflective mirrors A4 and A5 horizontally invert the image to allow the user to see an erected image when the user sees through an eyepiece an image formed by the objective A1. A field lens A6, a field mask A7, an LCD display panel A8, and backlight LEDs A9 are disposed in the vicinity of the surface on which an image is formed by the objective A1. The field mask A7 shows a field frame to specify an observation zone in the field. The LCD display panel A8 shows an eye mark. The backlight LEDs A9 illuminate a display outside the field frame. There is also shown an eyepiece A13 of the viewfinder and an eyeball A15 of the user. An image of the object to be taken is formed by the objective optical system A1 through the field lens A6 on the image-forming surface located in the vicinity of the field mask A7 and the LCD display panel A8. The user can see the formed image through the eyepiece A13 together with the field mask A7 and a display on the LCD display panel A8.

A line-of-sight detection optical system will be next described. There is shown an infrared-light-reflective dichroic mirror A10, a line-of-sight detection image-forming lens A11, a line-of-sight detection image sensor A12, and an illuminating infrared light emitting diodes A14 for line-of-sight detection. An image by infrared light of the eyeball A15 of the user illuminated by the light emitting diodes A14 is formed on the line-of-sight image sensor A12 by the eyepiece A13 and the line-of-sight detection image-forming lens A11, through the eyepiece A13, the infrared-light-reflective dichroic mirror A10 and the line-of-sight detection image-forming lens A11.

Figure 21:
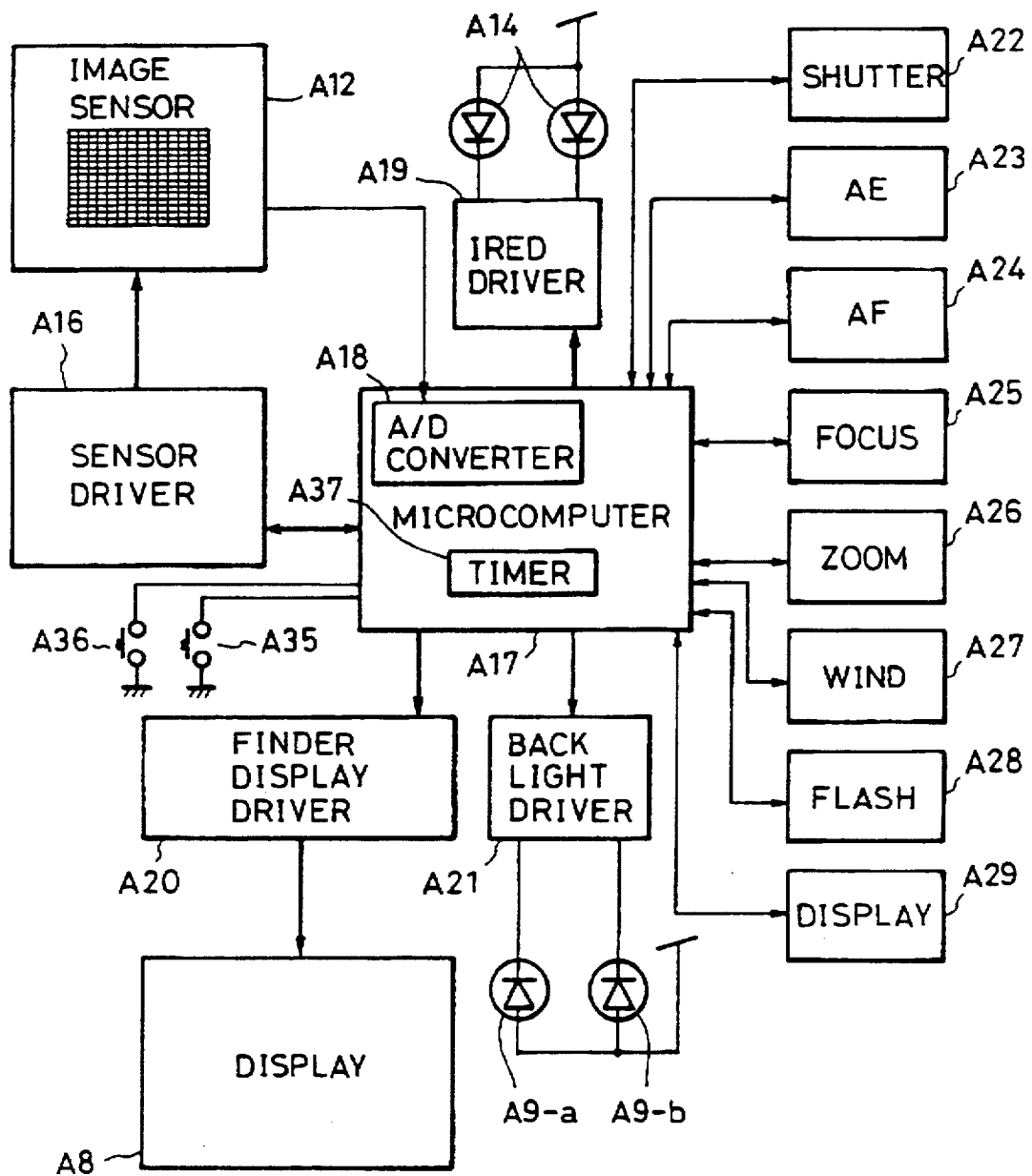
FIG. 21 is a block diagram of an electric circuit for portions related to the viewfinder in the camera shown in FIGS. 17 and 18.

FIG. 21 is a block diagram of an electric circuit indicating only a portion corresponding to the camera viewfinder according to the present embodiment shown in FIGS. 17 and 18.

In FIG. 21, there is shown the line-of-sight detection image sensor A12 shown in FIGS. 17 and 18, the infrared light emitting diodes A14 for illuminating an eyeball to detect the line of sight, shown in FIGS. 17 and 18, an image-sensor driving circuit A16 for driving the image sensor A12, and a microcomputer A17 including in it an A/D converter A18 and a timer A37. The microcomputer A17 is connected to camera control circuits A22 to A29 including an amount-of-light measuring circuit A23, a distance measuring circuit A24, a shutter control circuit A22, and controls camera operations. The microcomputer A17 drives the image sensor A12 through the image-sensor driving circuit A16, and detects the line of sight according to an image of the eyeball taken by the image sensor. The A/D converter A18 built in the microcomputer A17 converts an analog signal sent from camera control circuits such as the amount-of-light measuring circuit A23 and the distance measuring circuit A24 to a digital signal, and converts an image signal obtained by the image sensor A12 to a digital signal. The timer 37 built in the microcomputer A17 operates under the control of the microcomputer A17 and sends a count to the microcomputer A17. Resetting and setting a count and start and stop of counting are controlled by the microcomputer A17.

An infrared-light-emitting diode driving circuit A19 turns on the infrared light emitting diodes A14. An LCD display driving circuit A20 drives the LCD display panel A8 shown in FIGS. 17 and 18. A backlight driving circuit A21 drives the backlight LEDs A9 shown in FIGS. 17 and 18. Camera control circuits include the shutter control section A22, the amount-of-light measuring section A23, the distance measuring section A24, a focus driving section A25, a zoom driving section A26, a wind driving section A27, a flash section A28, and a display section A29. The camera control sections A22 to A29 control the camera, together with the microcomputer A17.

A shutter release switch A36 goes on when its release button is pressed.

Operations of the eye-approach detection apparatus configured as described above will be described below by referring to a flowchart shown in FIG. 22.

Figure 22:
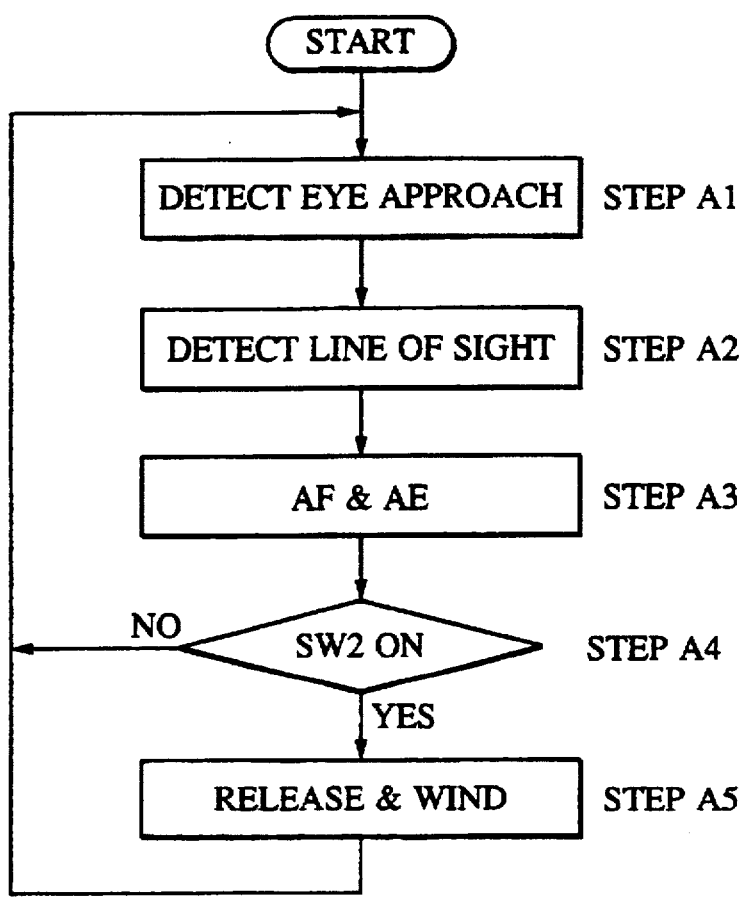
FIG. 22 is a flowchart indicating an operation of the camera according to the third embodiment of the present invention.

The flowchart shown in FIG. 22 indicates camera operations excluding portions which do not directly relate to operations of the eye-approach detection apparatus, such as film winding and rewinding.

Step A1: An eye-approach detection operation is performed. When eye approach is detected, the processing proceeds to step 2. Details of the eye-approach detection operation will be described later by referring to FIG. 19.

Step A2: A line-of-sight detection operation is performed. The line-of-sight information of the user is obtained and the processing proceeds to step A3. Details of the line-of-sight detection operation will be described later by referring to FIG. 19.

Step A3: According to the line-of-sight information obtained in step A2, a point to which the distance is measured and a zone for which the amount of light is measured are determined. The distance is measured and the amount of light is measured by the amount-of-light measuring section A23, the distance measuring section A24, and the focus driving section A25. The processing proceeds to step A4.

Step A4: When the shutter release switch A36 is turned on by pressing the release button of the camera, the processing proceeds to step A5. If not, the processing returns to step A1.

Step A5: The shutter is released by the shutter control section A22 and the winding section A27, and if necessary the flash section A28. Then, the film is wound. The processing returns to step A1.

Figure 19:
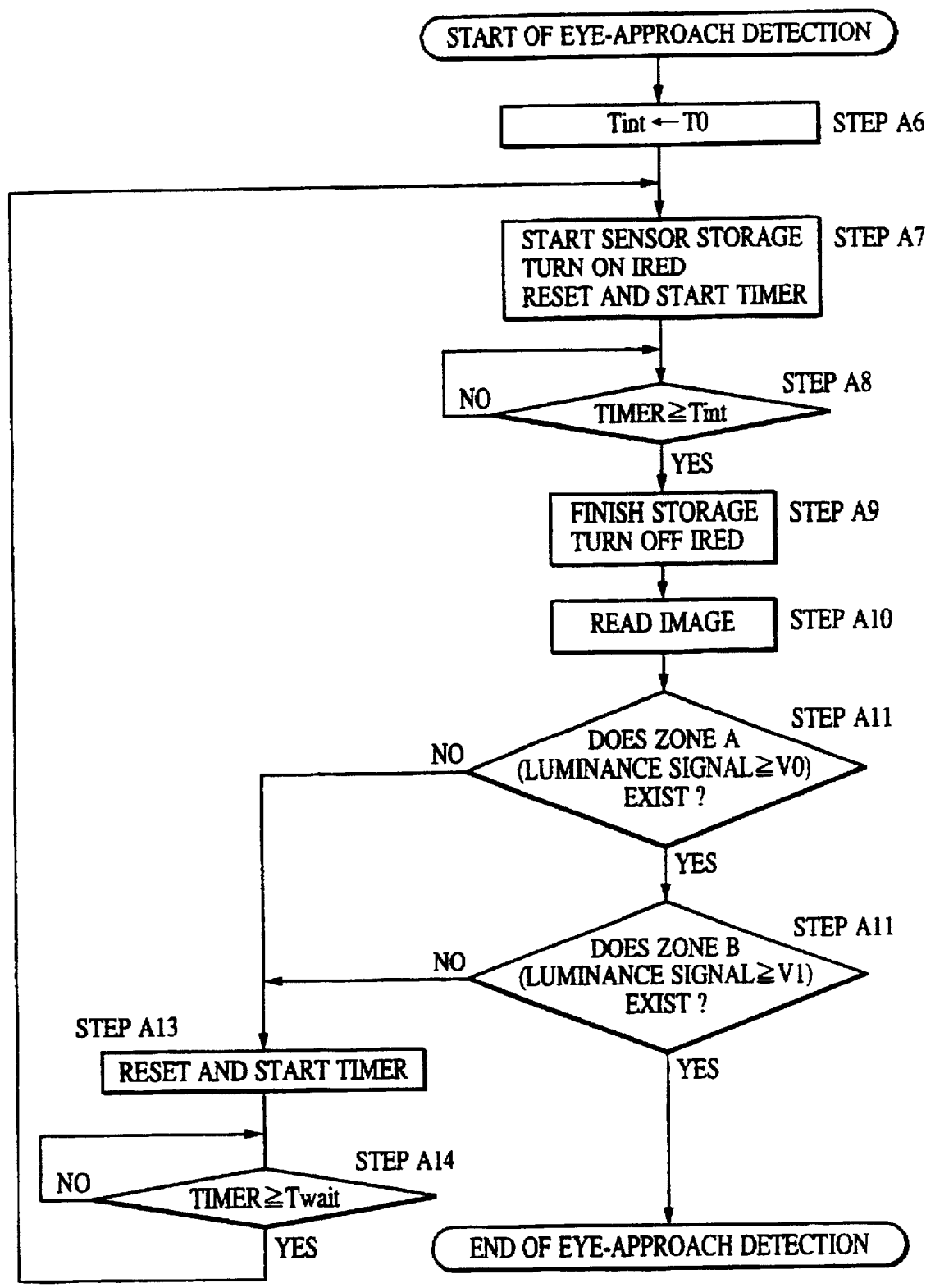
FIG. 19 is a flowchart indicating an eye-approach detection in the camera according to the third embodiment of the present invention.

The eye-approach detection operation in step A1 will be described below by referring to FIG. 19.

Step A6: A storage period (Tint) is set to a specified time $T_0$.

Step A7: The image-sensor driving circuit A16 drives the image sensor A12 to start storage. The infrared-light-emitting-diode driving circuit A19 turns on the infrared light emitting diodes A14. The timer A37 is reset and starts counting the storage period.

Step A8: Whether the count of the timer A37 reaches the storage period (Tint) specified in step A6 is determined repeatedly until the count reaches the specified storage period. When the count reaches the specified storage period, the processing proceeds to step A9.

Step A9: The image-sensor driving circuit A16 drives the image sensor A12 to stop the storage. The infrared-light-emitting-diode driving circuit A19 turns off the infrared light emitting diodes A14.

Step A10: The image-sensor driving circuit A16 drives the image sensor A12 to read an image signal. The image signal output from the image sensor A12 is converted to a digital signal by the A/D converter A18, and then input to the microcomputer A17.

Step A11: It is determined whether the read image signal includes a zone (hereinafter called zone A) having a luminance level (luminance signal $\geq V_0$) corresponding to that of a specular reflection image at the cornea of the infrared light emitting diodes A14 serving as illumination light sources, that is, the Purkinje image. If the signal includes the zone, the processing proceeds to step A12. If not, the processing proceeds to step A13.

Step A12: It is determined whether the read image signal includes a zone (hereinafter called zone B) which includes zone A detected in step A11 and has the luminance level equal to or larger than $V_1$ ($V_1$ is slightly smaller than $V_0$). If the signal includes zone B, it is considered to be in an eye-approach condition and the eye-approach detection operation is finished. If not, the processing proceeds to step A13.

Step A13: The timer A37 is reset and starts counting a detection interval.

Step A14: Whether the count of the timer A37 reaches the specified detection interval (Twait) is determined repeatedly until the count reaches the specified detection interval. When the count reaches the specified interval, the processing proceeds to step A7 and the eye-approach detection operation is again performed.

The eye-approach detection operation is performed as described above from step A7 to step A14.

When the depth of focus in the image-forming optical system for line-of-sight detection including the image-forming lens A11 for line-of-sight detection and the eyepiece A13 is sufficiently deep and the pixel size of the image sensor A12 is sufficiently smaller than the size of the Purkinje image, the luminance level (sensor illuminance) of the Purkinje image depends only on the curvature of the cornea of the eye and the amount of light emitted from the infrared light emitting diodes A14 serving light sources. The curvature of the cornea is about 7.5 mm, almost constant with relatively small differences between persons. When the amount of light emitted from the infrared light emitting diodes A14 is constant, the luminance level (sensor illuminance) of the Purkinje image is almost constant with relatively small differences between persons.

Since the Purkinje image is a specular reflection image, its luminance level is high. In general, as the luminance becomes extremely high, the corresponding image has a luminance level which rises steeply from the level of the surroundings. Since the infrared light emitting diodes serving as light sources whose images are formed on the cornea as the Purkinje images are relatively small, and the cornea serving as a specular reflection surface is a convex surface having a radius as small as about 7.5 mm, the Purkinje images become very small, like points.

Therefore, when a highly luminous small image, that is, an image having a small area and having a luminance level higher than the specified luminance level ($V_0$), is formed, and a zone (zone B) having a luminance level higher than the luminance level $V_1$, which is slightly lower than the high-luminance decision level $V_0$, is slightly broader than a high-luminance zone (zone A), that is, the luminance level steeply rises from the level of the surroundings, the image is detected as a Purkinje image. This means that an eye-approach condition is determined.

Figure 23:
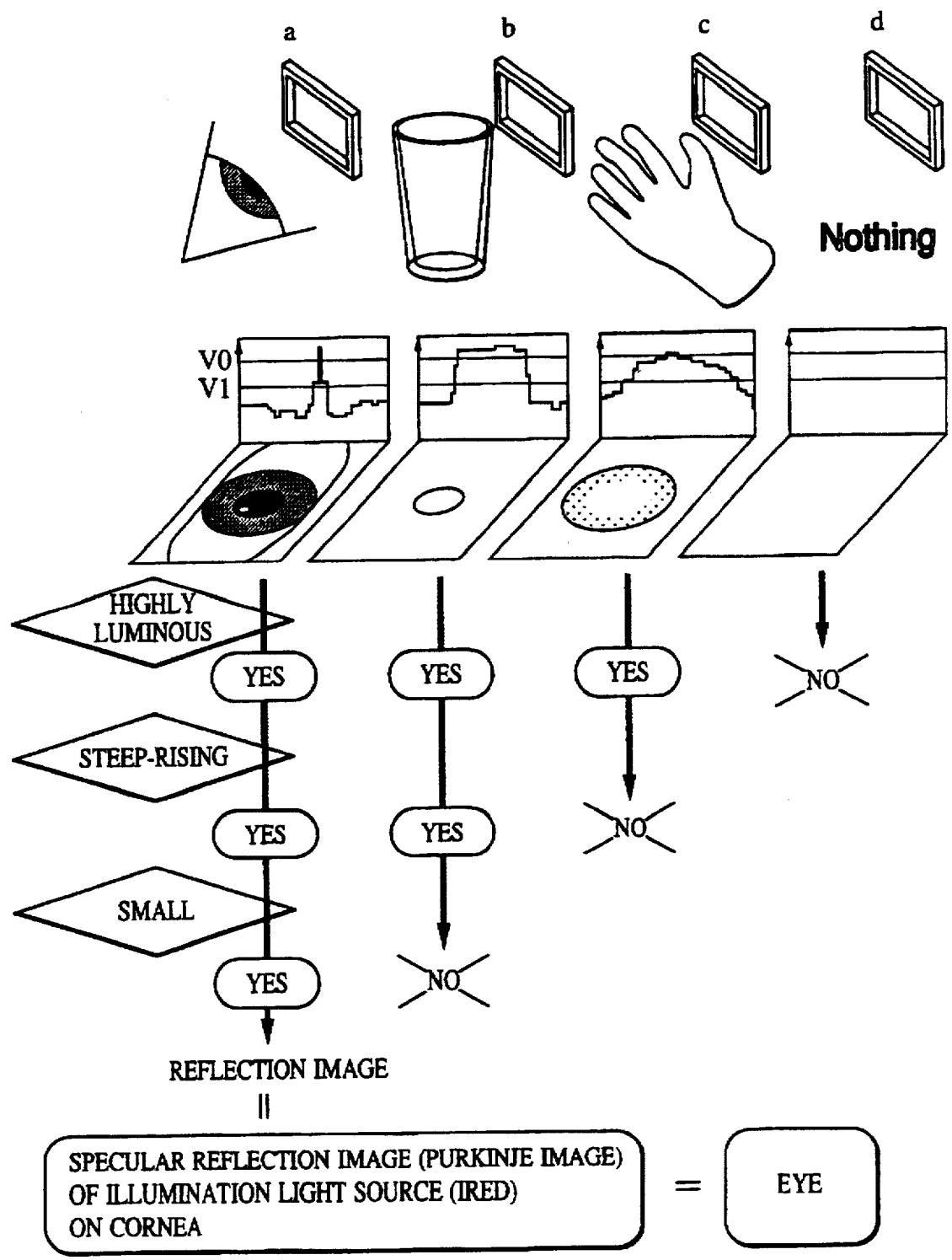
FIG. 23 is a view indicating eye-approach detection in the camera according to the third embodiment of the present invention.

The processing will be more specifically described below by referring to FIG. 23. In FIG. 23, if nothing exists in the vicinity of the viewfinder as shown in case "d" of FIG. 23, illumination light is not reflected and hence a highly luminous zone is not generated. As shown in case "c" of FIG. 23, when a general object, such as a person's hand or clothes, approaches the viewfinder, light is diffuse-reflected at the surface of the object and the luminance level of the reflection image is not very high, or even if the high luminance level is obtained, since the reflection image is a diffuse reflection image and the luminance gradually changes without a definite boundary between the image and the surroundings, a steep rise does not exist.

As shown in case "b" in FIG. 23, when an object which causes specular reflection, such as glass and a window, approaches the viewfinder, a reflection image has a high luminance level and the luminance level steeply rises from the surroundings. Such an image is generally caused by a window or glass. A reflection image of a window or glass, however, is relatively large.

Therefore, as shown in case "a" in FIG. 23, a reflective image is determined to be a Purkinje image when it has a high luminance level and a small area, and the luminance rises steeply from the surroundings, and eye approach is detected.

Since the luminance level of a Purkinje image is relatively constant with small differences between persons, just by comparing the luminance level of a reflection image received in the specified storage period set in advance with the reference value ($V_0$ and $V_1$ in this case), the image is determined to be a Purkinje image.

Figure 20:
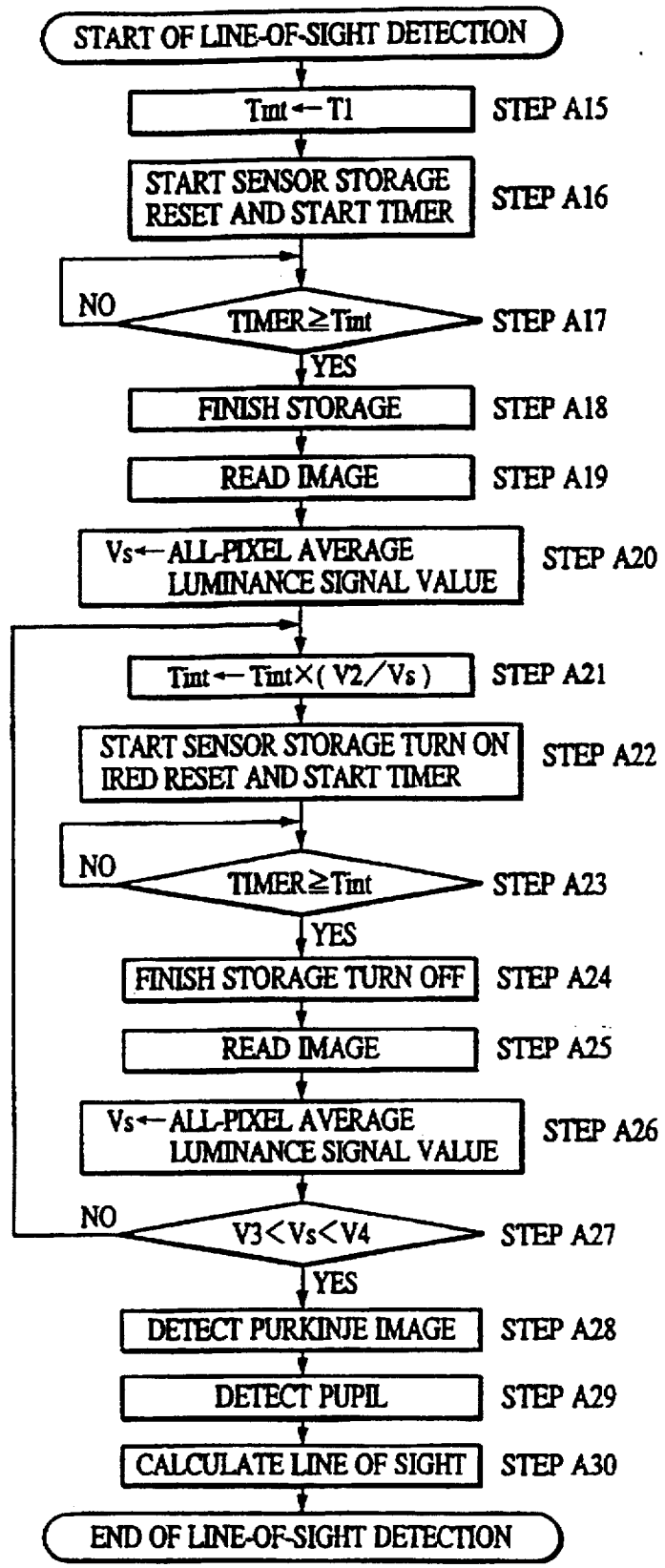
FIG. 20 is a flowchart indicating an eye-approach detection in the camera according to the third embodiment of the present invention.

Operations of line-of-sight detection in step A2 will be described below by referring to FIG. 20.

Step A15: The storage period (Tint) is set to the specified time $T_1$ which is a storage period in auto gain control (AGC).

Step A16: The image-sensor driving circuit A16 drives the image sensor A12 to start storage. The timer A37 is reset and starts counting the storage period.

Step A17: Whether the count of the timer A37 reaches the storage period (Tint) specified in step A15 is determined repeatedly until the count reaches the specified storage period. When the count reaches the specified storage period, the processing proceeds to step A18.

Step A18: The image-sensor driving circuit A16 drives the image sensor A12 to stop the storage.

Step A19: The image-sensor driving circuit A16 drives the image sensor A12 to read an image signal. The Image signal output from the image sensor A12 is converted to a digital signal by the A/D converter A18, and then input to the microcomputer A17.

Step A20: An average luminance level in all pixels is calculated as a value indicating the state of an image, and is called hereinafter $V_5$.

Step A21: According to $V_5$, which indicates the state of an image and is obtained in step A20, the storage period is determined. The storage period equals Tint×($V_2/V_5$), where Tint indicates the previous storage period and $V_2$ represents a value indicating the state of an image appropriate for line-of-sight detection. It is expected that the new storage period enables an image appropriate for line-of-sight detection, that is, an image having a sufficient contrast, to be obtained.

Step A22: The image-sensor driving circuit A16 drives the image sensor A12 to start storage. The infrared-light-emitting-diode driving circuit A19 turns on the infrared light emitting diodes A14. The timer A37 is reset and starts counting the storage period.

Step A23: Whether the count of the timer A37 reaches the storage period (Tint) specified in step A21 is determined repeatedly until the count reaches the specified storage period. When the count reaches the specified storage period, the processing proceeds to step A24.

Step A24: The image-sensor driving circuit A16 drives the image sensor A12 to stop the storage. The infrared-light-emitting-diode driving circuit A19 turns off the infrared light emitting diodes A14.

Step A25: The image-sensor driving circuit A16 drives the image sensor A12 to read an image signal. The image signal output from the image sensor A12 is converted to a digital signal by the A/D converter A18, and then input to the microcomputer A17.

Step A26: An average luminance level in all pixels is calculated as a value indicating the state of an image, and is called hereinafter $V_5$.

Step 27: It is determined whether $V_5$, which indicates the state of an image, falls in a range ($V_3 > V_5 > V_4$) appropriate for correct line-of-sight detection. When $V_5$ is out of range, storage is performed again from step A21 with the storage period being modified. When $V_5$ falls in the range, the processing proceeds to step A28.

Step 28: According to the obtained eyeball image information, a Purkinje image formed on the cornea of the eyeball by the infrared light emitting diodes A14 serving as illumination light sources is detected.

Step 29: According to the obtained image information, an image of the pupil is detected.

Step 30: From the mutual positional relationship between the Purkinje image and the pupil image detected in steps A28 and A29, the line-of-sight information of the user is calculated.

Fourth Embodiment

Figure 24:
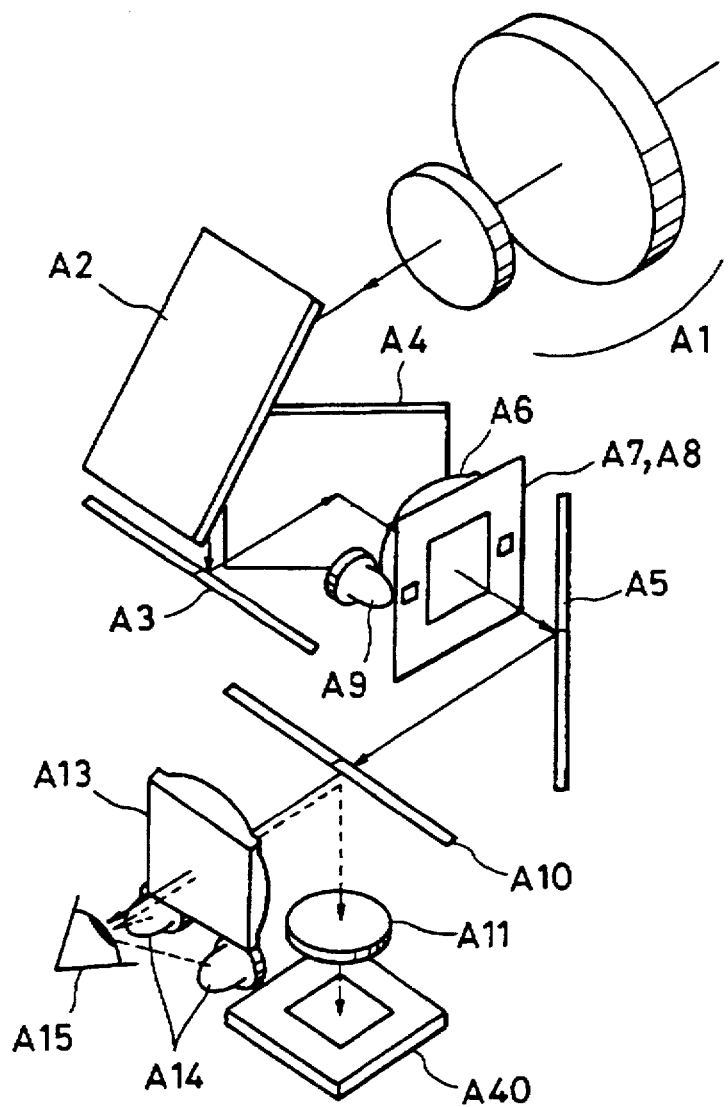
FIG. 24 is an outlined view of a viewfinder optical system of a camera according to a fourth embodiment of the present invention.
Figure 25:
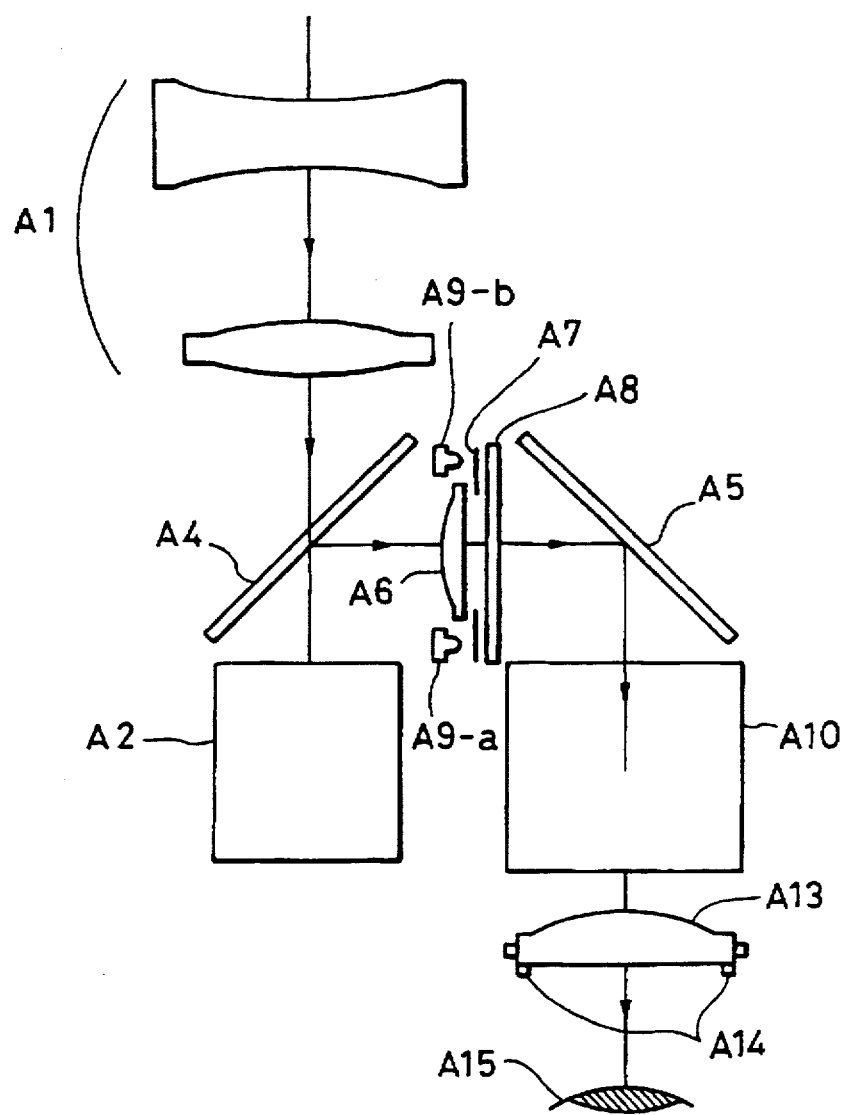
FIG. 25 is a top view of the viewfinder optical system of the camera shown in FIG. 24.

In a fourth embodiment, an eye-approach detection apparatus according to the present invention is applied to a camera. FIG. 24 shows an outlined configuration of a viewfinder optical system in the camera. FIG. 25 is a top view of the viewfinder optical system.

In FIGS. 24 and 25, since portions A1 to A11 and A13 to A15 are the same as the corresponding portions shown in FIGS. 17 and 18, the same symbols are used and the descriptions thereof are omitted. In the same way, portions having the same symbols as those described in the third embodiment are the same as those in the third embodiment. An area sensor IC chip A40 includes a light-receiving sensor section for photoelectrically converting an image to generate an image signal.

Figure 26:
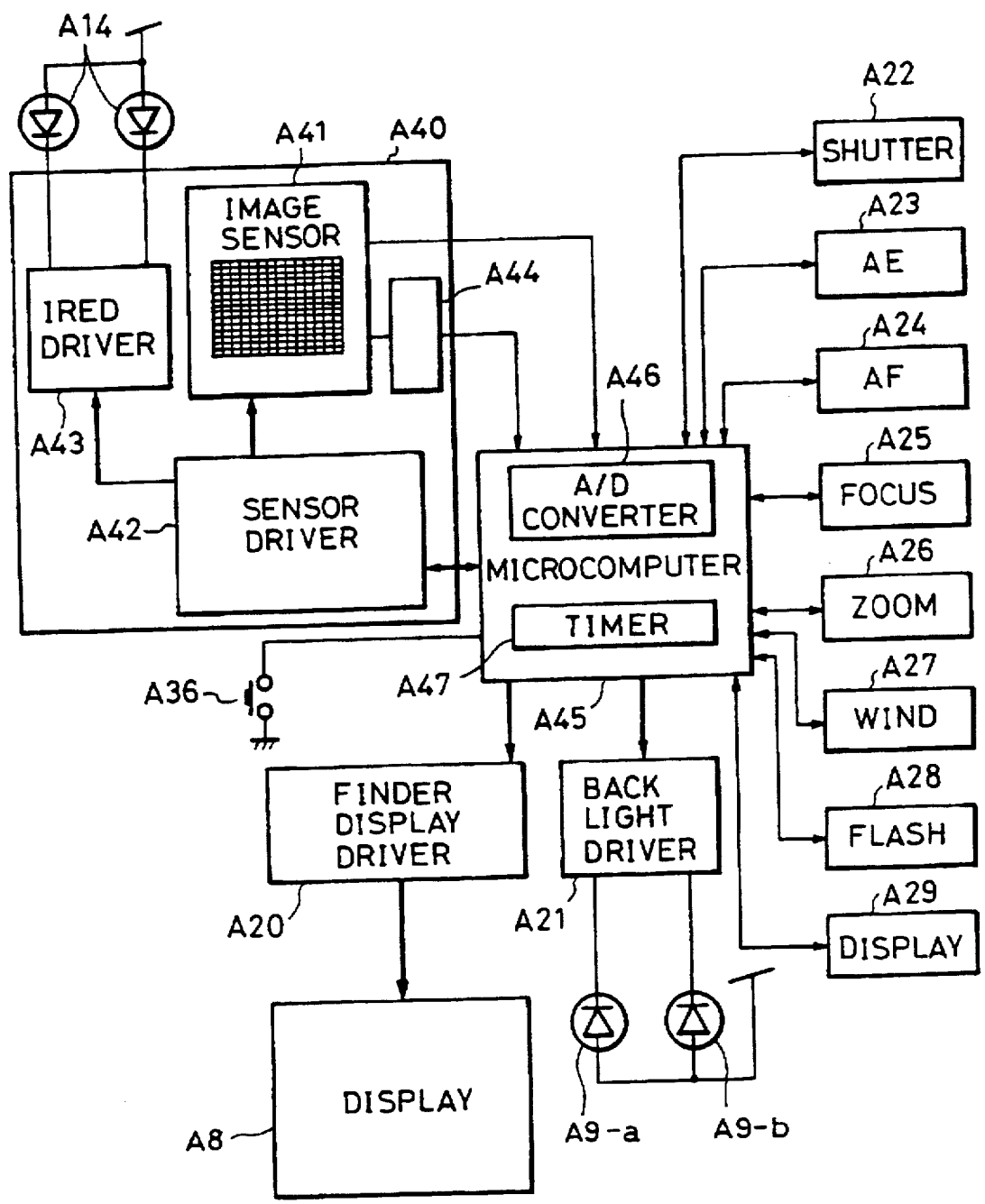
FIG. 26 is a block diagram of an electric circuit for portions related to the viewfinder in the camera shown in FIGS. 24 and 25.

FIG. 26 is a block diagram of an electric circuit indicating portions related to FIGS. 17 and 18. In FIG. 26, since portions A8, A9, A14, A20 to A29, and A36 are the same as the corresponding portions shown in FIG. 21, the same symbols are used and the descriptions thereof are omitted.

In FIG. 26, there is shown the area sensor A40 shown in FIGS. 24 and 25, an image sensor section A41 built in the area sensor IC chip A40, an image-sensor driving circuit A42 built in the area sensor IC chip A40 for driving the image sensor A41, an infrared-light-emitting-diode driving circuit A43 built in the area sensor IC chip A40 for turning on the infrared light emitting diodes A14, and a signal decision circuit A44 built in the area sensor IC chip A40.

There is also shown a microcomputer A45 including in it an A/D converter A46 and a timer A47. The microcomputer A45 is connected to camera control circuits A22 to A29 including an amount-of-light measuring circuit A23, a distance measuring circuit A24, and a shutter control circuit A22, and controls camera operations. The microcomputer A45 drives the image sensor section A41 through the image-sensor driving circuit A42, and detects the line of sight according to an image of the eyeball taken by the image sensor section A41.

The A/D converter A46 built in the microcomputer A45 converts an analog signal sent from camera control circuits, such as the amount-of-light measuring circuit A23 and the distance measuring circuit A24, to a digital signal, and converts an image signal obtained by the area sensor IC chip A40 to a digital signal. The timer 47 built in the microcomputer A45 operates under the control of the microcomputer A45 and sends a count to the microcomputer A45. Resetting and setting a count and start and stop of counting are controlled by the microcomputer A45.

Figure 27:
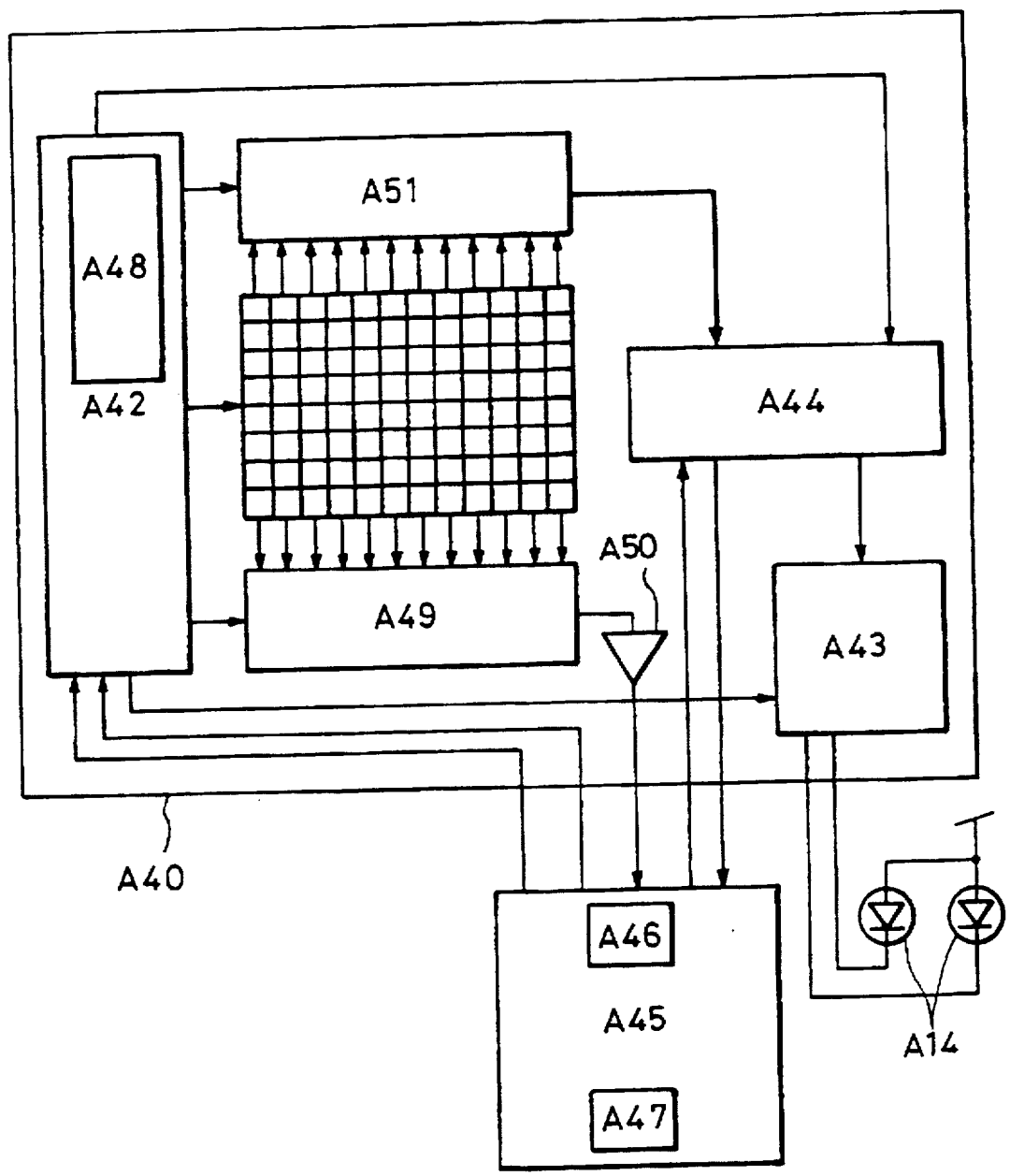
FIG. 27 is a view showing the configuration of an area sensor IC chip A40 shown in FIG. 26.

FIG. 27 illustrates a configuration of the area sensor IC chip A40 shown in FIG. 26. The area sensor IC chip A40 is connected to the microcomputer A45 and the infrared light emitting diodes A14 both shown in FIG. 26. In FIG. 27, the area sensor section A41 is disposed in the area sensor IC chip A40 and serves as a light-receiving sensor having a number of pixels. The pixels have about the same size as a bright point, which is a Purkinje image. The image-sensor driving circuit A42 controls storage and read operations in the area sensor section A41, and includes in it a timing generator A48 for repeating block storage and reading. A block read circuit A51 sequentially reads an image signal for each block from the area sensor section A41 by a timing signal from the timing generator A48 in the image-sensor driving circuit A42 and sends the image signal to the signal decision circuit A44. The signal decision circuit A44 determines whether an eye approaches according to the image signal sent from the block read circuit A51. The infrared-light-emitting-diode driving circuit A43 turns on the infrared-light-emitting-diodes A14 in synchronization with the driving timing of the image-sensor driving circuit A42. A pixel read circuit A49 sequentially reads an image signal for each pixel from the image sensor section A41 by a timing signal from the image-sensor driving circuit A42 and sends the image signal to the A/D converter A46 in the microcomputer A45 via a buffer amplifier A50. The buffer amplifier A50 outputs the image signal.

Figure 28:
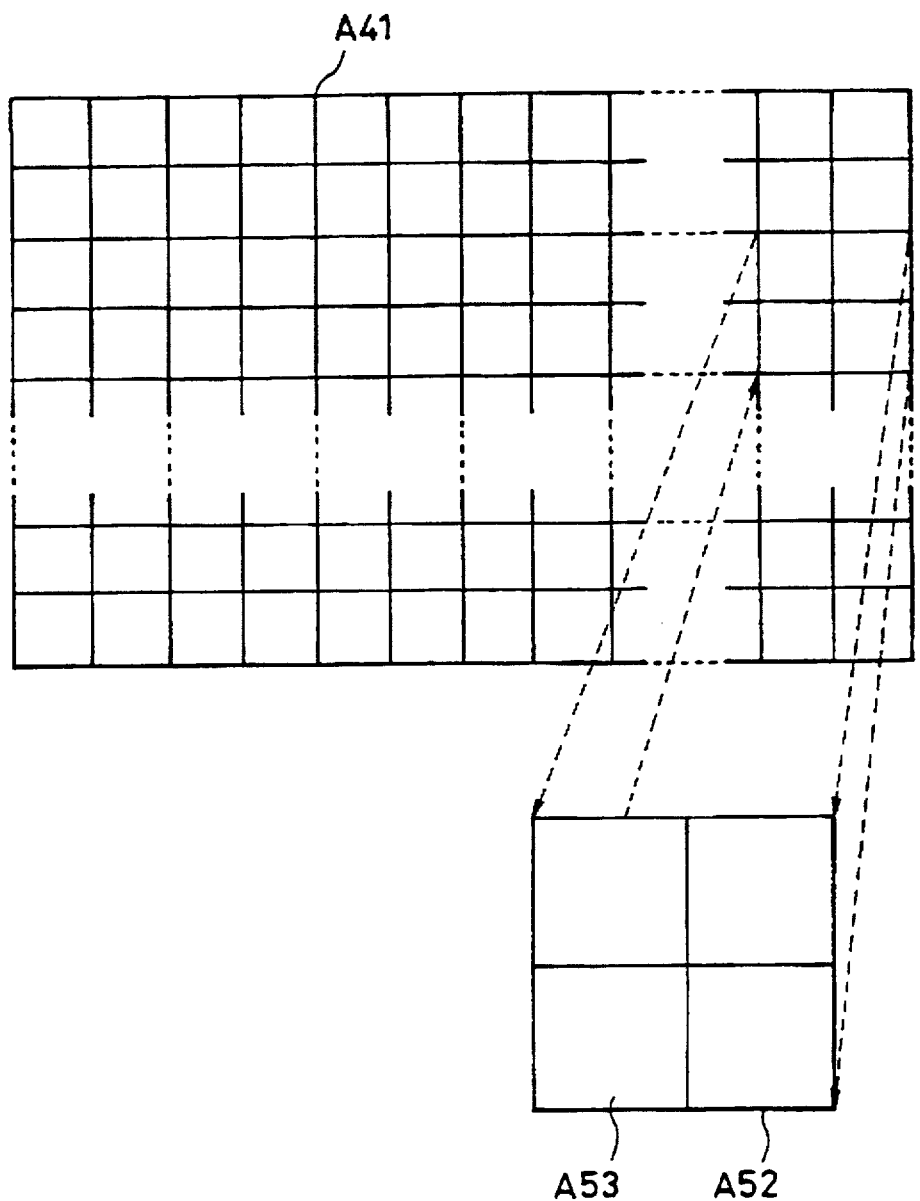
FIG. 28 is a view illustrating how the screen of an area sensor section A41 is divided into a plurality of blocks.

FIG. 28 shows how the screen of the area sensor section A41 is divided into a plurality of blocks. One block includes four pixels, two consecutive pixels in the vertical and horizontal directions.

Figure 29:
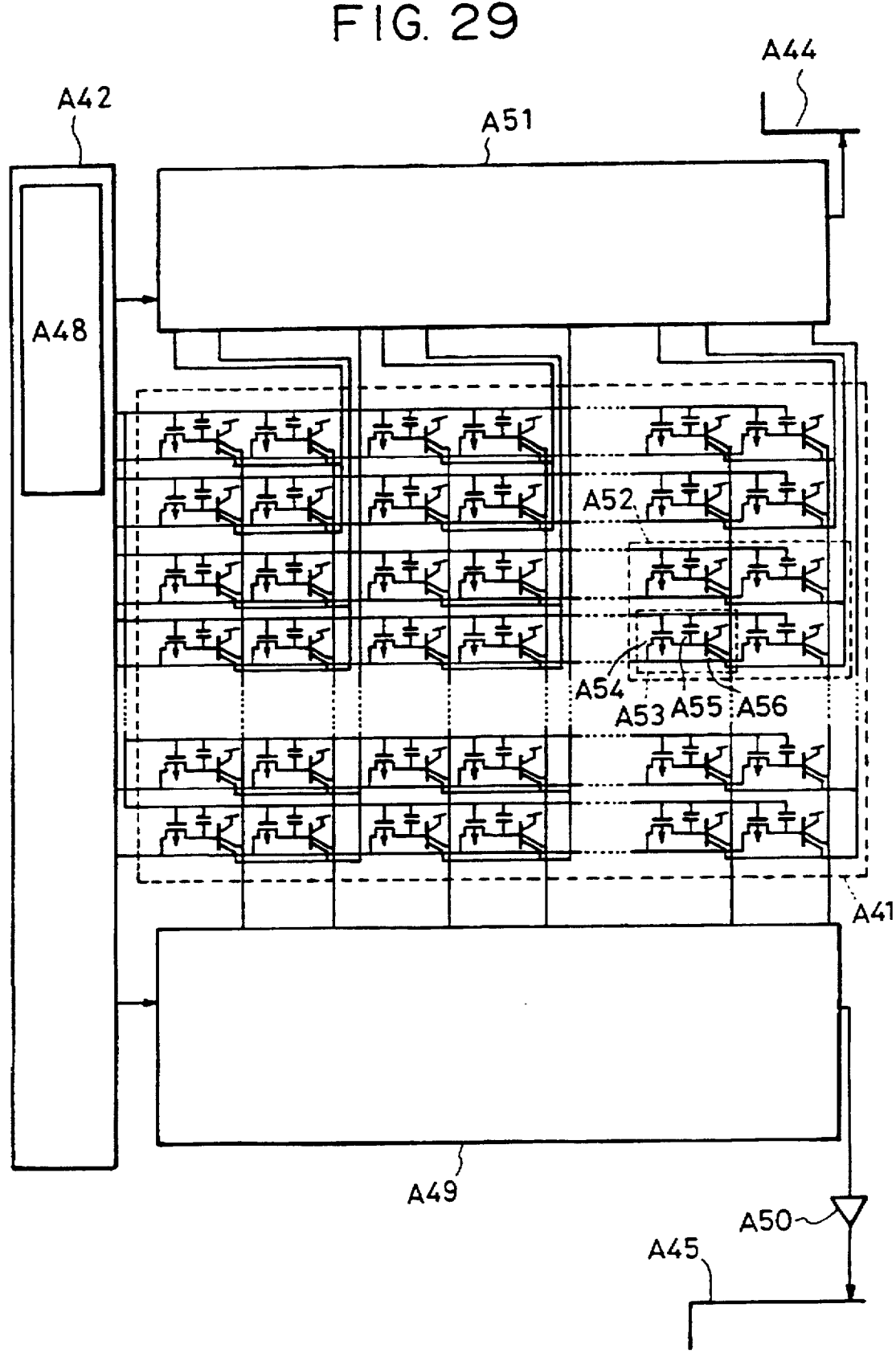
FIG. 29 is a view showing the configuration of an area sensor made up of a base stored image sensor.

FIG. 29 shows an area sensor section which is made up of an imaging device (hereinafter called a nondestructive image sensor) allowing nondestructive reading. In FIG. 29, there is shown a driving circuit A42 for the nondestructive image sensor corresponding to that shown in FIG. 27, a nondestructive image sensor section A41 corresponding to that shown in FIG. 27, a block read circuit A51 corresponding to that shown in FIG. 27, and a pixel read circuit A49 corresponding to that shown in FIG. 27.

The nondestructive image sensor section A41 is made up of a plurality of blocks having the specified number of pixels as shown in FIG. 28. There is shown one block A52 including a plurality of pixels (four pixels in this figure) and one cell A53 constituting one pixel of the image sensor. The block A52 constitutes the nondestructive image sensor section A41. There is shown in FIG. 28 an MOS transistor A54 serving as switching means for resetting the base voltage of a transistor A56 according to a base reset signal sent from the driving circuit A42, a sensor capacity A55, and the NPN transistor A56 serving as a light-receiving section of the nondestructive image sensor. The NPN transistor A56 uses its base or a portion connected to the base as a photosensitive section and a signal storage section and outputs from its two emitters a voltage based on the base voltage which accords with the quantity of charges accumulated at the base. One emitter output of each pixel constituting a block is collected in each block and is supplied to the read circuit A51 as the block output. The other emitter output of each pixel is collected in each row and is supplied to the pixel read circuit A49 as the row output.

In storage, the base of the NPN transistor (corresponding to the transistor A56) in each pixel sensor section and the sensor capacitor (corresponding to the capacitor A55) connected thereto accumulate charges generated in photoelectrical conversion according to the amount of light incident on the photosensitive section of each pixel. The voltage increases according to the amount of light and the storage period. According to an increase in the voltage of the base, the emitter output of the NPN transistor (corresponding to the transistor A56) in each pixel sensor section increases while the base-emitter junction is positively biased. Among the voltages of the bases of the NPN transistors (corresponding to the transistor A56) in pixel sensor sections in one block, the highest voltage determines the emitter output (block output) to which emitters of the NPN transistors (corresponding to the transistor A56) in the pixel sensor sections in the block are collectively connected. In other words, the signal corresponding to the brightest pixel in each block is obtained from the emitter output of the block as the block signal, and is sent to the read circuit A51. The output of each pixel is sent to the pixel read circuit A49 in a read operation according to the base voltage of the NPN transistor (corresponding to the transistor A56) of each pixel sensor section from the other emitter output.

Figure 30:
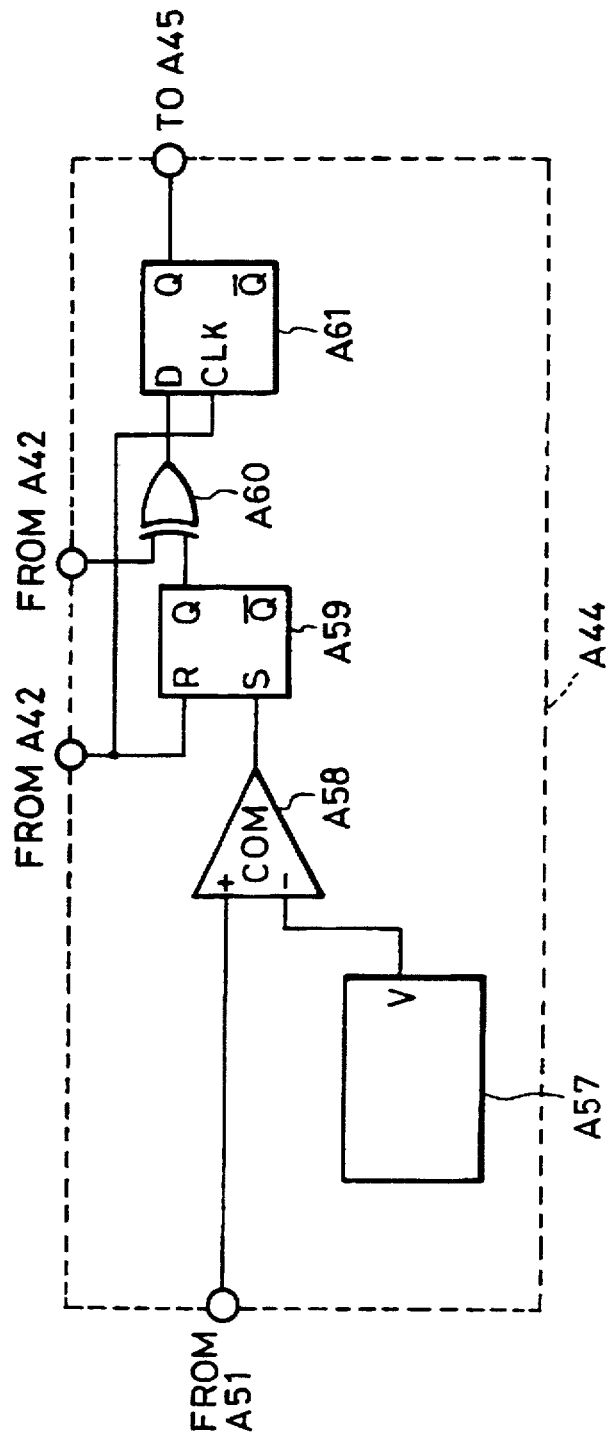
FIG. 30 shows the configuration of a signal decision circuit A44 shown in FIGS. 26 and 27.

FIG. 30 shows the configuration of the signal decision circuit A44 shown in FIGS. 26 and 27. In FIG. 30, a constant-voltage circuit A57 generates a specific comparison level voltage v and a comparator A58 compares the signal output from the block read circuit A51 with the comparison level v and inputs the result to the set input of an R-S flip-flop A59. The R-S flip-flop A59 receives the output of the comparator A58 at the set input and the clock pulse for one-screen read operation sent from the image-sensor driving circuit A42 at the reset input, and sends the Q output to a gate A60. The exclusive-OR gate A60 receives the Q output of the R-S flip-flop A59 and a detection polarity setting signal sent from the microcomputer A45, and sends the logical exclusive OR value to a D flip-flop A61. The D flip-flop A61 receives the output of the exclusive-OR gate A60 at the D input and the clock pulse for one-screen read operation sent from the image-sensor driving circuit A42 at the clock input, and sends the Q output as an eye-approach/eye-receding detection signal.

Figure 31:
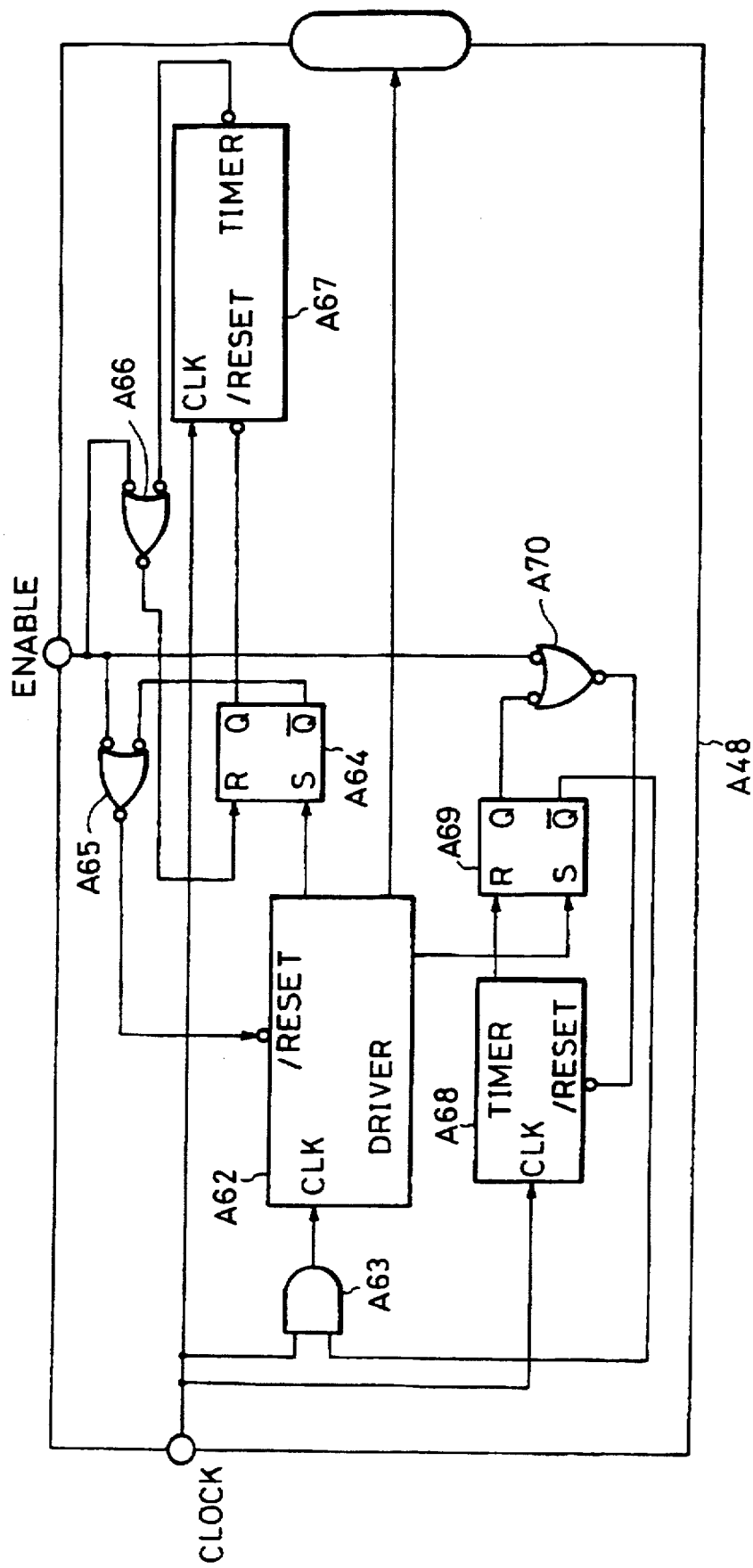
FIG. 31 shows the configuration of a timing generator A48 shown in FIGS. 26 and 27.

FIG. 31 shows the configuration of the timing generator A48 shown in FIGS. 26 and 27. In FIG. 31, there is shown a driving circuit A62 for storage and block read operations, an AND gate A63, R-S flip-flops A64 and A69, negative-logic OR gates A65, A66, and A70, a timer A67 for counting a detection interval, and a timer A68 for counting a storage period.

A start/stop control signal "enable" for the timing generator A48 is sent to the driving circuit A62, the R-S flip-flop A64, and the timer A68 through the gates A65, A66, and A70. The operational clock is supplied to the driving circuit A62 through the AND gate A63 and directly to the timers A67 and A68. The driving circuit A62 sends various timing signals for block storage and block read operations through the image-sensor driving circuit A42 to the image-sensor section A41, the block read circuit A51, the infrared-light-emitting-diode driving circuit A43, and the signal decision circuit A44 to drive them. The driving circuit A62 sends a storage/read end signal to the set input of the R-S flip-flop A64, and the Q output of the R-S flip-flop A64 is connected to the negative-logic reset input of the timer A67. The timer 67 sends a negative-logic time-count completion signal to the reset input of the R-S flip-flop A64 through the negative-logic OR gate A65. The driving circuit A62 sends a storage start signal to the set input of the R-S flip-flop A69. The R-S flip-flop A69 sends the Q output to the reset input of the timer A68 through the negative-logic OR gate A70 and the $\overline{Q}$ output (the inverted output of Q) to the AND gate A63. When the $\overline{Q}$ output is value 1, the operational clock is supplied to the driving circuit A62. When the $\overline{Q}$ output is value 0, the operational clock is not supplied to the driving circuit A62. The timer A68 sends a time-count completion signal to the reset input of the R-S flip-flop A69.

Figure 32:
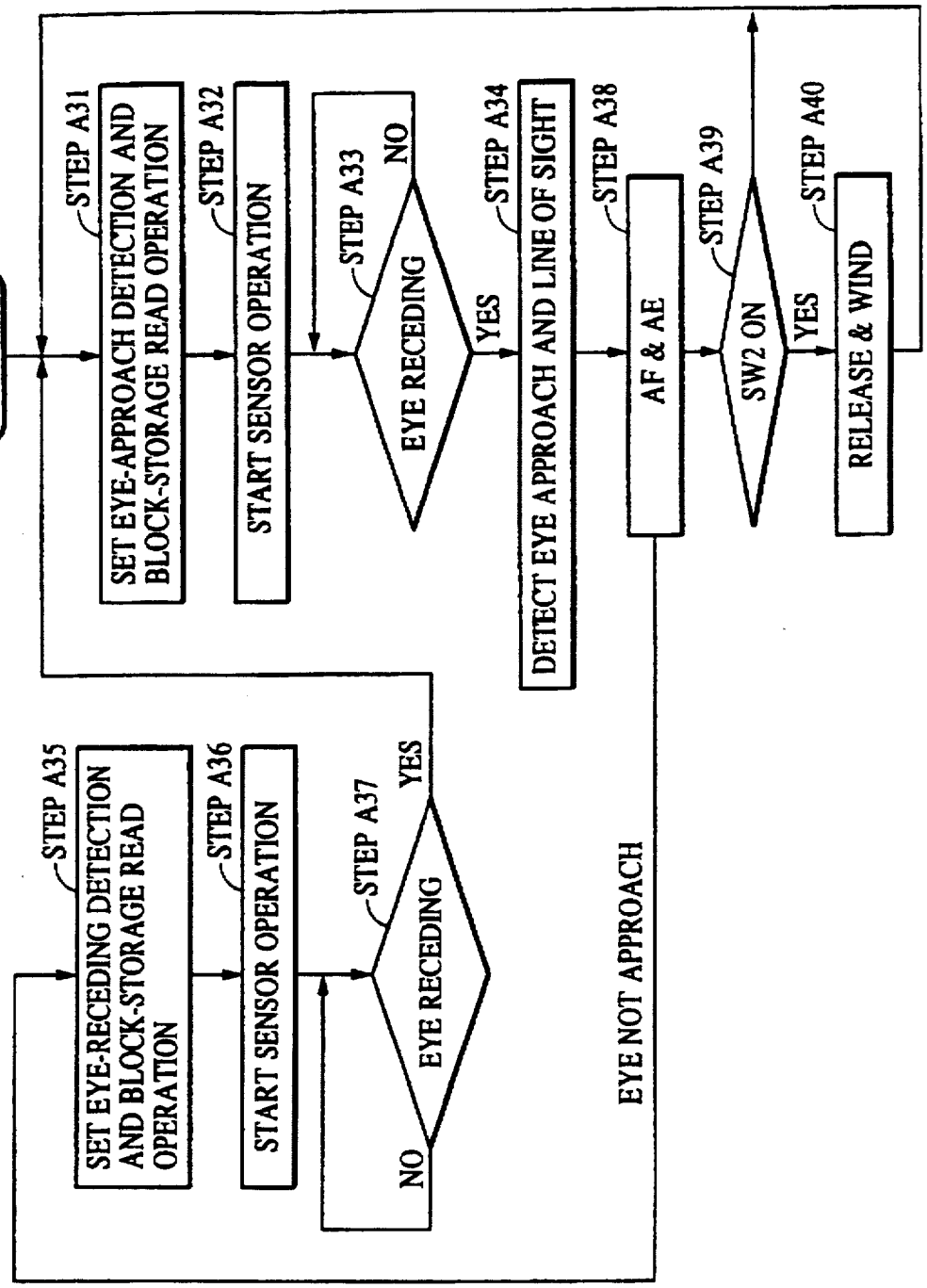
FIG. 32 is a flowchart indicating eye-approach detection in the camera according to the fourth embodiment of the present invention.

In the above-described configuration, the microcomputer A45 operates according to a flowchart shown in FIG. 32.

Steps A31 and A32: The area sensor IC chip A40 is set to a condition for block storage, block read, and eye-approach detection operations. The operation of the area sensor IC chip A40 is started. In other words, the image-sensor driving circuit A42 operates the driving circuit A48 to perform block storage and block read operations. In addition, the image-sensor driving circuit A42 sets a detection polarity setting signal to 0 which is sent to the exclusive-OR gate A59 in the signal decision circuit A44, compares the image output from each block with the comparison level v, and generates an eye-approach detection signal when the image output exceeds the comparison level.

Step A33: The area sensor IC chip A40 performs eye-approach detection. When eye approach is expected, in other words, when an image has higher illumination than specified, an eye-approach detection signal is sent to the microcomputer A45. When the microcomputer A45 detects the signal, it proceeds to the next step.

The operation in this step will be further described below. When a start/stop control signal "enable" becomes value 1, the driving circuit A48 starts operating. When the reset signal sent from the negative-logic OR gate A65 becomes value 1 and the reset state of the driving circuit A62 is released, the driving circuit A62 sends a specific operational pulse to the image sensor section A41 and the block read circuit A51 according to the operational clock sent through the AND gate A63. The R-S flip-flop A69 is set by a storage start signal at the storage-start timing. When the R-S flip-flop A69 is set, its Q output is sent to the reset input of the timer A68 through the negative-logic OR gate A70. The reset state of the timer A68 is released, and time counting starts. The R-S flip-flop A69 sends the $\overline{Q}$ output to the AND gate A63. Then, the AND gate A63 stops sending the operational clock to the driving circuit A62. When the timer A68 finishes counting the specified time, it generates a time-count completion signal. As a result, the R-S flip-flop A69 is returned to the reset state. When the R-S flip-flop A69 is reset, the timer 68, which receives the Q output at the reset input through the negative-logic OR gate A70, is reset and stops counting. When the AND gate A63 receives the $\overline{Q}$ output from the R-S flip-flop A69, it restarts sending the operational clock to the driving circuit A62. The driving circuit 62 generates an operational clock such that the image sensor section A41 and the block read circuit A51 perform operations after storage is finished. As described above, the timer A69 counts the storage period.

When one cycle of storage and reading is finished, the driving circuit A62 sends a storage/read completion signal to the set input of the R-S flip-flop A64 to set it. The set R-S flip-flop A64 sends the Q output to the reset input of the timer A67 to release the reset state of the timer A67 and to have the timer A67 start counting. When the timer A67 finishes time-counting, it sends through the negative-logic OR gate A66 a time-count completion signal to the reset input of the R-S flip-flop A64 to reset it. The $\overline{Q}$ output of the R-S flip-flop A64 is sent to the reset input of the driving circuit A62 through the negative-logic OR gate A65 to release the reset state of the driving circuit A62. The driving circuit 62 restarts storage and reading. As described above, the timer A67 counts a detection interval, and block storage and block reading of the sensor are repeatedly performed.

In block reading, the output of each block output from the block read circuit A51, that is, the maximum output of a pixel among pixels constituting each block, is sent to the signal decision circuit A44. The comparator A58 compares the block output with the comparison level v generated by the constant-voltage circuit A57 in the signal decision circuit A44. When a block output exceeds the comparison level v, that is, when a block including a highly luminous portion exists, the comparator A58 sends value 1 to the set input of the R-S flip-flop A59 to set it. The R-S flip-flop A59 sends the Q output which has become value 1 to the exclusive-OR gate A60. Since a detection polarity setting signal sent to the exclusive OR gate A60 is set to value 0 in step A31, value 1 is sent to the D input of the D flip-flop A61. In this state, when one cycle of storage and reading, and all block outputs are completed, receiving the clock pulse for one-screen read operation output from the image-sensor driving circuit A42, the D flip-flop A61 sets the Q output to value 1 according to its D input and outputs it as an eye-approach/eye-receding detection signal. The microcomputer A45 receives this signal and proceeds to the next step.

Step A34: According to the obtained image from each pixel, eye-approach detection is performed, and if it is in an eye-approach condition, line-of-sight detection is further conducted. Then the processing proceeds to step A38. When it is determined not to be in an eye-approach condition, the processing proceeds to step A35.

Steps A35 and A36: When it is determined not to be in an eye-approach condition in step A34, the area sensor IC chip A40 is set to a condition for block storage, block read, and eye-approach detection operations. The operation of the area sensor IC chip A40 is started. In other words, the image-sensor driving circuit A42 operates the driving circuit A48 to perform block storage and block read operations. In addition, the image-sensor driving circuit A42 sets a detection polarity setting signal to 1 which is sent to the exclusive-OR gate A59 in the signal decision circuit A44, compares the image output from each block with the comparison level v, and generates an eye-receding detection signal when the image output does not exceed the comparison level.

Step A37: The area sensor IC chip A40 performs eye-receding detection. When it is not determined to be in an eye-approach condition, in other words, when an image has no higher illumination than specified, an eye-receding detection signal is sent to the microcomputer A45. When the microcomputer A45 detects the signal, it returns to step A31.

The operation in this step will be further described below. In the same way as in step A33, when a start/stop control signal "enable" becomes value 1, the driving circuit A48 starts operating. When the reset signal sent from the negative-logic OR gate A65 becomes value 1 and the reset state of the driving circuit A62 is released, the driving circuit A62 sends the specific operational pulse to the image sensor section A41 and the block read circuit A51 according to the operational clock sent through the AND gate A63. The R-S flip-flop A69 is set by a storage start signal at the storage-start timing. When the R-S flip-flop A69 is set, its Q output is sent to the reset input of the timer A68 through the negative-logic OR gate A70. The reset state of the timer A68 is released, and time counting starts. The R-S flip-flop A69 sends the $\overline{Q}$ output to the AND gate A63. Then, the AND gate A63 stops sending the operational clock to the driving circuit A62. When the timer A68 finishes counting the specified time, it generates a time-count completion signal. As a result, the R-S flip-flop A69 is returned to the reset state. When the R-S flip-flop A69 is reset, the timer 68, which receives the Q output at the reset input through the negative-logic OR gate A70, is reset and stops counting. When the AND gate A63 receives the Q output from the R-S flip-flop A69, it restarts sending the operational clock to the driving circuit A62. The driving circuit 62 generates an operational clock such that the image sensor section A41 and the block read circuit A51 perform operations after storage is finished. As described above, the timer A69 counts the storage period.

When one cycle of storage and reading is finished, the driving circuit A62 sends a storage/read completion signal to the set input of the R-S flip-flop A64 to set it. The set R-S flip-flop A64 sends the Q output to the reset input of the timer A67 to release the reset state of the timer A67 and to have the timer A67 start counting. When the timer A67 finishes time-counting, it sends through the negative-logic OR gate A66 a time-count completion signal to the reset input of the R-S flip-flop A64 to reset it.

The $\overline{Q}$ output of the R-S flip-flop A64 is sent to the reset input of the driving circuit A62 through the negative-logic OR gate A65 to release the reset state of the driving circuit A62. The driving circuit 62 restarts operating storage and reading. As described above, the timer A67 counts a detection interval, and block storage and block reading of the sensor are repeatedly performed.

In block reading, the output of each block output from the block read circuit A51, that is, the maximum output of a pixel among pixels constituting each block, is sent to the signal decision circuit A44. The comparator A58 compares the block output with the comparison level v generated by the constant-voltage circuit A57 in the signal decision circuit A44. When a block output exceeds the comparison level v, that is, when a block including a highly luminous portion exists, the comparator A58 sends value 1 to the set input of the R-S flip-flop A59 to set it. The R-S flip-flop A59 sends the Q output which has become value 1 to the exclusive-OR gate A60. Since a detection polarity setting signal sent to the exclusive OR gate A60 is set to value 1 in step A31, value 0 is sent to the D input of the D flip-flop A61. In this state, when one cycle of storage and reading occurs, and all block outputs are completed, the D flip-flop A61 receives the clock pulse for one-screen read operation output from the image-sensor driving circuit A42 and sets the Q output to value 0 according to its D input. When a block output does not exceed the comparison level v, that is, when a block including a highly luminous portion does not exist, the comparator A58 sends value 0 to the set input of the R-S flip-flop A59. The R-S flip-flop A59 is not set. The R-S flip-flop A59 remains in the reset state caused by the previous clock pulse for one-screen read operation and sends the Q output which is value 0 to the exclusive-OR gate A60. Since a detection polarity setting signal sent to the exclusive OR gate A60 is set to value 1 in step A31, value 1 is sent to the D input of the D flip-flop A61. In this state, when one cycle of storage and reading and all block outputs are completed, receiving the clock pulse for one-screen read operation output from the image-sensor driving circuit A42, the D flip-flop A61 sets the Q output to value 1 according to its D input and outputs it as an eye-approach detection signal. The microcomputer A45 receives this signal and returns to step A31.

Step A38: According to the line-of-sight information obtained in step A34, a point to which the distance is measured is determined. The distance is measured and the amount of light is measured by the amount-of-light measuring section A23, the distance measuring section A24, and the focus driving section A25. The processing proceeds to step A39.

Step A39: When the shutter release switch A36 is turned on by pressing the release button of the camera, the processing proceeds to step A40. If not, the processing returns to step A31.

Figure 33:
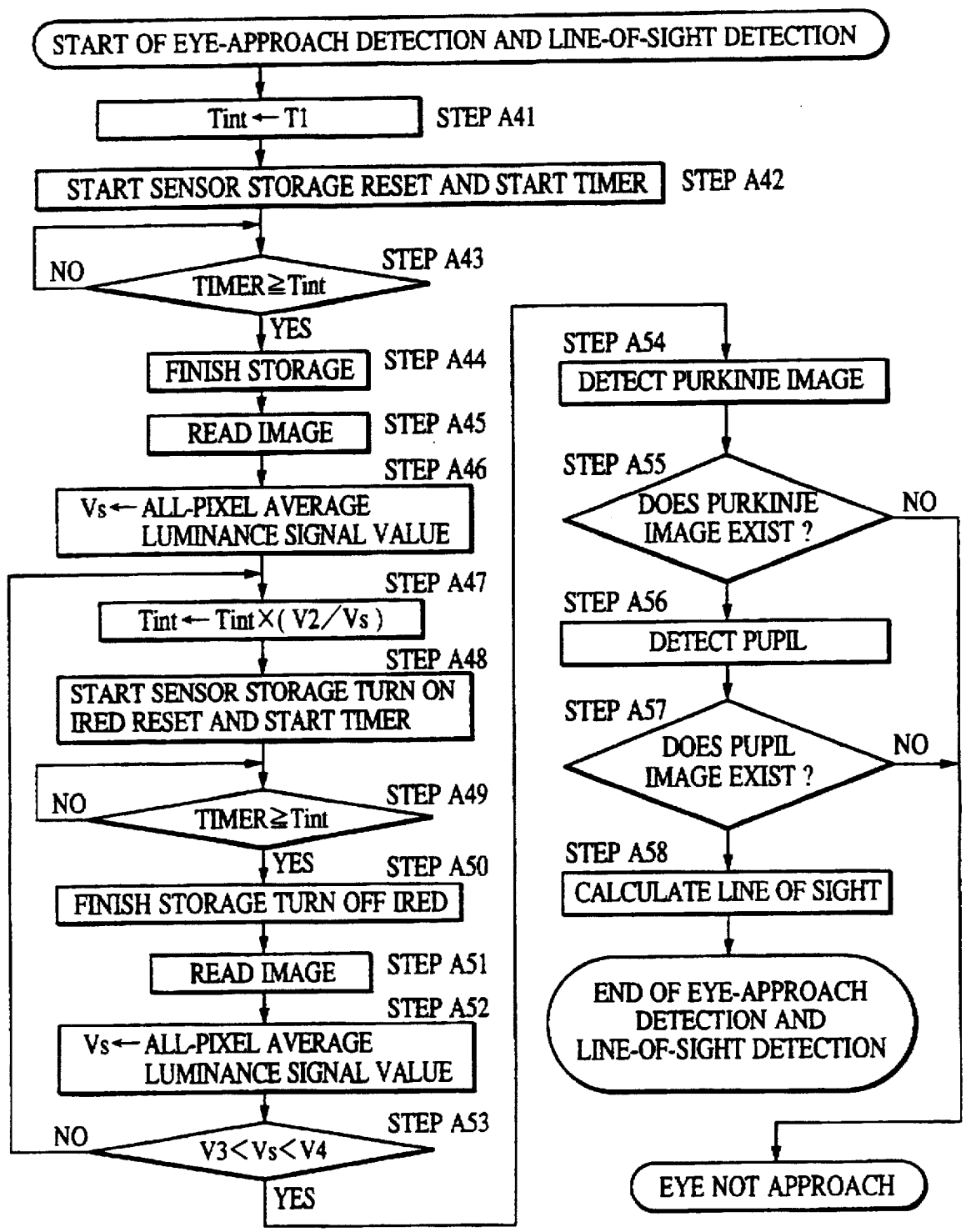
FIG. 33 is a flowchart indicating an operation of the camera according to the fourth embodiment of the present invention.

Step A40: The shutter is released and the film is wound. The processing returns to step A31. The eye-approach and line-of-sight detection operations in step A34 will be further described below by referring to FIG. 33.

Step A41: The storage period (Tint) is set to the specified time $T_1$ which is the AGC storage period.

Step A42: The image-sensor driving circuit A42 drives the image sensor A41 to start storage. The timer A47 is reset and starts counting the storage period.

Step A43: Whether the count of the timer A47 reaches the storage period (Tint) specified in step A41 is determined repeatedly until the count reaches the specified storage period. When the count reaches the specified storage period, the processing proceeds to step A44.

Step A44: The image-sensor driving circuit A42 drives the image sensor A41 to stop the storage.

Step A45: The image-sensor driving circuit A42 drives the image sensor A41 and the read circuit A49 to read an image signal for each pixel. The image signal output from the read circuit A49 is converted to a digital signal by the A/D converter A46, and then input to the microcomputer A45.

Step A46: An average luminance level in all pixels is calculated as a value indicating the state of an image, and is called hereinafter $V_5$.

Step A47: According to $V_5$, which indicates the state of an image and is obtained in step A46, the storage period is determined. The storage period equals Tint×$(V_2/V_5)$, where Tint indicates the previous storage period and $V_2$ represents a value indicating the state of an image appropriate for eye-approach detection and line-of-sight detection. It is expected that the new storage period enables an image appropriate for eye-approach detection and line-of-sight detection, that is, an image having a sufficient contrast, to be obtained.

Step A48: The image-sensor driving circuit A42 drives the image sensor A41 to start storage. The infrared-light-emitting-diode driving circuit A43 turns on the infrared light emitting diodes A14. The timer A47 is reset and starts counting the storage period.

Step A49: Whether the count of the timer A47 reaches the storage period (Tint) specified in step A47 is determined repeatedly until the count reaches the specified storage period. When the count reaches the specified storage period, the processing proceeds to step A50.

Step A50: The image-sensor driving circuit A42 drives the image sensor A41 to stop the storage. The infrared-light-emitting-diode driving circuit A43 turns off the infrared light emitting diodes A14.

Step A51: The image-sensor driving circuit A42 drives the image sensor A41 and the read circuit A49 to read an image signal for each pixel. The image signal output from the image sensor A41 is converted to a digital signal by the A/D converter A46, and then input to the microcomputer A45.

Step A52: An average luminance level in all pixels is calculated as a value indicating the state of an image, and is called hereinafter $V_5$.

Step 53: It is determined whether $V_5$, which indicates the state of an image, falls in a range $(V_3 > V_5 > V_4)$ appropriate for correct line-of-sight detection. When $V_5$ is out of range, storage is performed again from step A47 with the storage period being modified. When $V_5$ falls in the range, the processing proceeds to step A54.

Step 54: According to the obtained image, a Purkinje image, which is a specular reflection image on the cornea of the infrared light emitting diodes A14 serving as illumination light sources, is detected. Since the Purkinje image has features of having a high luminance level which steeply rises from the surroundings and having a small area, the image can be detected from these features.

Step 55: When an image having the features of the Purkinje image is not detected in step A54, it is determined not to be in an eye-approach condition.

Step A56: A pupil image is detected from the obtained image. Since the pupil has features of having a very low luminance level due to a very low reflection factor, having a shape of circle, and being formed relatively close to the Purkinje image, a pupil image can be detected from these features.

Step A57: When a pupil image is not detected in step A56, it is determined not to be in an eye-approach condition.

Step 58: From the mutual positional relationship between the Purkinje image and the pupil image obtained in steps A54 and A56, the line-of-sight information of the user is calculated.

As described above, according to the image (the block image having a peak value) information obtained in the first detection with the storage period specified in advance, a highly luminous portion including the Purkinje image, is detected. When the Purkinje image is detected, it is determined that eye approach is highly expected. Then, auto gain control (AGC) is performed to control the sensor storage period so that the received image signal has an appropriate level, and an image is again received. The image received second is processed to detect detailed features of an eye image for precise eye-approach detection. When the Purkinje image is not detected, AGC is not performed and power consumption is reduced. In addition, when the Purkinje image is detected, AGC is performed and an eyeball image is again received, the precision of eye-approach detection does not decrease.

Fifth Embodiment

In the same way as in the fourth embodiment, the configuration shown in FIGS. 24 and 25 is used in a fifth embodiment. FIG. 24 shows an outlined configuration of the viewfinder optical system in the camera. FIG. 25 is a top view of the viewfinder optical system.

Figure 34:
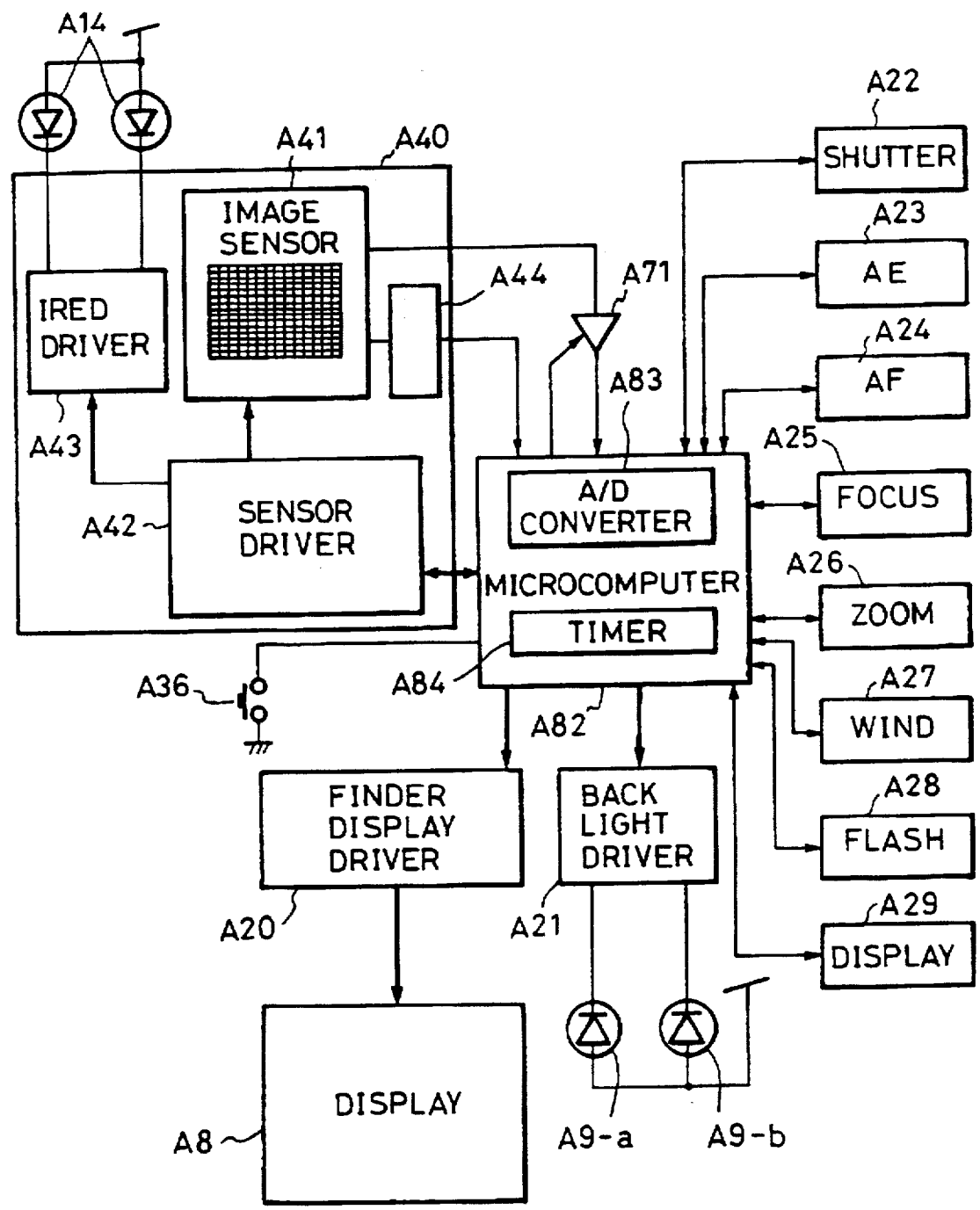
FIG. 34 is a block diagram of an electric circuit for portions related to a viewfinder of a camera according to a fifth embodiment of the present invention.

FIG. 34 is a block diagram of an electric circuit indicating portions related to the viewfinder of the camera shown in FIGS. 24 and 25. In FIG. 34, portions A8, A9, A14, A20 to A29, A36, and A40 to A44 are the same as the corresponding portions shown in FIG. 21 for the third embodiment and shown in FIG. 26 for the fourth embodiment. The area sensor IC chip A40 has the configuration shown in FIG. 27 for the fourth embodiment. In FIG. 34, a variable-gain amplifier A71 determines a gain according to a signal sent from a microcomputer A82, amplifies an image signal obtained in the area sensor IC chip A40 with the gain, and sends it to an A/D converter A83 built in the microcomputer A82. The microcomputer A82 includes in it the A/D converter A83 and a timer A84. The microcomputer A45 controls camera operations, together with camera control circuits A22 to A29 including an amount-of-light measuring circuit A23, a distance measuring circuit A24, a shutter control circuit A22, obtains an image of an eye of the user who looks through the viewfinder from the area sensor IC chip A40, and detects the line of sight. The A/D converter A83 built in the microcomputer A82 converts analog signals sent from various camera circuits, such as the amount-of-light measuring circuit and the distance measuring circuit to digital signals, and inputs them into the microcomputer A82.

The A/D converter A83 also obtains through the variable-gain amplifier A71 an image signal acquired by the area sensor IC chip A40, converts it to a digital signal, and inputs to the microcomputer A82. The timer A84 built in the microcomputer A82 operates under the control of the microcomputer A82 and sends a count to the microcomputer A82. Resetting and setting a count and start and stop of counting are controlled by the microcomputer A82.

Figure 35:
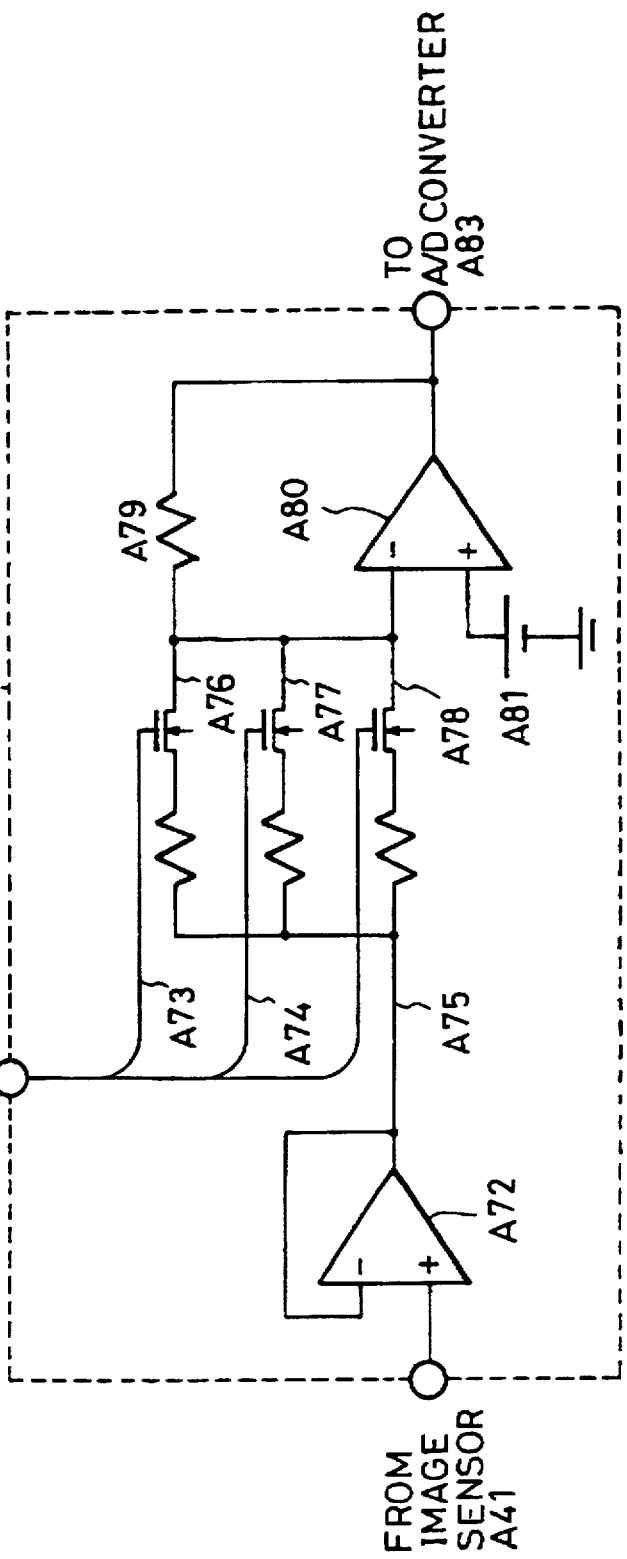
FIG. 35 is a view showing a configuration of a variable-gain amplifier shown in FIG. 34.

FIG. 35 illustrates a configuration of the variable-gain amplifier A71 shown in FIG. 34. In FIG. 35, an amplifier A72 forms a voltage follower to which an image signal from the area sensor IC chip A40 is input. Resistors A73, A74, and A75 having resistances of R1, R2, and R3 (R1>R2>R3) are connected to the output of the voltage follower A72 at one end and are connected at the other end to the negative input of an amplifier A80 through switching transistors A76, A77, and A78, respectively. The switching transistors A76, A77, and A78 control the connections between the negative input of the amplifier A80 and the resistors A73, A74, and A75 according to a gain control signal sent from the microcomputer A82. A feedback resistor A79 having a resistance of R0 is disposed between the output and the negative input of the amplifier A80. A reference power supply A81 is connected to the positive input of the amplifier A80. The amplifier A80 performs inverted amplification with a gain determined by the ratio of the resistance R0 of the feedback resistor A79 to the resistance of the resistor A73, A74, or A75 selected and connected by the switching transistor A76, A77, or A78. Only one of the switching transistors A76, A77, and A78 is turned on at a time. The gain can be selected from three values, G1 (=R0/R1), G2 (=R0/R1), and G3 (=R0/R3) where G1, G2, and G3 are absolute values and G1<G2<G3.

Figure 36:
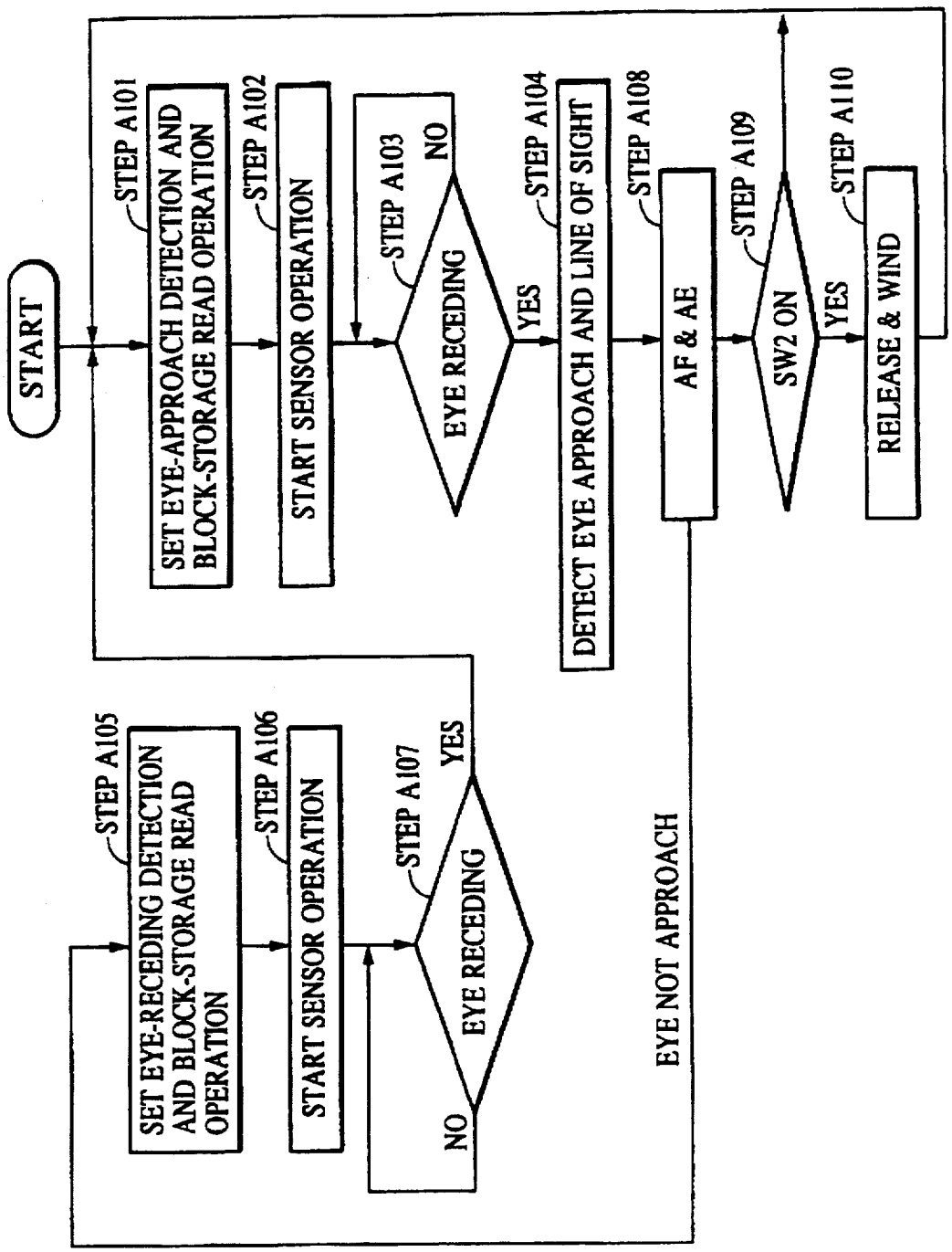
FIG. 36 is a flowchart indicating eye-approach detection operation in the camera according to the fifth embodiment of the present invention.
Figure 37A:
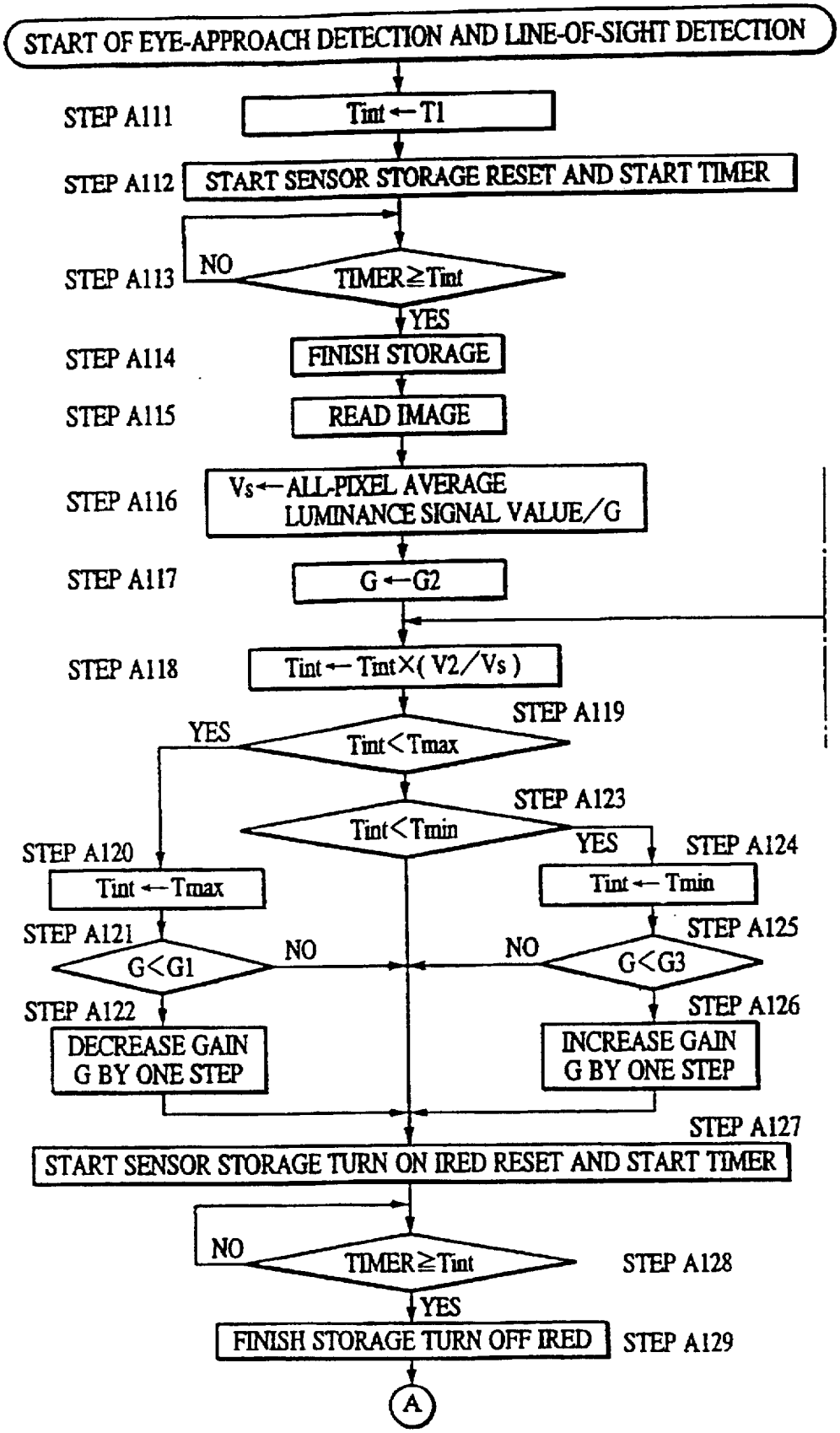
FIG. 37, 37A and 37B is a flowchart indicating eye-approach detection operation in the camera according to the fifth embodiment of the present invention.
Figures 37, 37B:
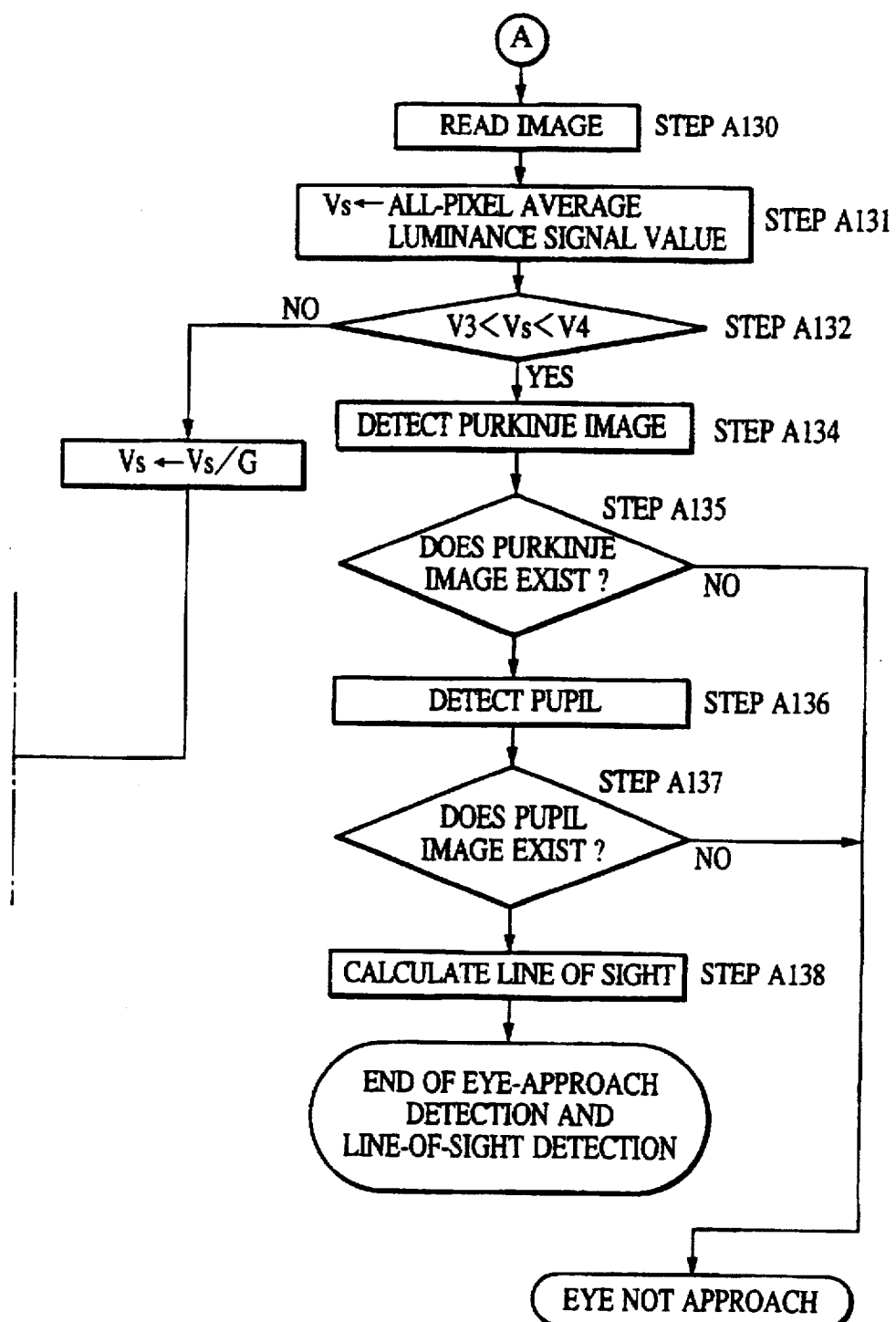

In the above-described configuration, the microcomputer A82 operates according to flowcharts shown in FIGS. 36 and 37.

Steps A101 and A102: As in steps A31 and A32 in the fourth embodiment, the area sensor IC chip A40 is set to a condition for block storage, block read, and eye-approach detection operations. The operation of the area sensor IC chip A40 is started. In other words, the image-sensor driving circuit A42 operates the driving circuit A48 to perform block storage and block read operations. In addition, the image-sensor driving circuit A42 sets a detection polarity setting signal to 0, which is sent to the exclusive-OR gate A59 in the signal decision circuit A44, compares the image output from each block with the comparison level v, and generates an eye-approach/eye-receding detection signal when the image output exceeds the comparison level v.

Step A103: As in step A33 in the fourth embodiment, the area sensor IC chip A40 performs eye-approach detection. When eye approach is expected, in other words, when an image has higher illumination than specified, an eye-approach detection signal is sent to the microcomputer A82. When the microcomputer A82 detects the signal, it proceeds to the next step.

Step A104: According to the obtained image from each pixel, eye-approach detection is performed, and if in an eye-approach condition, line-of-sight detection is further conducted. Then the processing proceeds to step A108. When it is determined not to be in an eye-approach condition, the processing proceeds to step A105. The operation in this step will be further described later by referring to FIG. 37, 37A and 37B.

Steps A105 and A106: When it is determined not to be in an eye-approach condition in step A104, the area sensor IC chip A40 is set to a condition for block storage, block read, and eye-approach detection operations as in steps A35 and A36 in the fourth embodiment. The operation of the area sensor IC chip A40 is started.

Step A107: As in step A37 in the fourth embodiment, the area sensor IC chip A40 performs eye-receding detection. When it is not determined to be in an eye-approach condition, in other words, when an image has no higher illumination than specified, an eye-approach/eye-receding detection signal is sent to the microcomputer A82. When the microcomputer A82 detects the signal, it returns to step A101.

Step A108: According to the line-of-sight information obtained in step A104, a point to which the distance is measured is determined. The distance is measured and the amount of light is measured by the amount-of-light measuring section A23, the distance measuring section A24, and the focus driving section A25. The processing proceeds to step A109.

Step A109: When the shutter release switch A36 is turned on by pressing the release button of the camera, the processing proceeds to step A110. If not, the processing returns to step A101.

Step A110: With the use of the shutter control section A22 and the winding section A27, and the flash section A29 if necessary, the shutter is released and the film is wound. The processing returns to step A101.

The eye-approach detection and line-of-sight detection operations in step A104 will be further described below by referring to FIG. 37A and 37B.

Step A111: The storage period (Tint) is set to the specified time $T_1$ which is the AGC storage period, and the gain G of the variable-gain amplifier A71 is set to the maximum value, G3.

Step A112: The Image-sensor driving circuit A42 drives the image sensor A41 to start storage. The timer A84 is reset and starts counting the storage period.

Step A113: Whether the count of the timer A84 reaches the storage period (Tint) specified in step A111 is determined repeatedly until the count reaches the specified storage period. When the count reaches the specified storage period, the processing proceeds to step A114.

Step A114: The image-sensor driving circuit A42 drives the image sensor A41 to stop the storage.

Step A115: The image-sensor driving circuit A42 drives the image sensor A41 and the read circuit A49 to read an image signal for each pixel. The image signal output from the read circuit A49 is amplified at the specified gain by the variable-gain amplifier A71, and then input to the A/D converter A83. The A/D converter A83 converts the amplified image signal to a digital signal and inputs it to the microcomputer A82.

Step A116: An average luminance level in all pixels is calculated as a value indicating the state of an image, and is divided by the gain G (=G3). The result is called hereinafter $V_5$.

Step A117: The gain G of the variable-gain amplifier A71 is set to the intermediate value, G2.

Step A118: According to $V_5$, which indicates the state of an image, the storage period is determined. The storage period equals Tint×($V_2/V_5$)/G, where Tint indicates the previous storage period and $V_2$ represents a value indicating the state of an image appropriate for eye-approach detection and line-of-sight detection. It is expected that the new storage period enables an image appropriate for eye-approach detection and line-of-sight detection, that is, an image having a sufficient contrast, to be obtained.

Step A119: When the storage period Tint newly specified in step A118 exceeds the maximum storage period Tmax, the processing proceeds to step A120. If not, the processing proceeds to step A123.

Step A120: The storage period Tint is set to the maximum storage period Tmax.

Step A121: When the gain G of the variable-gain amplifier A71 is the minimum value, G1, the processing proceeds to step A127. If not, the processing proceeds to step A122.

Step A122: The gain G of the variable-gain amplifier A71 is reduced by one step. The processing proceeds to step A127.

Step A123: When the storage period Tint newly specified in step A118 is less than the minimum storage period Tmin, the processing proceeds to step A124. If not, the processing proceeds to step A127.

Step A124: The storage period Tint is set to the minimum storage period Tmin.

Step A125: When the gain G of the variable-gain amplifier A71 is the maximum value, G3, the processing proceeds to step A127. If not, the processing proceeds to step A126.

Step A126: The gain G of the variable-gain amplifier A71 is increased by one step. The processing proceeds to step A127.

Step A127: The image-sensor driving circuit A42 drives the image sensor A41 to start storage. The infrared-light-emitting-diode driving circuit A43 turns on the infrared light emitting diodes A14. The timer A84 is reset and starts counting the storage period.

Step A128: Whether the count of the timer A84 reaches the storage period (Tint) specified is determined repeatedly until the count reaches the specified storage period. When the count reaches the specified storage period, the processing proceeds to step A129.

Step A129: The image-sensor driving circuit A42 drives the image sensor A41 to stop the storage. The infrared-light-emitting-diode driving circuit A43 turns off the infrared light emitting diodes A14.

Step A130: The image-sensor driving circuit A42 drives the image sensor A41 and the read circuit A49 to read an image signal for each pixel. The image signal output from the image sensor A41 is amplified by the variable-gain amplifier A71 at the gain specified in advance and input to the A/D converter A83. The A/D converter A83 converts the amplified image signal to a digital signal, and inputs it to the microcomputer A82.

Step A131: An average luminance level in all pixels is calculated as a value indicating the state of an image, and is called hereinafter $V_5$.

Step 132: It is determined whether $V_5$, which indicates the state of an image, falls in a range ($V_3>V_5>V_4$) indicating the state of an image appropriate for correct line-of-sight detection, that is, an image having a sufficient contrast. When $V_5$ is out of range, the processing proceeds to step A133. When $V_5$ falls in the range, the processing proceeds to step A134.

Step 133: By the gain G of the variable-gain amplifier A71, Vs is divided and the result is called Vs hereinafter. Storage is again performed from step A118 with the storage period being modified.

Step A134: According to the obtained image, a Purkinje image, which is a specular reflection image on the cornea of the infrared light emitting diodes A14 serving as illumination light sources, is detected. Since the Purkinje image has the features of having a high luminance level which steeply rises from the surroundings and having a small area, the image can be detected from these features.

Step 135: When an image having the features of the Purkinje image is not detected in step A134, it is determined not to be in an eye-approach condition.

Step A136: A pupil image is detected from the obtained image. Since the pupil has the features of having a very low luminance level due to a very low reflection factor, having a shape of circle, and being formed relatively close to the Purkinje image, a pupil image can be detected from these features.

Step A137: When an image having the features of the pupil image is not detected in step A136, it is determined not to be in an eye-approach condition.

Step 138: From the mutual positional relationship between the Purkinje image and the pupil image obtained in steps A134 and A136, the line of sight is calculated with the method disclosed in U.S. Pat. No. 5,486,892 and line-of-sight detection is finished.

As described above, according to an image (block image having a peak value) information obtained in the fixed storage period without AGC being applied, a highly luminous portion caused by the Purkinje image of an eye, which is a feature indicating eye approach, is detected. When it is determined to be in an eye-approach condition, AGC (controlling the storage period or the amplification rate) is performed and an image having a sufficient contrast is obtained. According to the image, detailed features of an eye image are detected to perform precise eye-approach detection. Both low power consumption and precise eye-approach detection are enabled.

When it is determined to be in an eye-approach condition in eye-approach detection performed according to an image information obtained in the fixed storage period, if it is determined not to be in an eye-approach condition in eye-approach detection performed according to an image obtained with AGC being applied, eye-approach detection according to an image obtained with AGC being applied is not conducted again until it is determined not to be in an eye-approach condition in eye-approach detection performed according to an image information obtained in the fixed storage period and then it is determined to be in an eye-approach condition in eye-approach detection performed according to an image information obtained in the fixed storage period. Unnecessary detection, which requires large power, is not repeated. Both low power consumption and precise eye-approach detection are enabled.

What is claimed is:

1. An eyeball detection apparatus comprising:
   a light-receiving device for receiving a reflection image from the cornea of an eyeball of a user or a person being tested;
   a first determination circuit for determining whether the signal of the reflection image from the cornea received by said light-receiving device exceeds a specified level; and
   a second determination circuit for determining whether the size of the reflection image from the cornea received by said light-receiving device falls in a specified range only when said first determination circuit determines that the signal of the reflection image from the cornea received by said light-receiving device exceeds said specified level;
   wherein it is determined that the eyeball of the user or the person being tested has approached said apparatus only when said second determination circuit determines that the size of the reflection image from the cornea received by said light-receiving device falls in the specified range.

2. An eyeball detection apparatus according to claim 1, wherein said light-receiving device is provided with a plurality of blocks each made up of a plurality of pixels, wherein a signal for each pixel and a signal for each block made up of a plurality of pixels can be output, and a signal for each pixel is output only when said first determination circuit determines that the signal of the reflection image from the cornea for each block received by said light-receiving device exceeds said specified level.

3. An eyeball detection apparatus according to claim 2, wherein a block is made by dividing said light-receiving device into rows.

4. An eyeball detection apparatus according to claim 1, wherein said first determination circuit repeatedly operates so long as the received image signal does not exceed the specified level.

5. An eyeball detection apparatus according to claim 1, wherein said light-receiving device outputs a signal corresponding to the maximum luminance.

6. An eyeball detection apparatus comprising:
   an illumination device for illuminating an eyeball of a user or a person being tested;
   a light-receiving device for receiving a reflection image from the cornea of an eyeball projected by said illumination device;
   a detection circuit for detecting the approach of the eyeball of the user or the person being tested by detecting said reflection image from the cornea;
   a determination circuit for determining whether the signal of the reflection image from the cornea received by said light-receiving device exceeds a specified level; and
   an illumination control circuit for increasing the amount of illumination generated by said illumination device when said determination circuit determines that the signal of the reflection image from the cornea received by said light-receiving device exceeds said specified level.

7. An eyeball detection apparatus according to claim 6, wherein said light-receiving device outputs a signal corresponding to the maximum luminance.

8. An eyeball detection apparatus comprising:
   a light-receiving device for receiving an image of an eyeball of a user or a person being tested;
   a control circuit for controlling said light-receiving device so that said light-receiving device outputs an appropriate signal level;
   a line-of-sight detection circuit for detecting the line of sight of the user or the person being tested according to the image of the eyeball received by said light-receiving device; and
   an eyeball detection circuit for detecting the approach of the eyeball of the user or the person being tested according to the image of the eyeball received by said light-receiving device;
   wherein said control circuit differently controls line-of-sight detection performed by said line-of-sight detection circuit and eyeball approach detection performed by said eyeball detection circuit.

9. An eyeball detection apparatus according to claim 8, wherein said light-receiving device has a light-receiving sensor, and said control circuit operates in a first control mode in which control is performed according to the level of light received by said light-receiving sensor and a second control mode in which control specified in advance is performed regardless of the level of light received by said light-receiving sensor.

10. An eyeball detection apparatus according to claim 8, wherein said light-receiving device is a storage-type image device and said control circuit controls a storage period for said storage-type image device.

11. An eyeball detection apparatus according to claim 10, wherein said control circuit operates in a first control mode in which a storage period for said storage-type image device is controlled according to the level of light received by said storage-type image device and a second control mode in which said storage-type image device is controlled using the storage period specified in advance regardless of the level of light received by said storage-type image device.

12. An eyeball detection apparatus according to claim 8, wherein said light-receiving device has a light-receiving sensor and an amplifier for amplifying the output of said light-receiving sensor, and said control circuit controls the amplification rate of said amplifier.

13. An eyeball detection apparatus according to claim 12, wherein said control circuit operates in a first control mode in which the amplification rate of said amplifier is controlled according to the level of light received by said light-receiving sensor and a second control mode in which said amplifier is controlled using amplification rate specified in advance regardless of the level of light received by said light-receiving sensor.

14. An eyeball detection apparatus according to claim 12, wherein said control circuit has a first amplifier in which the amplification rate is controlled according to the level of light received by said light-receiving sensor and a second amplifier controlled using the amplification rate specified in advance regardless of the level of light received by said light-receiving sensor.

15. An eyeball detection apparatus comprising:

a light-receiving device having a light-receiving sensor for receiving an image of an eyeball of a user or a person being tested;

a control circuit for controlling said light-receiving device so that said light-receiving device outputs an appropriate signal level, said control circuit operating a first control mode in which control is changed according to the level of light received by said light-receiving sensor and a second control mode in which control specified in advance is performed regardless of the level of light received by said light-receiving sensor; and an eyeball detection circuit for detecting the approach of the eyeball of the user or the person being tested according to the image of the eyeball received by said light-receiving device.

16. An eyeball detection apparatus according to claim 15, wherein said eyeball detection circuit detects the approach of the eyeball of the user or the person being tested when the output signal of said light-receiving device satisfies a specified condition, and said specified condition differs according to the control mode of said control circuit.

17. An eyeball detection apparatus according to claim 16, wherein said specified condition is whether the output signal level of said light-receiving device exceeds the specified level, so long as said control circuit operates in the second control mode.

18. An eyeball detection apparatus according to claim 16, wherein said specified condition is whether the output signal of said light-receiving device includes a steep, highly-luminous image, so long as said control circuit operates in the first control mode.

19. An eyeball detection apparatus according to claim 16, wherein said specified condition is whether a highly luminous image included in the output signal of said light-receiving device has a smaller area than the specified area, so long as said control circuit operates in the first control mode.

20. An eyeball detection apparatus according to claim 15, wherein said control circuit starts the control in the second control mode as detection starts, and performs the control in the first control mode only when the output signal level of said light-receiving device exceeds the specified level.

* * * * *

UNITED STATES PATENT AND TRADEMARK OFFICE
CERTIFICATE OF CORRECTION

PATENT NO. : 5,790,234
DATED : August 4, 1998
INVENTOR(S) : SHINICHI MATSUYAMA

It is certified that error appears in the above-identified patent and that said Letters Patent is hereby corrected as shown below:

COLUMN 10,
Line 18, "to" should be deleted.
Line 31, "screen" should read --screen.--.

COLUMN 16,
Line 24, "an" should read --a--.

COLUMN 17,
Line 21, "additional an" should read --an additional--.

COLUMN 28,
Line 25, "$V_5$." should read --$V_5$--.
Line 26, "$V_5$," should read --$V_{5'}$--.
Line 28, "Tint x $(V_2/V_5)$," should read --Tint x $(V_2/V_S)$,--.
Line 58, "$V_5$." should read --$V_S$.--.

UNITED STATES PATENT AND TRADEMARK OFFICE
CERTIFICATE OF CORRECTION

PATENT NO. : 5,790,234

DATED : August 4, 1998

INVENTOR(S) : SHINICHI MATSUYAMA

It is certified that error appears in the above-identified patent and that said Letters Patent is hereby corrected as shown below:

COLUMN 28 (Cont.),
Line 59, "$V_5$," should read --$V_S$,--.
Line 60, "$(V_3>V_5>V_4)$" should read --$(V_3>V_S>V_4)$--.
Line 61, "$V_5$" should read --$V_S$--.
Line 63, "$V_5$" should read --$V_S$--.

COLUMN 31,
Line 56, "$V_5$." should read --$V_S$.--.
Line 59, "$V_5$," should read --$V_S$,--.
Line 61, "Tint x $(V_2/V_5/G$," should read --Tint x $(V_2/V_S)/G$,--.

COLUMN 32,
Line 51, "$V_5$." should read --$V_S$.--.
Line 52, "$V_5$," should read --$V_S$,--.
Line 53, "$(V_3>V_5>V_4)$" should read --$(V_3>V_S>V_4)$--.
Line 56, "$V_5$" should read --$V_S$--.
Line 57, "$V_5$" should read --$V_S$--.

UNITED STATES PATENT AND TRADEMARK OFFICE
CERTIFICATE OF CORRECTION

PATENT NO. : 5,790,234

DATED : August 4, 1998

INVENTOR(S) : SHINICHI MATSUYAMA

It is certified that error appears in the above-identified patent and that said Letters Patent is hereby corrected as shown below:

<u>COLUMN 35</u>,
Line 28, "using" should read --using an--.

Signed and Sealed this

Seventh Day of September, 1999

Q. TODD DICKINSON

*Attest:*

*Attesting Officer*        *Acting Commissioner of Patents and Trademarks*